US007073187B1

(12) United States Patent
Hendricks et al.

(10) Patent No.: US 7,073,187 B1
(45) Date of Patent: Jul. 4, 2006

(54) MENU-DRIVEN TELEVISION PROGRAM ACCESS SYSTEM AND METHOD

(75) Inventors: John S. Hendricks, Potomac, MD (US); Alfred E. Bonner, Bethesda, MD (US)

(73) Assignee: Sedna Patent Services, LLC, Philadelphia, PA (US)

( * ) Notice: Subject to any disclaimer, the term of this patent is extended or adjusted under 35 U.S.C. 154(b) by 0 days.

(21) Appl. No.: 09/208,097

(22) Filed: Nov. 16, 1998

Related U.S. Application Data

(63) Continuation of application No. 08/912,934, filed on Aug. 15, 1997, which is a continuation of application No. 08/160,282, filed on Dec. 2, 1993, now Pat. No. 5,659,350, which is a continuation-in-part of application No. 07/991,074, filed on Dec. 9, 1992.

(51) Int. Cl.
*H04N 7/025* (2006.01)
*H04N 7/10* (2006.01)
*H04N 5/445* (2006.01)

(52) U.S. Cl. .......................................... 725/36; 725/46
(58) Field of Classification Search ................ 725/42, 725/51, 37, 38, 39, 67, 114, 138, 144, 35, 725/41, 109, 110, 104, 34, 46
See application file for complete search history.

(56) References Cited

U.S. PATENT DOCUMENTS

| | | | |
|---|---|---|---|
| 3,891,792 A | 6/1975 | Kimura | |
| 4,361,848 A | 11/1982 | Poignet et al. | |
| 4,381,522 A | 4/1983 | Lambert | |
| 4,398,216 A | 8/1983 | Field et al. | |
| 4,465,825 A | 8/1984 | Lin | |
| 4,484,217 A | 11/1984 | Block et al. | |
| 4,488,179 A | 12/1984 | Kruger et al. | |
| 4,517,598 A | 5/1985 | Van Valkenburg et al. | |
| 4,528,643 A | 7/1985 | Freeny, Jr. | |
| 4,587,520 A | 5/1986 | Astle | |
| 4,605,964 A | 8/1986 | Chard | |
| 4,621,282 A | 11/1986 | Ahern | |
| 4,633,462 A | 12/1986 | Stifle et al. | |
| 4,639,225 A | 1/1987 | Washizuka | |
| 4,641,205 A | 2/1987 | Beyers, Jr. | |
| 4,688,218 A | 8/1987 | Blineau et al. | |
| 4,688,246 A | 8/1987 | Eilers et al. | |
| 4,694,490 A | 9/1987 | Harvey et al. | |

(Continued)

FOREIGN PATENT DOCUMENTS

CA 2044574 12/1992

(Continued)

OTHER PUBLICATIONS

Reimer, "Memories in my pocket", Feb. 1991.

(Continued)

*Primary Examiner*—Chris Grant
*Assistant Examiner*—Andrew Y. Koenig
(74) *Attorney, Agent, or Firm*—Moser, Patterson & Sheridan LLP

(57) ABSTRACT

A menu-driven television program access system and method provide a menu structure that allows subscribers to select and view television programming and other services. The menu structure lists programs by program category or by chronological order of broadcast. The subscriber scrolls the menus until a desired program identifier, such as a title and date/time of broadcast is found. The subscriber then operates a "go-button" on a remote control to select the desired program. In response to operation of the "go-button," a set top terminal turns to a channel carrying the selected program.

110 Claims, 88 Drawing Sheets

U.S. PATENT DOCUMENTS

| | | | |
|---|---|---|---|
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,724,491 A | 2/1988 | Lambert | |
| 4,792,972 A | 12/1988 | Cook, Jr. | |
| 4,805,014 A | 2/1989 | Sahara et al. | |
| 4,816,901 A | 3/1989 | Music et al. | |
| D301,037 S | 5/1989 | Matsuda | |
| 4,829,558 A | 5/1989 | Welsh | |
| 4,829,569 A | 5/1989 | Seth-Smith et al. | |
| 4,860,379 A | 8/1989 | Schoeneberger et al. | |
| 4,876,736 A | 10/1989 | Kiewit | |
| 4,928,168 A | 5/1990 | Iwashita | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,975,951 A | 12/1990 | Bennett | |
| 4,977,455 A | 12/1990 | Young | |
| D314,383 S | 2/1991 | Hafner | |
| 4,995,078 A | 2/1991 | Monslow et al. | |
| 4,996,597 A | 2/1991 | Duffield | |
| 5,001,554 A * | 3/1991 | Johnson et al. | 725/8 |
| 5,014,125 A | 5/1991 | Pocock et al. | |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii et al. | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,990 A | 9/1991 | Kondo et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A * | 12/1991 | Hashimoto | 725/46 |
| 5,077,607 A | 12/1991 | Johnson et al. | |
| 5,078,019 A | 1/1992 | Aoki | |
| 5,091,782 A | 2/1992 | Krause et al. | |
| 5,093,718 A | 3/1992 | Hoarty et al. | |
| D325,581 S | 4/1992 | Schwartz | |
| 5,103,314 A | 4/1992 | Keenan | |
| 5,105,268 A | 4/1992 | Yamanouchi et al. | |
| 5,130,792 A | 7/1992 | Tindell et al. | |
| 5,132,789 A | 7/1992 | Ammon et al. | |
| 5,132,992 A | 7/1992 | Yurt et al. | |
| 5,133,079 A | 7/1992 | Ballantyne et al. | |
| D329,238 S | 9/1992 | Grasso et al. | |
| 5,144,663 A | 9/1992 | Kudelski et al. | |
| 5,150,118 A | 9/1992 | Finkle et al. | |
| 5,151,782 A | 9/1992 | Ferraro | |
| 5,151,789 A | 9/1992 | Young | |
| 5,152,011 A | 9/1992 | Schwob | |
| 5,155,591 A * | 10/1992 | Wachob | 725/35 |
| 5,166,886 A | 11/1992 | Molnar et al. | |
| D331,760 S | 12/1992 | Renk, Jr. | |
| 5,172,413 A | 12/1992 | Bradley et al. | |
| 5,182,639 A | 1/1993 | Jutamulia et al. | |
| 5,202,817 A | 4/1993 | Koenck et al. | |
| 5,206,722 A | 4/1993 | Kwan | |
| 5,206,954 A | 4/1993 | Inoue et al. | |
| 5,212,553 A | 5/1993 | Maruoka | 725/68 |
| 5,216,515 A | 6/1993 | Steele et al. | |
| 5,223,924 A | 6/1993 | Strubbe | |
| 5,237,311 A | 8/1993 | Mailey et al. | |
| 5,237,610 A | 8/1993 | Gammie et al. | |
| 5,242,770 A | 9/1993 | Chen et al. | |
| 5,247,347 A | 9/1993 | Litteral et al. | |
| 5,253,066 A | 10/1993 | Vogel | |
| 5,253,275 A | 10/1993 | Yurt et al. | |
| 5,253,341 A | 10/1993 | Rozmanith et al. | |
| 5,260,778 A | 11/1993 | Kauffman et al. | |
| 5,270,809 A | 12/1993 | Gammie et al. | |
| 5,282,028 A | 1/1994 | Johnson et al. | |
| 5,283,639 A | 2/1994 | Esch et al. | |
| 5,285,272 A | 2/1994 | Bradley et al. | |
| 5,289,271 A | 2/1994 | Watson | |
| 5,293,540 A | 3/1994 | Trani et al. | |
| 5,293,633 A | 3/1994 | Robbins | |
| 5,319,455 A | 6/1994 | Hoarty et al. | |
| 5,319,707 A | 6/1994 | Wasilewski et al. | |
| 5,323,240 A | 6/1994 | Amano et al. | |
| 5,327,554 A | 7/1994 | Palazzi, III et al. | |
| 5,329,590 A * | 7/1994 | Pond | 380/242 |
| 5,339,315 A | 8/1994 | Maeda et al. | |
| 5,341,166 A | 8/1994 | Garr et al. | |
| 5,341,474 A | 8/1994 | Gelman et al. | |
| 5,343,239 A | 8/1994 | Lappington et al. | |
| 5,343,516 A | 8/1994 | Callele et al. | |
| 5,345,594 A | 9/1994 | Tsuda | |
| 5,349,638 A | 9/1994 | Pitroda et al. | |
| 5,351,075 A | 9/1994 | Herz et al. | |
| 5,353,121 A | 10/1994 | Young et al. | |
| 5,355,162 A | 10/1994 | Yazolino et al. | |
| 5,357,276 A | 10/1994 | Banker et al. | |
| 5,365,265 A | 11/1994 | Shibata et al. | |
| 5,367,330 A * | 11/1994 | Haave et al. | 725/104 |
| 5,367,571 A | 11/1994 | Bowen et al. | |
| 5,375,068 A | 12/1994 | Palmer et al. | |
| 5,381,477 A * | 1/1995 | Beyers et al. | 380/231 |
| 5,390,348 A | 2/1995 | Magin et al. | |
| 5,396,546 A | 3/1995 | Remillard | |
| 5,400,401 A | 3/1995 | Wasilewski et al. | |
| 5,404,393 A | 4/1995 | Remillard | |
| 5,404,505 A | 4/1995 | Levinson | |
| 5,410,326 A | 4/1995 | Goldstein | |
| 5,410,344 A | 4/1995 | Graves et al. | |
| 5,412,416 A | 5/1995 | Nemirofsky | |
| 5,414,426 A | 5/1995 | O'Donnell et al. | |
| 5,416,508 A | 5/1995 | Sakuma et al. | |
| 5,432,542 A | 7/1995 | Thibadeau et al. | |
| 5,438,372 A | 8/1995 | Tsumori et al. | 348/503 |
| 5,440,632 A | 8/1995 | Bacon et al. | |
| 5,442,452 A | 8/1995 | Ryu | |
| 5,442,626 A | 8/1995 | Wei | |
| 5,446,919 A | 8/1995 | Wilkins | |
| 5,461,667 A | 10/1995 | Remillard | |
| 5,469,206 A | 11/1995 | Strubbe et al. | |
| 5,473,362 A | 12/1995 | Fitzgerald et al. | |
| 5,477,262 A * | 12/1995 | Banker et al. | 725/38 |
| 5,477,263 A | 12/1995 | O'Callaghan et al. | |
| 5,479,266 A * | 12/1995 | Young et al. | 386/83 |
| 5,479,268 A | 12/1995 | Young et al. | |
| 5,481,294 A | 1/1996 | Thomas et al. | |
| 5,481,296 A | 1/1996 | Cragun et al. | |
| 5,481,542 A | 1/1996 | Logston et al. | |
| 5,483,278 A | 1/1996 | Strubbe et al. | |
| 5,500,794 A | 3/1996 | Fujita et al. | |
| 5,508,733 A | 4/1996 | Kassatly | 725/93 |
| 5,515,098 A | 5/1996 | Carles | |
| 5,550,863 A | 8/1996 | Yurt et al. | |
| 5,561,708 A | 10/1996 | Remillard | |
| 5,561,709 A | 10/1996 | Remillard | |
| 5,570,126 A | 10/1996 | Blahut et al. | |
| 5,629,733 A | 5/1997 | Youman et al. | |
| 5,635,989 A | 6/1997 | Rothmuller | |
| 5,644,354 A | 7/1997 | Thompson et al. | |
| 5,659,350 A * | 8/1997 | Hendricks et al. | 725/116 |
| 5,661,516 A | 8/1997 | Carles | |
| 5,663,757 A | 9/1997 | Morales | |
| 5,696,906 A | 12/1997 | Peters et al. | |
| 5,724,091 A | 3/1998 | Freeman et al. | |

| | | | |
|---|---|---|---|
| 5,758,257 A | 5/1998 | Herz et al. ............... 725/116 |
| 5,793,872 A | 8/1998 | Hirayama et al. |
| 5,917,537 A | 6/1999 | Lightfoot et al. |
| 5,940,073 A * | 8/1999 | Klosterman et al. ........ 345/721 |
| 6,025,837 A * | 2/2000 | Matthews et al. .......... 345/721 |
| 6,064,376 A * | 5/2000 | Berezowski et al. ......... 725/42 |
| 6,105,060 A * | 8/2000 | Rothblatt .................... 709/219 |
| 6,119,154 A | 9/2000 | Weaver et al. |
| 6,166,778 A | 12/2000 | Yamamoto et al. ........ 348/369 |
| 6,204,885 B1 | 3/2001 | Kwoh ........................ 348/564 |
| 6,331,877 B1 | 12/2001 | Bennington et al. |
| 6,539,548 B1 * | 3/2003 | Hendricks et al. .......... 725/109 |

FOREIGN PATENT DOCUMENTS

| | | |
|---|---|---|
| DE | 3423846 | 1/1986 |
| DE | 3935294 | 4/1991 |
| EP | 149536 | 1/1984 |
| EP | 103438 | 3/1984 |
| EP | 145063 | 6/1985 |
| EP | 158548 | 10/1985 |
| EP | 167237 | 1/1986 |
| EP | 187961 | 7/1986 |
| EP | 243312 | 10/1987 |
| EP | 281293 | 9/1988 |
| EP | 328440 | 8/1989 |
| EP | 0 340 643 A2 | 11/1989 |
| EP | 355697 | 2/1990 |
| EP | 399200 | 11/1990 |
| EP | 402809 | 12/1990 |
| EP | 420123 | 4/1991 |
| EP | 424648 | 5/1991 |
| EP | 425834 | 5/1991 |
| EP | 450841 | 10/1991 |
| EP | 506435 | 9/1992 |
| EP | 513553 | 11/1992 |
| EP | 513763 | 11/1992 |
| EP | 570785 | 11/1993 |
| GB | 1204190 | 9/1970 |
| GB | 2168227 | 6/1986 |
| GB | 2177873 | 1/1987 |
| JP | 6106015 | 3/1985 |
| JP | 6224777 | 2/1987 |
| JP | 2140134 | 6/1987 |
| JP | 1020454 | 1/1989 |
| JP | 2245167 | 3/1989 |
| JP | 1130683 | 5/1989 |
| JP | 1142918 | 6/1989 |
| JP | 3114375 | 5/1991 |
| JP | 3198119 | 8/1991 |
| JP | 5250106 | 9/1993 |
| TW | 238461 | 4/1992 |
| TW | 234223 | 11/1994 |
| TW | 235358 | 12/1994 |
| TW | 235359 | 12/1994 |
| TW | 236065 | 12/1994 |
| TW | 236744 | 12/1994 |
| WO | 8601962 | 3/1986 |
| WO | 8909528 | 10/1989 |
| WO | WO 89/12370 | 12/1989 |
| WO | 9010988 | 9/1990 |
| WO | 9100670 | 1/1991 |
| WO | 9103112 | 3/1991 |
| WO | 9211713 | 7/1992 |
| WO | 9212599 | 7/1992 |
| WO | 9217027 | 10/1992 |
| WO | 9221206 | 11/1992 |
| WO | 9322877 | 11/1993 |

OTHER PUBLICATIONS

Olshansky et al., "Subscriber Distribution Networks Using Compressed Digital Video", Nov. 1992.
Dinaro, et al., "Markets and Products Overview", 1991.
Advertisement, "Hong Kong Enterprise", Nov. 1988.
Advertisment, "Great Presentations", 1987.
Advertisment, "Consumer Dist.", Fall/Winter 1992.
van den Boom, "Interactive Videotex . . . ", Nov.-Dec. 1986.
Moloney, "Digital Compression in Todays . . . ", Jun. 6, 1993.
Bestler, "Flexible Data Structures . . . ", Jun. 6, 1993.
Sharpless, "Subscription Teletext for Value Added Servics", Aug. 1985.
Gelman et al., "A Store-and Forward . . . ", Jun. 21, 1991.
Hewlett, Packard Co., "HP-41C Operating Manual", Dec., 1982.
Sorce, et al., "Human Factors In Telecommunications," Sep. 1990.

* cited by examiner

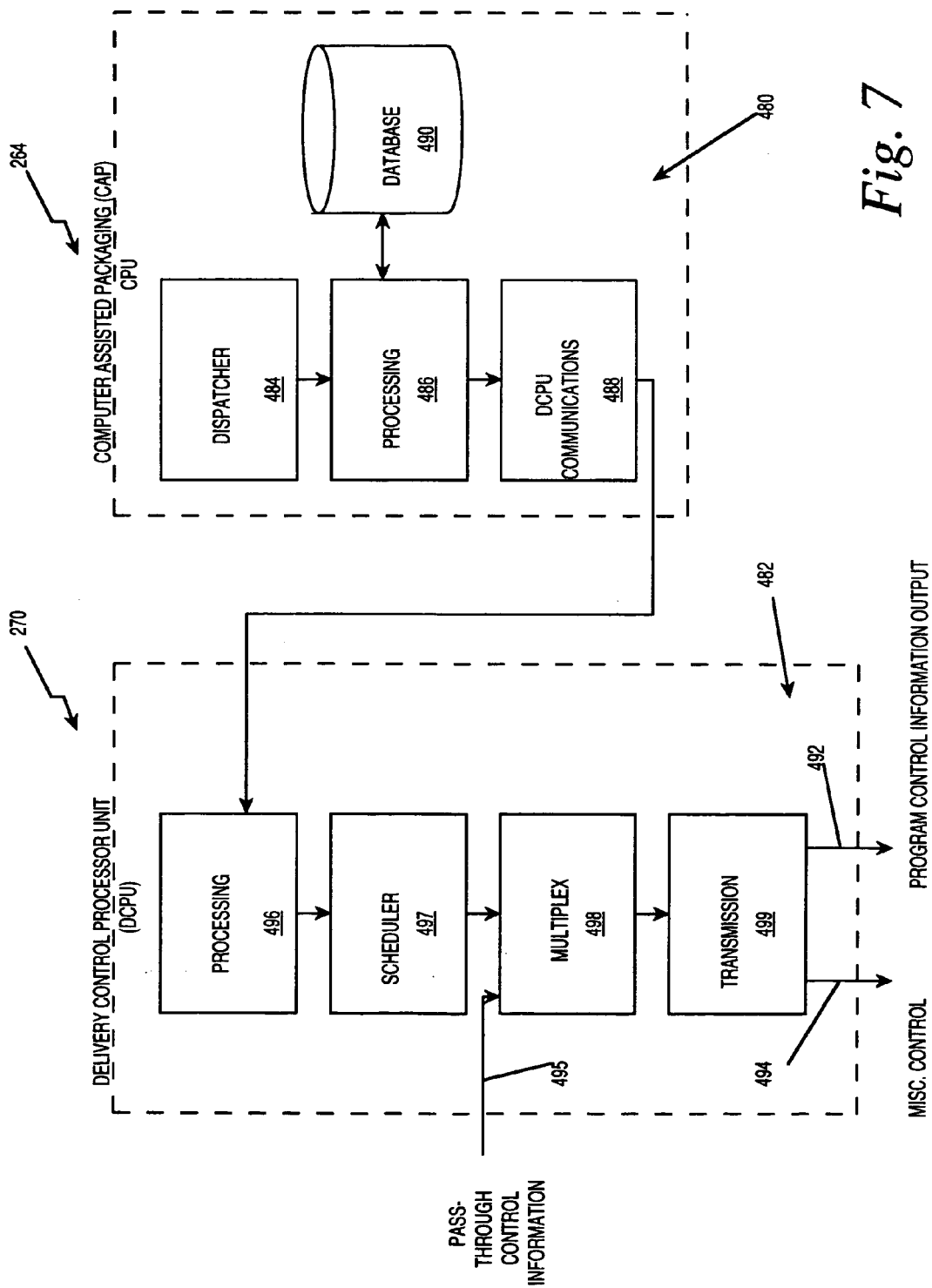

Fig. 13

SATELLITE MOVIE OPTIONS

| VCTV COMBO | COMP. RATIO | AVAILABLE MENUS (1,2 & 3) | PRIORITY ONE MENUS | PRIORITY ONE PLUS TWO MENUS |
|---|---|---|---|---|
| 1 | 8:1 | HIT MOVIES 8 MOVIE SELECTIONS WITH START TIMES EVERY 15 MINUTES | HIT MOVIES 6 MOVIE SELECTIONS WITH START TIMES EVERY 30 MINUTES | HIT MOVIES 6 MOVIE SELECTIONS WITH START TIMES EVERY 15 MINUTES |
| 2 | 8:1 | | | |
| 3 | 8:1 | | | |
| 4 | 8:1 | | | |
| 5 | 8:1 | | | |
| 6 | 8:1 | | | |
| 7 | 8:1 | | | |
| 8 | 8:1 | | | |
| 9 | 4:1 | SPORTS 8 SELECTIONS | SPORTS 2 SELECTIONS | SPORTS 4 SELECTIONS |
| 10 | 4:1 | | | |
| 11 | 8:1 | CHILDRENS 8 SELECTIONS | CHILDRENS 2 SELECTIONS | CHILDRENS 4 SELECTIONS |
| 12 | 8:1 | DOCS/NEWS 8 SELECTIONS | DOCS/NEWS 2 SELECTIONS | DOCS/NEWS 4 SELECTIONS |
| 13 | 8:1 | ENTERTAIN- MENT 8 SELECTIONS | ENTERTAIN- MENT 4 SELECTIONS | ENTERTAIN- MENT 6 SELECTIONS |
| 14 | 8:1 | SPECIAL- INTEREST CHANNELS 16 SELECTIONS | SPECIAL- INTEREST CHANNELS 4 SELECTIONS | SPECIAL- INTEREST CHANNELS 8 SELECTIONS |
| 15 | 8:1 | | | |
| 16 | 8:1 | PROMOS (1/6 SCREEN)48 | PROMOS (1/6 SCREEN)16 | PROMOS (1/6 SCREEN)48 |
| 17 | 8:1 or max | DATA STREAM | DATA STREAM | DATA STREAM |
| 18 | 8:1 or max | MUSIC 32 DIGITED STATIONS | MUSIC 4 DIGITED STATIONS | MUSIC 32 DIGITED STATIONS |

244     240     242

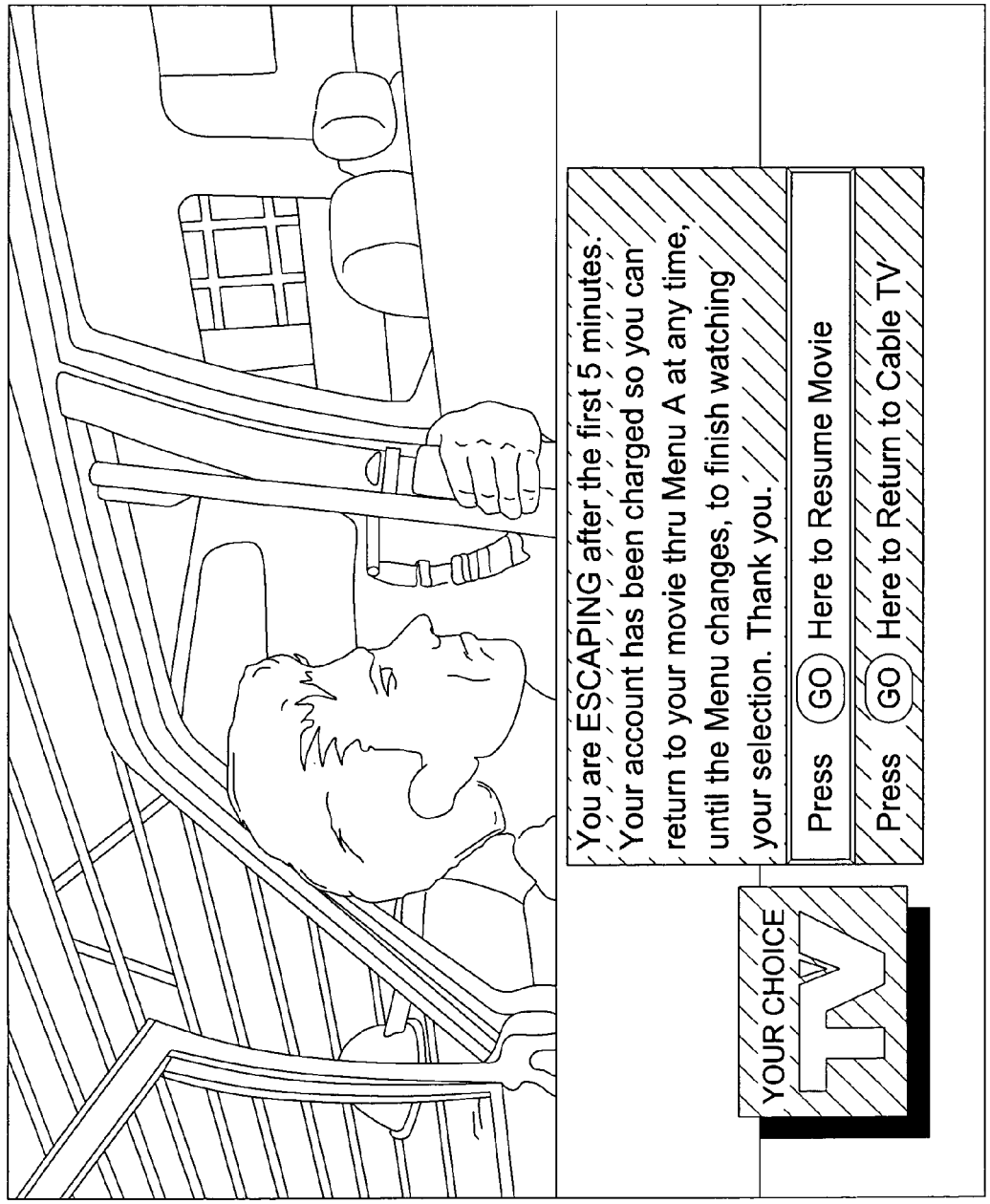

Thursday, October 26, 1994                7:51 PM

TENNIS FINALS:HOUSTON OPEN
Begins Friday evening at 6:00 ET on Menu B      LIVE!

Check out Menu B this Friday evening for both the men's and woman's finals in Houston. Woman's final at 6:00PM ET and Men's final immediately following. This event is live. Agassi, Becker, Seles and Graf won today.

$.95 Event scheduled for 5-6 hrs.  |  TO ORDER just select Menu B on Friday, 10/27

YOUR CHOICE TV

Press GO Here for Sports Events

Press GO Here to Return to Menu E

Press GO Here to Return to Cable TV

Thursday, October 26, 1994　　　　　　　　　　　　　　　8:04 PM

AIRLINE INFORMATION AND RESERVATIONS (continued)

Press(GO)on the ARIZONA airport you will DEPART:

| PHOENIX | FLAGSTAFF | TUCSON |
| PRESCOTT | YUMA | Minor Airport List |

Press(GO)on the DC airport you will ARRIVE:

| NATIONAL | DULLES | BWI |
| Check Flights to all Three D.C. Airports |||

Press(GO)on your preferred departure time:

| Morning | Mid-day | Late aft. | eve/night | anytime |

Press(GO)on your preferred arrival time:

| Morning | Mid-day | Late aft. | eve/night | anytime |

YOUR CHOICE TV

| Press(GO)Here To Continue |
| Press(GO)Here To Erase Above And Repeat |
| Press(GO)Here To Return To Cable TV |

Thursday, October 26, 1994                                8:06 PM

AIRLINE INFORMATION AND RESERVATIONS (continued)

You have selected SEATS: 23A, 23B
DELTA FLIGHT #49 from Phoenix to Dulles

Date: 11/25/94  Departs 8:00 AM and arrives 3:07 PM
One Way Fare: $295.00  23A        Round Trip Fare: $419.00  23A
              $295.00  23AB                        $419.00  23B
Total: $590.00                    Total: $838.00

Press(GO)Here to Select |ONE WAY| or |ROUND TRIP|

TO CONFIRM YOUR RESERVATION:

YOUR CHOICE — Press(GO)Here to Charge to Your Credit Card
              Press(GO)Here and an Agent Will Call You
              Press(GO)Here to Exit Without Reservation

Thursday, October 26, 1994                                    8:06 PM

AIRLINE INFORMATION
AND RESERVATIONS (continued)
CREDIT CARD CHARGE

Press(GO)on
Credit Card You
Want to Use:

| Amount: $590.00 | | Delta Flight #49 | |
| One Way: Phoenix to Dulles | | Date: 11/25/94 | |
| Departs: 8:00AM Arrives: 3:07 PM Dinner | | | |
| American Express | Visa | Discover | Master Charge |

Enter Your Credit Card Number:
2 1 7 7 7 3 5 8 1 1 7 3 6

Enter Expiration Date (example 0 9 9 7 ):
Month: 0 9  Year: 9 8

YOUR CHOICE

Press(GO)Here to Erase Above and Repeat

Press(GO)Here to Cancel Above and Exit

Press(GO)Here to Confirm Above Charge

1348

1350

MENU-DRIVEN TELEVISION PROGRAM ACCESS SYSTEM AND METHOD

RELATED APPLICATIONS

This application is a continuation of application Ser. No. 08/912,934, filed Aug. 15, 1997 entitled AN OPERATIONS CENTER FOR A TELEVISION PROGRAM PACKAGING AND DELIVERY SYSTEM, which is a continuation of application Ser. No. 08/160,282 filed Dec. 2, 1993 (now U.S. Pat. No. 5,659,350) entitled AN OPERATIONS CENTER FOR A TELEVISION PROGRAM PACKAGING AND DELIVERY SYSTEM which is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS.

The following other continuation-in-part applications, also based on the above-referenced patent application, are incorporated herein by reference:

U.S. Pat. No. 5,798,785, entitled REPROGRAMMABLE TERMINAL FOR SUGGESTING PROGRAMS OFFERED ON A TELEVISION PROGRAM DELIVERY SYSTEM, filed Dec. 2, 1993;

U.S. Pat. No. 5,600,364, entitled NETWORK CONTROLLER FOR CABLE TELEVISION DELIVERY SYSTEMS, filed Dec. 2, 1993;

U.S. Pat. No. 5,734,853, entitled SET-TOP TERMINAL FOR CABLE TELEVISION DELIVERY SYSTEMS, filed Dec. 2, 1993; Ser. No. 08/160,194, PCT/US93/11606, entitled ADVANCED SET-TOP TERMINAL FOR CABLE TELEVISION DELIVERY SYSTEMS, filed Dec. 2, 1993; and U.S. Pat. No. 5,559,549, entitled DIGITAL CABLE HEADEND FOR CABLE TELEVISION DELIVERY SYSTEM, filed Dec. 2, 1993.

TECHNICAL FIELD

The invention relates to television entertainment delivery systems that provide television programming to consumer homes. More particularly, the invention relates to a method and system that allows television program selection from a program menu.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better usability, interfaces and service, the television entertainment industry will also experience a switch from new technology driving the market to consumer usability driving the market.

In order for new television entertainment products to be successful, the products must satisfy consumer demands. TV consumers wish to go from limited viewing choices to a variety of choices, from no control of programming to complete control. Consumers do not wish to pay for one hundred channels when due to lack of programming information, they seldom, if ever, watch programming on many of these channels.

The concepts of interactive television, high definition television and 300–500 channel cable systems in consumer homes will not sell if they are not packaged, delivered and presented in a useable fashion to consumers. The problem is that TV programming is not being managed, packaged, delivered, and presented to consumers in a user friendly manner.

Consumers are already being bombarded with programming options, numerous "free" cable channels, subscription cable channels and pay-per-view choices. Any further increase in TV entertainment choices will likely bewilder viewers with a mind-numbing array of choices. The TV industry has traditionally marketed and sold its programs to consumers in bulk, such as continuous feed broadcast and long-term subscriptions to movie channels. The TV industry is unable to sell its programming in large quantities on a per unit basis, such as the ordering of one program.

In today's television world networks manage the program lineup for individual channels. Each network analyzes ratings for television shows and determines the appropriate schedule or program lineup to gain market share and revenue from advertising. Since each channel is in competition with every other channel, there is no coordinated effort to organize television programming in a manner that primarily suits the viewers.

Additionally, viewership fragmentation, which has already begun to decrease a channel's or program's market share, will increase. Programming not presented in a user friendly manner will suffer with a decrease in viewership and revenue.

And finally, with the imminent introduction of digital television technology, current television delivery systems do not have the capabilities or features necessary to operate in the digital environment.

SUMMARY OF INVENTION

This invention is an apparatus and a method that allows a viewer to select a television program from a program menu. Data related to the television programs are gathered at a central location such as an Operations Center, a television Broadcast Center, or Cable Television Headend. The central location organizes and packages television programming. In an embodiment, the Operations Center may generate program menus related to the programming. Alternately, the Operations Center may provide program menu data to remote locations. The remote locations may then generate the program menus based on the provided program menu data.

The Operations Center may also receive data on viewership behavior and may then use the data to assist in packaging programs for future viewing. The Operations Center is a particularly useful invention for television delivery systems which will provide users with the ability to select programs from on-screen menus.

The Operations Center may include a computer assisted packaging system (CAP), which uses hardware and software to control and transmit programming signals over a television delivery system. The CAP creates the program lineup or packaging of programs and the packaging of menu and control information for later transmission and use in the television delivery system. The CAP may generate graphical menu displays for user selection of television programs. The hardware and software for controlling and transmitting programming signals over the television delivery system is particularly useful in large television delivery systems that include satellite transmissions to cable headends.

The software of the CAP performs the functions of gathering analog and/or digital program signals from a variety of sources such as broadcast television, premium channels, video disk, and directly from television broadcasters. The software also packages the programs efficiently for the available bandwidth and for subscriber viewing through computer assisted creation of program line-up and allocation of bandwidth. The line-ups may be created to effectively group programming for display in menus by categories. Alternately, the program lineups could reflect specifically-allocated time/day slots. The television programs are packaged with the program control information (such as cost for viewing certain program) and menu information.

The Operations Center provides a method for remote management and control of local cable and CATV programs available and on-screen menu displays shown to subscribers. The Operations Center's computer software programs and hardware provide "real-time" control over cable and CATV systems. By transmitting appropriate control 2 information the Operations Center has the ability to change allocation of programs across physical channels, update menu information (from the Operations Center), reprogram menu formats and menu flow, and change or augment a packaged program signal sent to a particular region of the country. The Operations Center may remotely control certain features and software of the set top terminals and if necessary reprogram menu display software stored at the set top terminals.

In order to properly manage program lineups, the Operations Center may acquire viewer information on programs watched. Such viewer information includes information about the buy rates of specific shows, viewer preferences for programming, and the like, gathered by recording viewer transactions. A compilation of viewer information may be used to make decisions on future individualized program lineups and program packaging. In addition, allocation of menu space and construction of menus may be aided by the use of the viewer information. This information may be received from the set top terminals using a feedback loop, for example.

Subscribers may access an expanded television program package and view selected programs through a menu-driven access scheme that allows each subscriber to select individual programs by sequencing a series of menus. The menus are sequenced by the subscriber using simple alphanumeric and iconic character access, allowing the subscriber to access desired programs by simply pressing a single button rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs may be grouped by category so that similar program offerings are found on the same menu. Alternately, the menus may be organized by date/time and program channel, where a program channel includes all television programming that is to be provided on a single broadcast television channel.

An array of menu templates are generated by either a computer program within the set-top terminal or by the cable headend. The menu templates are generated using the program control information signals received from the Operations Center. A computer program within the set top terminal generates the on-screen menu displays and allocates a specific menu program option for each program signal. A combined alpha and numeric remote control device provides the subscriber interface to each program signal, allowing selection of a specific menu option which corresponds to a particular program signal.

At a given receive site, any of the compressed signals may be demultiplexed or individually extracted from the data stream and passed from the Operations Center or the cable headend over the cable system to the subscriber's set-top terminal. Within the set-top terminal, the individual compressed signals are decompressed and either placed in local storage (from which the menu template may be created), executed immediately, or sent directly to the screen. A combined alpha, numeric and iconic remote control device provides the subscriber interface to the system.

Through this interface, the subscriber may select desired programming through the system's menu-driven scheme or by directly accessing a specific channel by its actual number. The menu-driven scheme provides the subscriber with one-step access to all major menus, ranging from hit movies to specialty programs. From any of the major menus, the subscriber can in turn access submenus and minor menus by alpha character access. By using menu-driven, iconic or alpha-character access, the subscriber can access regular broadcast and basic cable television stations by using either the numeric keys on the remote control and pressing the corresponding channel number, or one of the menu icon selection options.

DESCRIPTION OF THE DRAWINGS

FIG. 7 is a block diagram showing a Delivery Control Processor Unit and a Computer Assisted Packaging Apparatus.

FIG. 13 is a diagram showing how three cable television systems each with a different bandwidth may use the program delivery system and operations center of the present invention simultaneously.

FIGS. 20a–20d show home menu screens.

FIG. 25a is a hit movie escape during program submenu.

FIGS. 47 and 48a–48d are drawings of submenus related to FIG. 46.

FIGS. 51a–51k are drawings of interactive services.

DISCLOSURE OF INVENTION

A. Television Program Delivery System Description

1. Introduction

Figure 1:
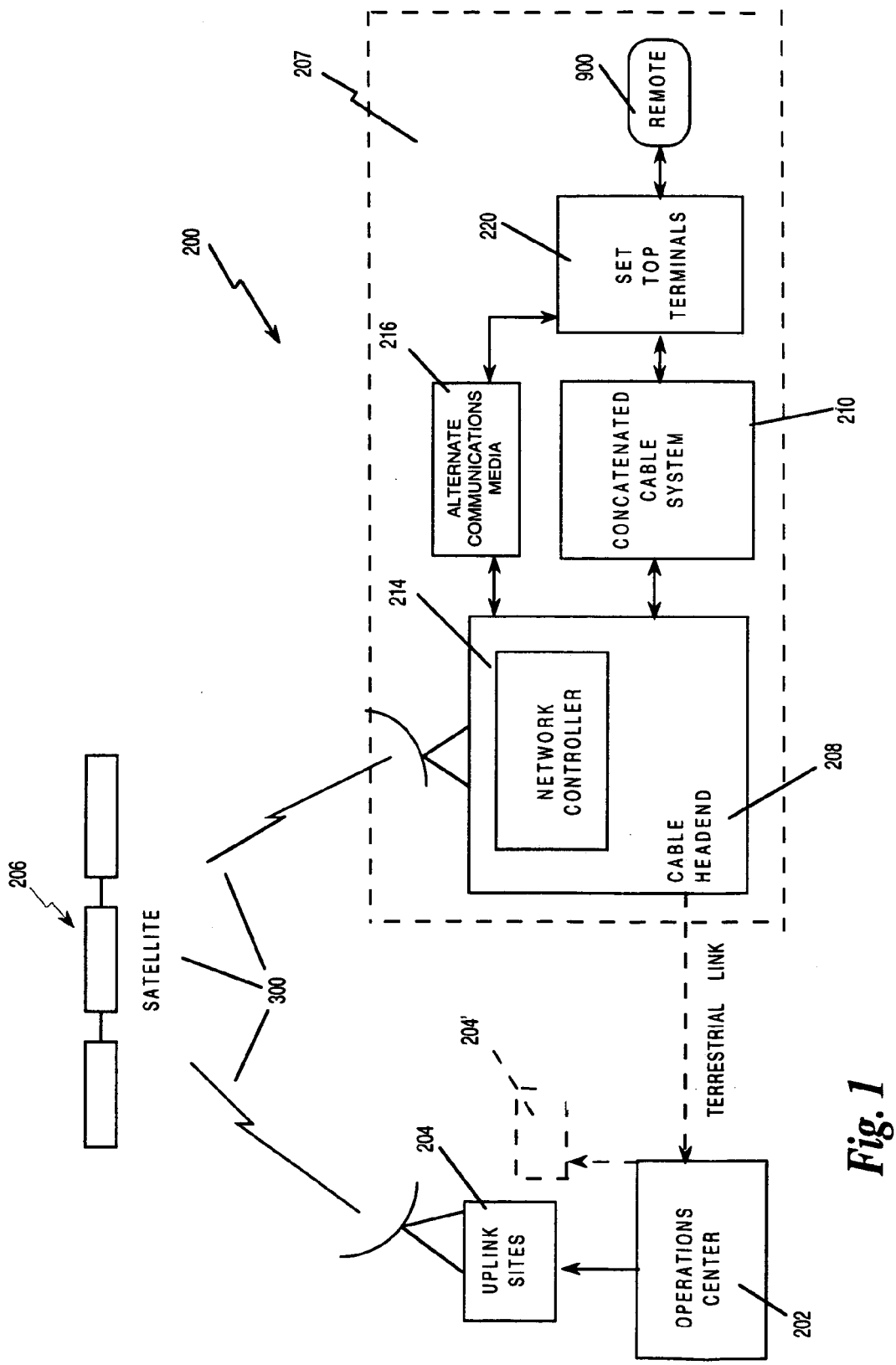
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. With the press of a single button, the subscriber can advance from one menu to the next or can select a program from a displayed menu. In this fashion, the subscriber can sequence the menus and select a program from any given menu. The programs may be grouped by category so that similar program offerings are found on the same menu. Alternately, the programs may be arranged by date and time of broadcast.

2. Major System Components

The program delivery system 200 may include (i) at least one operations center 202, where program packaging and control information are created and then assembled in the form of digital data, (ii) a digital compression system, where the digital data is compressed, combined/multiplexed, encoded, and mapped into digital signals for satellite transmission to a cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to set top terminals 220 located in each subscriber's home over the cable system 210. Although concatenated cable systems 210 are the most prevalent transmission media to the home, alternate communication media 216, including telephone lines, cellular networks, fiberoptics, Personal Communication Networks, satellite systems and similar technology for transmitting to the home may be used with the program delivery system 200.

The program delivery system 200 has a reception region 207 with an in-home decompression capablity. This capability is performed by a decompressor housed within the set top terminal 220. The decompressor remains transparent from the subscriber's point of view and allows any of the compressed signals to be demultiplexed and individually extracted from the composite data stream and then individually decompressed upon selection by the subscriber. The decompressed video signals may be converted into analog signals for television display. Such analog signals include NTSC formatted signals for use by a standard television. Alternately, the program delivery system 200 may provide digital signals that are displayed on a digital television.

Control signals are extracted and decompressed and then either executed immediately or placed in local storage such as a RAM located in the set top terminal 220. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In an embodiment, the subscriber interface is a combined alpha-character, numeric and iconic remote control 900, which provides direct or menu-driven program access. The remote control 900 also contains cursor movement and go buttons and alpha, numeric and iconic buttons. The remote control 900 used in conjunction with the menu arrangement enables the subscriber to sequence through menus by choosing from among several menu options that are displayed on the television screen. In addition, the subscriber may bypass several menu screens and immediately choose a program by selecting the appropriate alpha-character, numeric or iconic combinations on the remote control 900.

In an embodiment, the set top terminal 220 generates the menus that are displayed on the television by populating or creating arrays of particular menu templates, and the set top terminal 220 displays a specific menu or submenu option for each available video signal. Alternately, the menus may be created by the operations center 202 or the cable headend 208. The menus may then be broadcast to the set top terminals 220 over the concatenated cable system 210 or the alternate communication media 216. The menus may also be generated by a third party and be made available to the subscriber over the alternate communication media 216.

3. Operations Center and Digital Compression System

Figure 2:
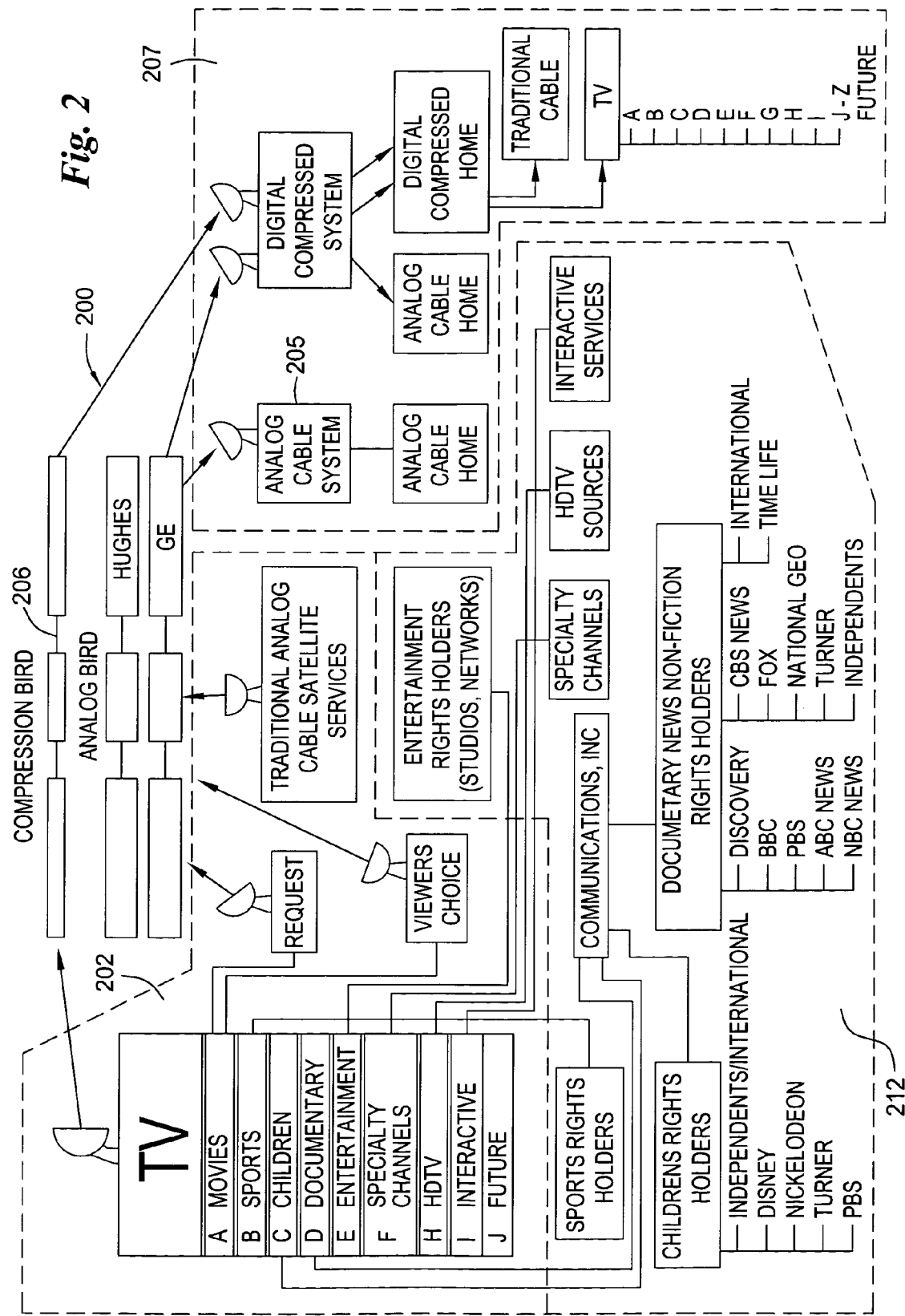
FIG. 2 is an overview of the television delivery system operations.

The operations center 202 performs two primary services, packaging television programs and generating the program control information signal. The operations center 202 may also generate the program menus. At the operations center 202, television programs are received from external program sources in both analog and digital form. FIG. 2 shows an embodiment of the operations center 202 receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM, for example. After receiving the programs, the operations center 202 may package the programs into the groups and categories that provide the optimal marketing of the programs to subscribers. For example, the operations center 202 may package the same programs into different categories and menus for weekday, prime-time viewing and Saturday afternoon viewing. The operations center 202 may package the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP may use demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder that are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After packaging the programs, the CAP creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

The program delivery system 200 may include a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over the satellite 206. Multiple cable headends 208 may receive such transmissions.

In addition to multiple uplink sites 204, the program delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 may receive and further process the signals before they are relayed to each set top terminal 220. Each cable headend site is generally equipped with multiple satellite receiver dishes. Each dish is capable of handling multiple transponder signals from a single satellite and sometimes from multiple satellites.

Figure 3:
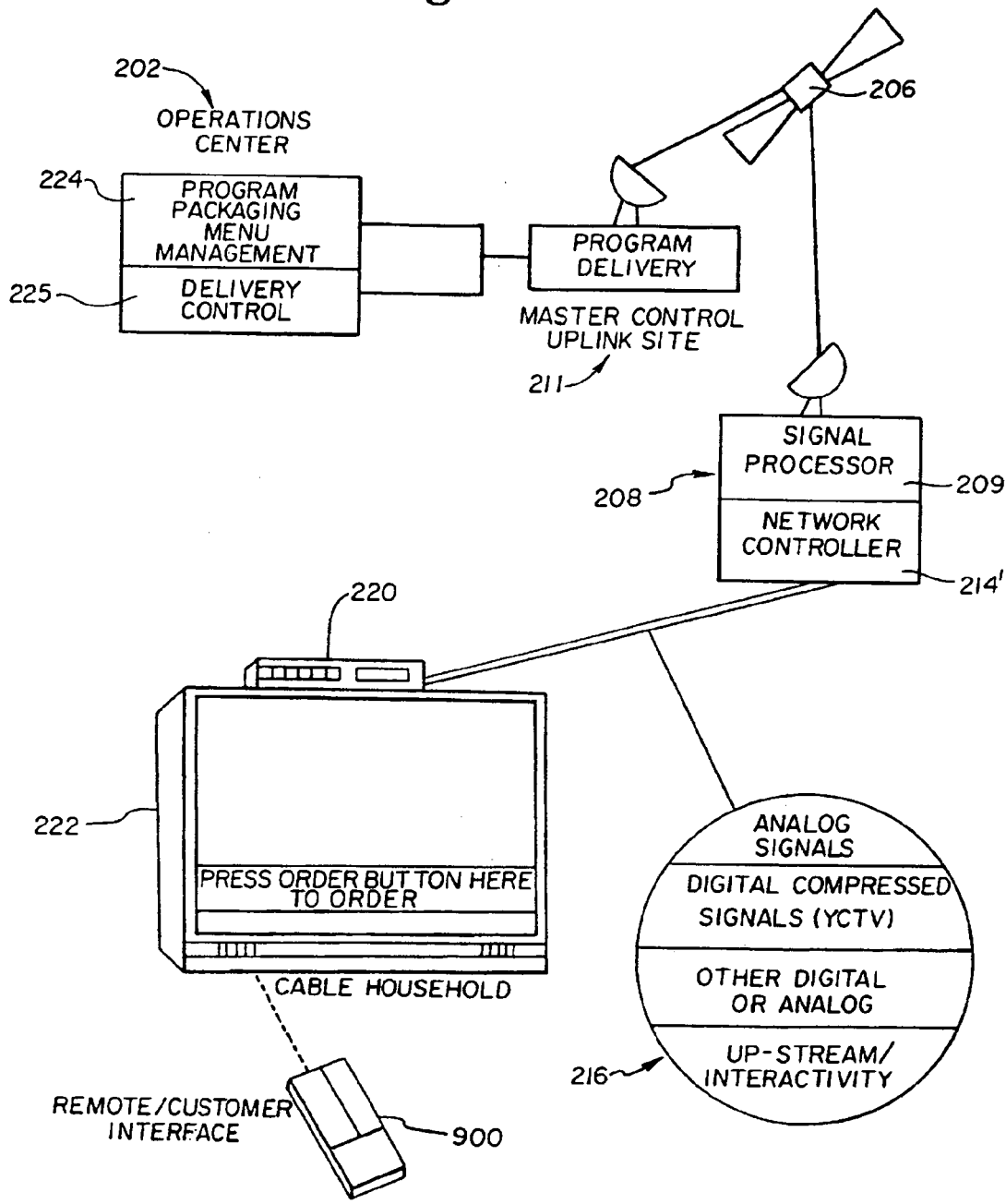
FIG. 3 is a schematic of the operation of the primary components of the system.

With reference to FIG. 3, as an intermediary between the set top terminals 220 and the operations center 202 and master control uplink site 211 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

FIG. 3 shows the cable headend 208 and the subscriber's home linked by certain communications media 216. In this particular embodiment, analog signals, digitally compressed signals, other digital signals and up-stream/interactivity signals are sent and received over the alternate communication media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. The signal processor 209 may re-route or demultiplex and recombine the signals and digital information received from the operations center 202 and allocate different portions of the signal to different frequency ranges. Cable headends 208 that offer different subscribers different program offerings may allocate the program signals from the operations center 202 in various manners to accommodate different viewers. The signal processor 209 may also incorporate local programming and/or local advertisements into the program signal and forward a revised program control signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the program delivery system 200. The network controller 214 manages the configuration of the set top terminals 220 and processes signals received from the set top terminals 220. In an embodiment, the network controller 214 monitors, among other things, automatic poll-back responses from the set top terminals 220 remotely located at each subscribers home. The polling and automatic report-back cycle occurs frequently enough to allow the network controller 214 to maintain accurate account and billing information as well as monitor authorized channel access. The information to be sent to the network controller 214 may be stored in RAM within each subscriber's set top terminal 220 and may be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the programdelivery system 200 to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

In an embodiment, the program delivery system 200 and digital compression system provides a one-way path from the operations center 202 to the cable headend 208. Status and billing information may be sent from the set top terminal 220 to the network controller 214 at the cable headend 208 and not directly to the operations center 202. Thus, program monitoring and selection control may take place only at the cable headend 208 by the local cable company and its decentralized network controllers 214 (i.e., decentralized relative to the operations center 202, which is central to the program delivery system 200). The local cable company may in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites. Finally, the set top terminal 220 may connect to a cable modem, thereby allowing two-way communication between the set top terminal 220 and the operations center 202 and/or the cable headend 208.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as antitaping encoding. However, it will become apparent from the discussion below that the set top terminal 220 is able to perform many functions that an ordinary converter box cannot perform.

The set top terminal 220 has a plurality of input and output ports for communication with other local and remote devices. The set top terminal 220 has an input port that receives information from the cable headend 208. In addition, the set top terminal 220 has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port. Finally, the set top terminal may connect to a cable modem for two-way communication and may connect to any of the alternate communication media 216.

Functionally, the set top terminal 220 is the last component in the delivery system chain. The set top terminal 220 receives compressed program and control signals from the cable headend 208 or, directly from the operations center 202. After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

In an embodiment, the set top terminal 220 stores menu templates for creating menus that are displayed on a subscriber's television by using an array of menu templates. Before a menu can be created, menu templates may be generated and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal 220 receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In an embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, and then demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 may be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades may enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, such as America On Line and other Internet access provides, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

Figure 52A:
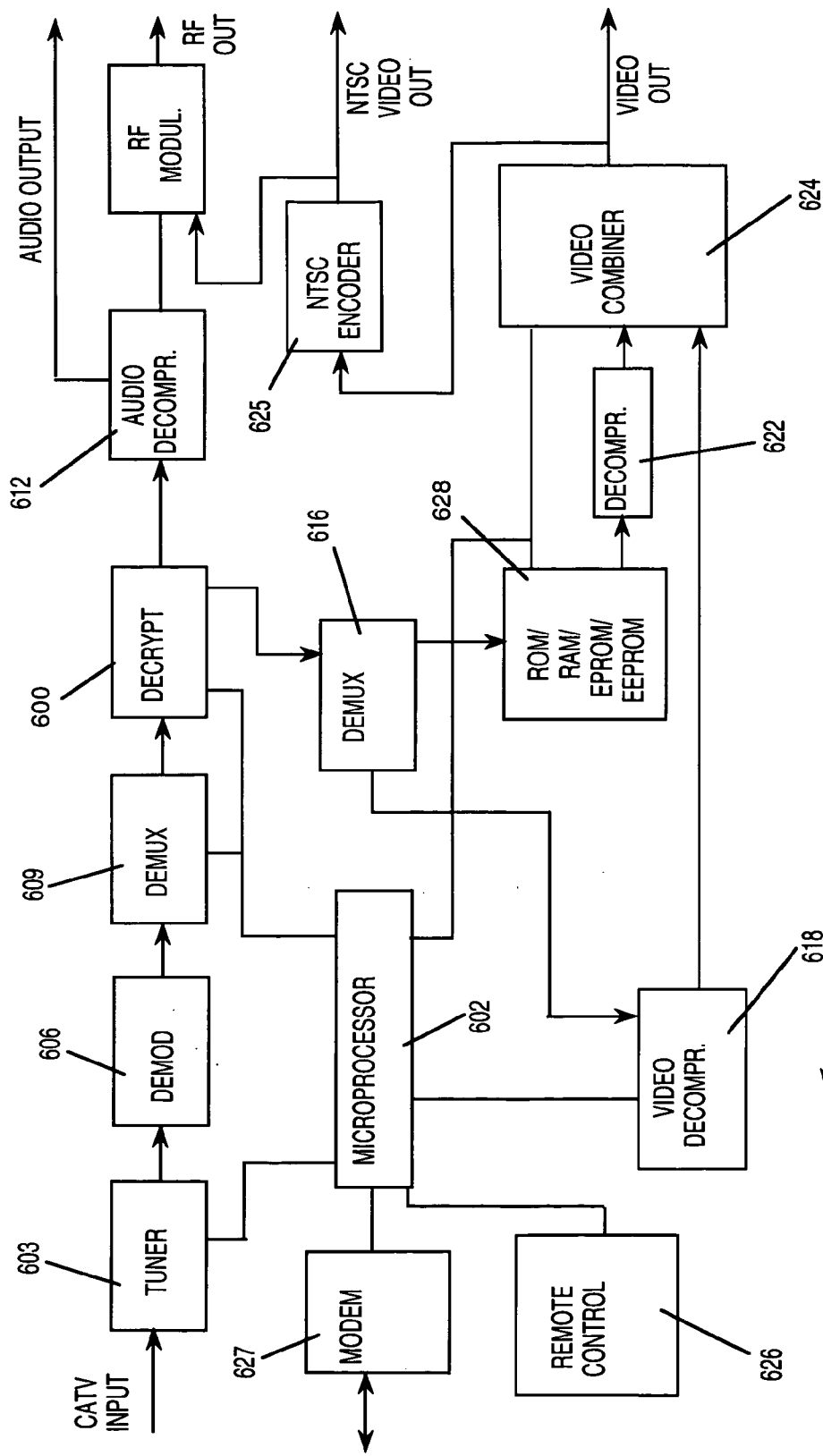
FIGS. 52a and 52b are block diagrams of hardware components for alternative set top terminals.

FIG. 52a is a block diagram of the hardware components of the set top terminal 220. The set top terminal 220 has a decryptor 600, tuner 603, digital demodulator 606, and demultiplexers 609, 616 as well as audio equipment 612, 614. Also shown in FIG. 52a is a remote control interface 626 for receiving and processing signals from a remote control unit 900. A modem 627 is provided for allowing communication between a microprocessor 602 and the cable headend 208 (not shown). An NTSC encoder 625 provides an NTSC video output.

The microprocessor 602 is capable of executing program instructions stored in memory. These instructions allow a user to access various menus by making selections on the remote control 900. The various program instructions for accessing menus and performing other functions are described below.

The manner in which the video is decompressed and the menus are generated from the program control signal varies depending on the specific embodiment of the invention.

However, at a minimum, one video decompressor 618 capable of decompressing one video signal will be used. Basic menu format information may be stored in a graphics memory 628 comprising ROM, non-volatile RAM, EPROM, and/or EEPROM 620. If compressed graphics are used, a second decompressor 622 is used to generate menus. In one embodiment (not shown), a separate decompressor is used to process the program control information signal and a video combiner incorporates video and menu graphic information. The program control information signal may be sent with three primary parts, compressed video for menu display (or video location information), compressed graphics, and text. After the program signal is demultiplexed into its component parts, a video decompressor 618, a graphic decompressor 622, a text generator (shown in FIG. 52b at 623) and a video combiner 624 are used to assist in creating the menus.

Figure 52B:
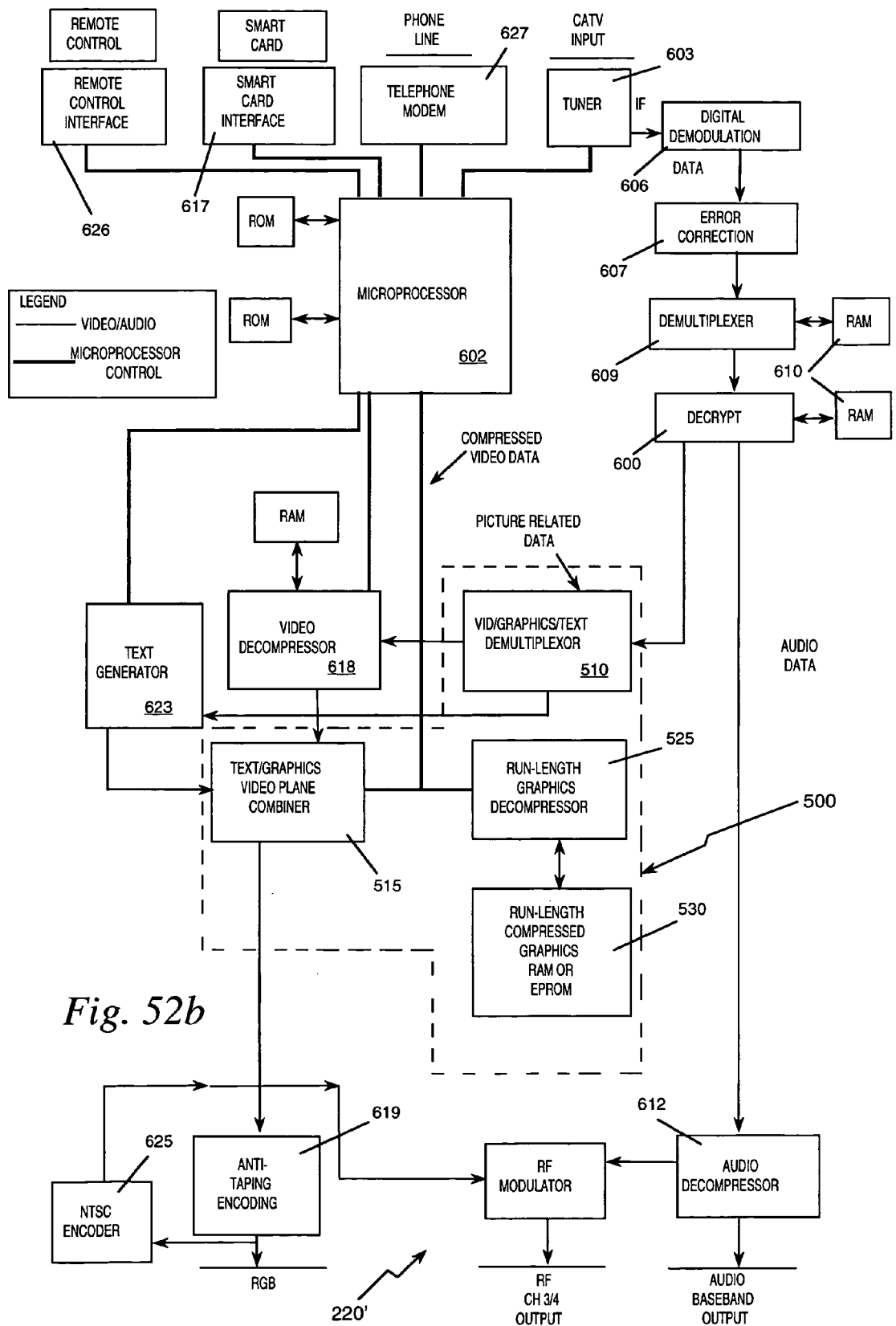

FIG. 52b is a block diagram of an alternative digital compression set top terminal 220'. The same components shown in FIG. 52a are repeated in FIG. 52b, and given the same reference numbers (e.g., tuner 603, modem 617, NTSC encoder 625, etc.). FIG. 52b also shows the addition of an expansion card interface 617 to allow additional features to be included on an expansion card (not shown) insertable into the expansion card interface 617. Error correction circuitry 607 is also shown receiving the demodulated signal, prior to demultiplexing the signal. Memory 610 associated with the microprocessor 602, the demultiplexer 609, the decryptor 600, and the video decompressor 618 is shown in FIG. 52b.

The elements of an upgrade module 500, (connected to a basic decompression box 520) are shown (in the dotted box) in FIG. 52b. The circuitry in the upgrade module 500 includes a video, graphics and text demultiplexer 510, a text, graphics, and (video plane) video combiner 515, a graphic decompressor 525 and a graphics memory 530. The graphics stored in memory 530 is preferably run-length compressed. However, other methods of compressing graphics known by those skilled in the art may be used with the present invention.

The generated menus and video are combined in the video combiner 515 and output to an anti-taping encoder 619. Any method of anti-taping encoding known by those skilled in the art may be used with the present invention.

Figure 53A:
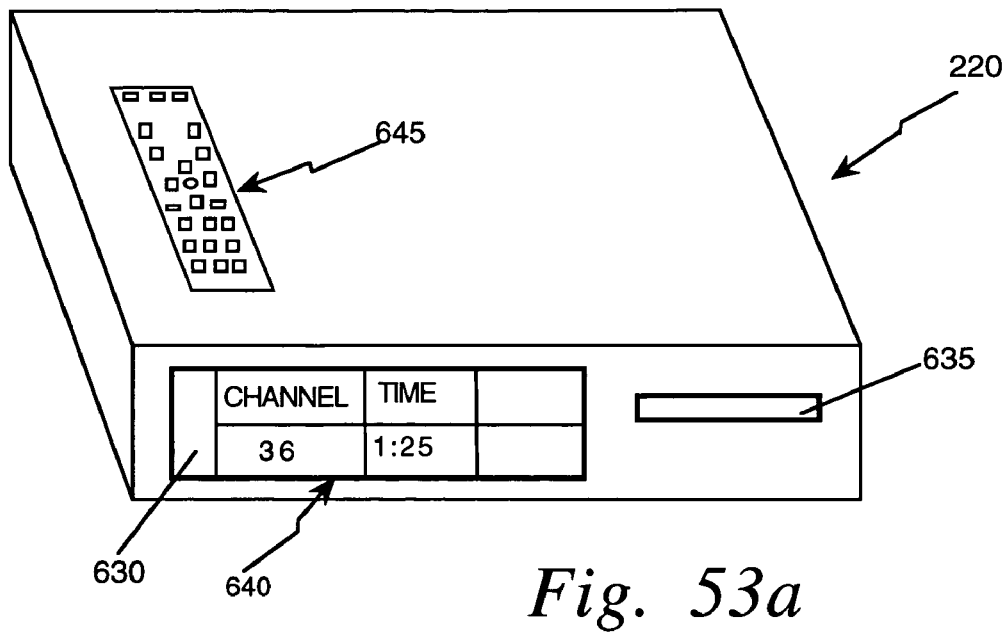
FIGS. 53a and 53b are front and back views, respectively, of an embodiment of a set top terminal.
Figure 53B:
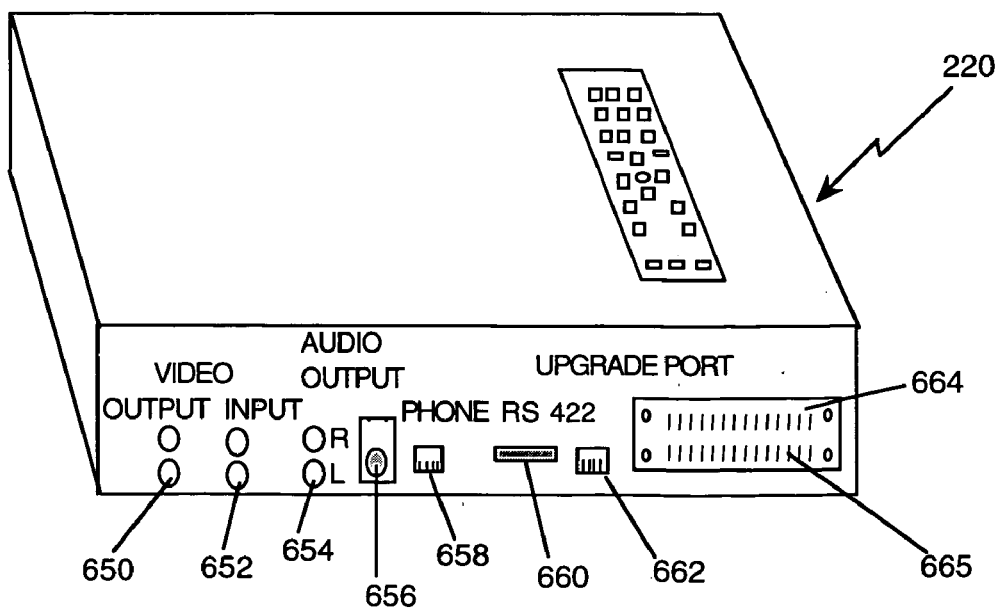

FIGS. 53a and 53b show front and back views respectively for an embodiment of the set top terminal 220. The front panel of the set top terminal 220 includes an infrared sensor 630 and a series of LED displays 640. These LED displays 640 may indicate with an icon or a letter (e.g., A–K) the major menu currently selected by the set top terminal 220 or the channels selected directly by a user, or menu channel selections (e.g., from 1 to 50). This visual display will remain lit while the subscriber is watching (or listening to) programming within a major menu.

LEDs 640 are preferably provided to indicate a decompression error, a processing error, or other error. Text messages may be displayed on LEDs. During the normal functioning of the set top terminal 220, the LED display 640 can be customized by the user to display the time, the program channel, VCR activation or other pertinent information. Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220.

The LEDs 640 may also provide an indication of the digital audio channel currently tuned. With this display feature, subscribers may use the digital audio feature without activating the television screen. The signal source and output selected (e.g., a subscriber's separate audio system, a VCR, etc.) may be displayed. Although LEDs are preferred, the set top terminal 220 may also use a CRT, LCDs, or other display technology.

The set top terminal 220 includes a flapped opening 635 on its front that allows the insertion of a magnetic cartridge (or similar portable storage device, including optical disk, ROM, EPROM, etc., not shown). This opening 635 allows the set top terminal 220 to be upgraded or reprogrammed locally with the use of the applicable magnetic or optical storage device.

On the top or cover of the set top terminal 220 are pushbutton controls 645. Preferably these pushbutton controls 645 duplicate the two-part alpha-iconic remote control 900. Any function that can be performed on the remote 900 may also be performed at the set top terminal 220 using the duplicative pushbutton controls 645.

FIG. 53b shows the back of the set top terminal 220 which includes the input/output ports of the terminal 220. The input/output ports include a pair of output terminals 650, a pair of input terminals 652, a pair of stereo/audio output terminals 654, a satellite dish input port 656, a telephone jack 658 and an RS422 port 660. One of the output terminals 650 is for a television and the other is for a VCR. The set top terminal 220 is equipped to handle incoming signals on one or two cables using the input terminal 652. The phone jack 658 and RS-232 or RS422 port 660 are provided for maintenance, trouble shooting, reprogramming and additional customer features. In alternate embodiments, the telephone jack 658 may be used as the primary mode of communication between the cable headend 208 and the set top terminal 220. This connection is possible through local telephone, cellular telephone or personal communications networks (PCN).

The basic programming of each set top terminal 220 will be located on ROM within the set top terminal 220. Random access memory, the magnetic cartridge capability, and the extension card slot 635 allow upgrades and changes to be easily made to the set top terminal 220.

In an embodiment, the set top terminal 220 includes a hardware upgrade port 662 as shown in FIG. 53b, in addition to expansion card slots 665. Each expansion slot 665 is covered by the metal plate cover 664. The hardware upgrade port 662 accommodates a four-wire (or more) connection for: (1) error corrected, decrypted data output of the set top terminal 220, (2) a control interface, (3) decompressed video output of set top terminal 220, and (4) video input port. In an embodiment, multiple wires are used to perform each of the four functions. Typically, the four sets of wires are combined in a single cable with a single multipin connector.

In an embodiment, multipin connections may be used for multiwire cable. The multipin connection 662 may range from DB9 to DB25. A variety of small computer system interface (SCSI) ports may also be provided. Alternatively, four or more ports may be provided instead of the single port 662 depicted. Port 662 may also be used to attach various hardware upgrades to a set top terminal 220.

An embodiment has five hardware upgrades available for use with a set top terminal 220, including: (1) Level A interactive unit, (2) a Level B interactive unit, (3) Level C interactive unit with compact disc capability, (4) Level D digital radio tuner for separate room use, and (5) Level E information download unit. Each of these upgrades can be connected to the set top terminal 220 unit through the upgrade port 662.

The memory in the set top terminal is used to store the graphical and textual components of menus. Specifically, background, logo, menu display, and cursor graphical files are stored, as well as long term, intermediate, and short term text.

Existing set top converter boxes such as those made by Scientific Atlanta or General Instruments are presently unequipped to handle the menu selection system of the present invention. Thus, hardware modifications are necessary in order to use the menu selection system with existing set top converter technology.

Figure 54:
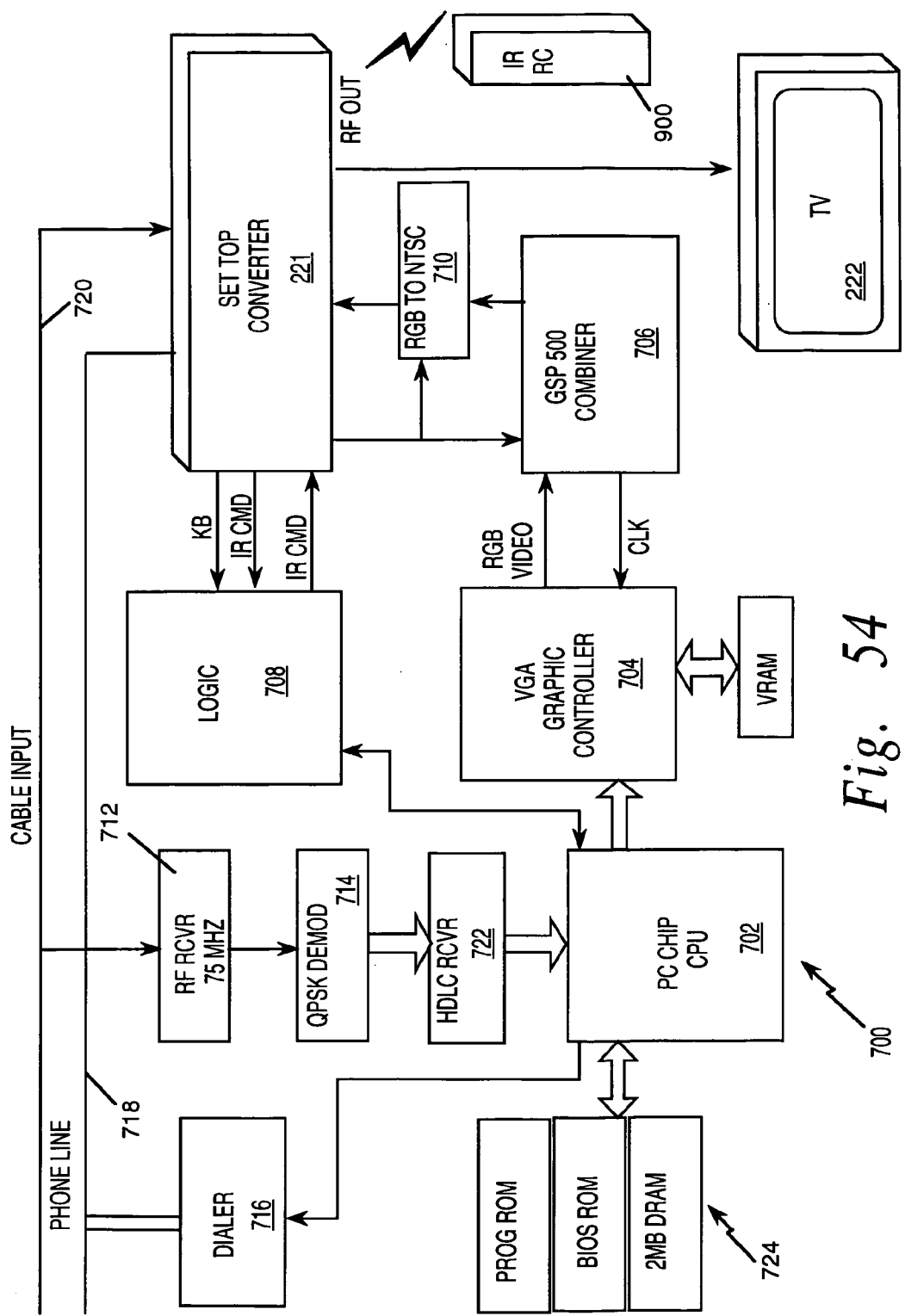
FIG. 54 is a block diagram of a hardware upgrade for a set top converter.

FIG. 54 shows a Turbo Card 700 addition to a set top converter 221. The Turbo Card 700 provides the additional functionality needed to utilize the menu system of the present invention with existing set top converter technology. The primary functions the Turbo Card 700 adds to the set top converter are interpreting of program control information signals, generating of menus, sequencing through menus, and, ultimately, the ability of the viewer to select a channel through the menu system without entering any channel identifying information. The Turbo Card 700 also provides a method for a remote location, such as the cable headend 208, to receive information on programs watched and control the operation of the set top converter 221 and Turbo Card 700. The programs watched information and control commands may be passed from the cable headend 208 to the Turbo Card 700 using telephone lines 718.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. Preferably these components are located on a single circuit card.

The Turbo Card 700 has two connections coming from outside the viewer home: (1) a telephone connection 718, preferably with an RJ11C jack for communicating with the cable headend 208, and (2) a standard coaxial cable input 720. In addition to the two connections from outside the viewer home, the Turbo Card 700 must be electronically connected to the set top converter 221. Preferably this connection is made with a ribbon cable connection with forty or more pins (not shown).

The information that is passed between the set top converter 221 and the Turbo Card 700 includes data and infrared commands. Preferably video input and output to the set top converter 221 is through 75 ohm coax cable. In an embodiment, the infrared commands of the remote control 900 are passed through (undisturbed from) the set top converter and to the Turbo Card 700. After interpretation and modification by the Turbo Card 700, the infrared commands are then returned to the set top converter 221 through the ribbon cable. Video signals are received by the Turbo Card 700 from the set top converter 221, manipulated by the Turbo Card 700, and returned to the set top converter 221 in NTSC format by the NTSC encoder 710. The Turbo Card 700 may also generate graphics which are passed to the set top converter 221 via the NTSC encoder 710.

The Turbo Card 700 utilizes the capability of the set top converter 221 as much as possible to avoid duplication of components. For example, the Turbo Card 700 uses the set top converter's tuner thus avoiding the cost of an additional tuner.

The PC Chip CPU 702 is used for controlling the components of the Turbo Card 700. The PC chip 702 is also used to perform database management, billing and data logging functions. All peripherals may be interfaced to the PC chip CPU 702 through an industry standard architecture (ISA) bus. The memory on the card may be an EPROM or other similar device. Typically, an EPROM containing BIOS programs is used in this embodiment. Two BIOS programs, the PC chip BIOS and the VGA controller BIOS, are the primary contents of the EPROM. This EPROM also contains the equivalent of a C: hard drive. This hard drive is similar to those found on a PC which provides the means to "boot" the DOS Operating System. The card also includes a DRAM, and most of this memory is used as a RAM drive after the Turbo Card 700 boots up.

A video combiner 706 is used to combine RGB video created by the Graphics Controller 704 with video from the set top converter 221. The NTSC encoder 710 is used to convert RGB and sync signals into an NTSC format signal that can be used by a standard television 722. In an alternative embodiment, the synch signal is eliminated.

The Turbo Card 700 hardware may be implemented on a board built into the set top converter 221 or, alternatively, using plug-in slots. The embodiment shown uses a Dual Tone Multi-Frequency (DTMF) dialer 716 to initiate telephone transmissions. Such an interface uses DTMF tones, or pulse dialing, to make a telephone connection. The same DTMF tones used to initiate the call, communicates data from the PC chip CPU 702 upstream to the network controller 214 or operations center 202. Such upstream data may include purchase, logging and viewing information. The embodiment shown in FIG. 54 may be modified to transmit information upstream to the cable headend 208 through the coaxial cable 720, thereby eliminating the need for telephone lines.

Functionally, the Turbo Card 700 operates by receiving the program control information signal from the cable headend 208 through the coaxial cable 720. The program control information signal is used by the PC chip CPU 702 after being processed through an RF receiver 712, a quadrature phase shift keyed (QPSK) demodulator 714, and an HDLC serial receiver 722. This receiver 712 demodulates any data transmissions at a fixed frequency of 108 MHz. Typically, the card receives and demodulates 108 MHz FSK carrier signals, having a data rate of 56 kilobits. In an embodiment, a 1.5 megabyte QPSK encoded signal is used.

Once such signals are received, the contents of the signals are stored in the card's databases. Each signal's content is commonly structured in Synchronous Data Line Control (SDLC) format. Other formats, such as HDLC, may also be used. The HDLC/SDLC receiver 722 processes the demodulated signal from the 108 MHz FSK or QPSK receiver demodulator 714, which provides a clock and data synchronously into the HDLC/SDLC receiver during such processing. The HDLC/SDLC receiver 722 presents the data stream (or packets) to the PC chip CPU 702 for storage. The stored data packets form the basis for the data base files and other information, which have been downloaded from the cable headend 208 to the Turbo Card 700.

The VGA controller 704 is used to generate new graphics. The VGA graphic controller 704 is an industry standard VGA controller chip. The VGA controller 704 receives its dot clock from the combiner 706. The combiner 706 receives a sync signal from any incoming NTSC video signals provided by the set top converter 221. Typically, the combiner 706 strips sync information from each NTSC video signal and uses it to generate each dot clock used by the VGA controller 704. In this way, the combiner 706 synchronizes the VGA controller 704 to the incoming NTSC-formatted cable TV signal. Such synchronization allows VGA graphics to be displayed on the users's television 722 alone or in conjunction with NTSC video.

In an embodiment, the logic block is enhanced to make use of the sync signal extracted from the separate portion of the set top converter 221. This enhancement allows the VGA controller 704 to be injection-locked directly with the sync signal using some additional circuitry. In this embodiment, the combiner 706 phase locks the VGA controller's dot clock to the NTSC video clock to accomplish the synchronization described above.

The logic circuitry of the Turbo Card 700 receives the data, infrared commands, and synchronization from the set top converter 221. When the Turbo Card 700 has finished processing and modifying the IR command it returns the command to the set top converter 221 for further processing. When appropriate, the VGA graphics controller 704 generates menu screen graphics which are combined with video by the video combiner. The menu, with video, is now in RGB format and is encoded into standard NTSC format by the NTSC encoder 710.

The RGB to NTSC encoder 710 accommodates the overlay of graphics and video. This encoder 710 makes use of two input signals: (1) a NTSC video signal and (2) an analog RGB signal. The RGB signal comes from the VGA controller 704. On a pixel-by-pixel basis, the encoder 710 can choose between sending its output to the TV screen in either NTSC or RGB signal format. This allows graphics to be displayed on the screen alone or in conjunction with NTSC video on a pixel-by-pixel basis.

The Turbo Card's logic is customized to interface the PC chip to existing set top converters. The logic includes the ability to scan the keypads (not shown) that are present in the set top converter 221 for keystroke entry and also the ability to receive infrared commands from the set top converter's remote control. Any keystroke entries and commands generate a signal that is sent to the PC chip CPU 702 for processing by the application software. Likewise, the Turbo Card 700 has the ability to simulate a serial infrared command and send it to other set top converter components. This allows the PC chip CPU 702, along with its software, to control the set top converter 221.

Menu selections made by the viewer on the remote control 900 are received by the IR equipment of the converter 221 and passed through to the Turbo Card 700. The Turbo Card software interprets the IR signal and determines the program (or menu) the viewer has selected. The program selection information is sent by the Turbo Card software to the set top converter 221 by modifying the IR command. The modified IR command contains the channel information needed by the set top converter 221.

6. Remote Control Device

The primary conduit for communication between the subscriber and the set top terminal 220 is through the subscriber interface, preferably a remote control device 900. Through this interface, the subscriber may select desired programming through the program delivery system 200 menu-driven scheme or by directly accessing a specific channel by entering the actual channel number. Using the interface, the subscriber can navigate through a series of informative program selection menus. By using menu-driven, iconic or alpha-character access, the subscriber may access desired programs by simply pressing a single button rather than recalling from memory and pressing the actual channel number to make a selection. The subscriber may access broadcast and basic cable television stations by using either the numeric keys on the remote control 900 (pressing the corresponding channel number), or one of the menu icon selection options.

In addition to enabling the subscriber to easily interact with the program delivery system 200, the physical characteristics of the remote control 900 add to the user friendliness of the system. The remote control 900 easily fits in the palm of the subscriber's hand. The buttons of the remote control 900 contain pictorial symbols that are easily identifiable by the subscriber. Also, buttons that perform similar functions may be color coordinated and consist of distinguishing textures to increase the user friendliness of the system. To ensure maximum ease of use, the remote control 900 may operate using infrared signals. Alternatively, the remote control 900 may operate using radio frequency signals.

7. Menu-Driven Program Selection

In an embodiment, the program delivery system 200 provides program menus. This menu-driven scheme provides the subscriber with one-step access to all major menus, ranging from hit movies to sport specials to specialty programs. From any of the major menus, the subscriber may in turn access submenus and minor menus by cursor or alpha-character access. The subscriber may then select a desired program to view by simply pushing a single "go button" for example.

There are two different types of menus: the Program Selection menus and the During Program menus. The first series of menus, Program Selection menus, consists of an Introductory menu, a Home menu, Major menus, and Submenus. The second series of menus, During Program menus, include Hidden menus and the Program Overlay menus.

Immediately after the subscriber turns on the set top terminal 220 or the attached television, the Introductory menu welcomes the subscriber to the system. The Introductory menu may display important announcements from the local cable franchise, advertisements from the cable provider, or other types of messages. In addition, the Introductory menu may inform the subscriber if the cable headend 208 has sent a personal message to the subscriber's particular set top terminal 220.

After the Introductory menu is displayed, the subscriber may advance to the next level of menus, namely the Home menu. In an embodiment, after a certain period of time, the program delivery system 200 will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) may be displayed by the set top terminal 220 only after the subscriber has selected a television program. In order to avoid disturbing the subscriber, the set top terminal 220 may not display the Hidden Menus until the subscriber selects the appropriate option to display a Hidden Menu. The Hidden Menus contain options that are relevant to the program selected by the subscriber. For example, a Hidden Menu may contain options that enable a subscriber to enter an interactive mode, connect to an Internet service provider such as America On Line, or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Operations Center With Computer Assisted Packaging System

Figure 4:
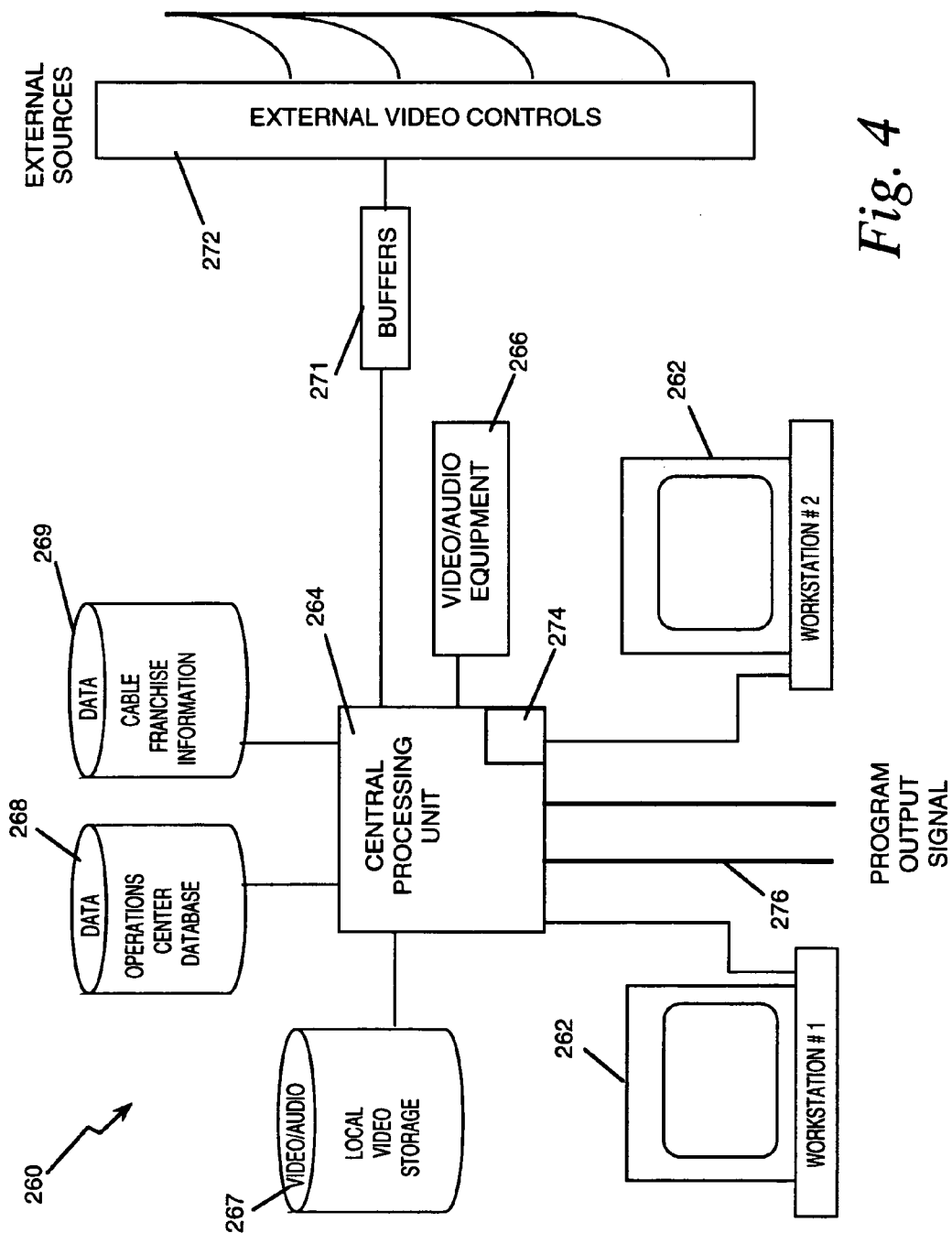
FIG. 4 is a schematic of the primary components of the Computer Assisted Packaging System (CAP).

FIG. 4 shows the computer assisted packaging system (CAP) 260 of the operations center 202. The primary components of the CAP 260 include multiple packager workstations 262, a central processing unit 264, video/audio editing equipment 266, and one or more databases 268 and 269. Additional remotely located databases, such as local video storage database 267, and buffers 271 and controllers 272 for external program feeds make up the peripherals of the CAP system 260.

The CAP 260 includes the central processing unit 264 that communicates with all the components of the CAP 260. The central processing unit 264 may be a powerful personal computer (PC), a mini-computer, a mainframe or a combination of computing equipment operating in parallel. The central processing unit 264 includes all the necessary interconnections to control peripheral equipment such as the external video controls 272. The central processing unit 264 has sufficient memory 274 to store the program instructions of the subroutines which operate the CAP 260.

The CAP 260 receives data from one or more databases, such as the operations center database 268 and the cable franchise information database 269 shown in FIG. 4. In addition, separate databases may be maintained of viewer information, such as demographics and programs viewed. The CAP 260 may control the reception of external sources by enabling and disenabling the external video controls 272. The external video controls 272 include buffers to delay as necessary external programs received by the operations center 202.

The CAP 260 may retrieve viewer data, and assimilate that data into the program packaging method (especially the menu configuration) as discussed with reference to FIG. 8 MII 402. This involves two main steps, first, retrieval of raw data from the set top terminals 220, and then filtering and presenting that data. Each cable headend 208 compiles the viewer data, and then sends it verbatim to the operations center 202. This raw data is necessary because different responsibilities of the operations center 202 require different parts of the raw information. Also a record must be kept of overall data. Once the data is assembled at the operations center 202, the data is filtered for each application.

The raw data gathered includes but is not limited to:
Which programs a viewer purchased and when it was purchased; and
Which channel a specific viewer watched and for how long.
This information can then be used to calculate the following:

How many viewers watched a particular program;
Peak viewing times for different categories of shows; and
Buy rates for particular menu positions.

Menu creation, both automatically and manually, is a CAP 260 function that involves the incorporation of the raw data. An automated software procedure analyzes the data and, using certain heuristics, creates the menus.

One heuristic, for example, is that when a show is not ordered frequently, it is moved closer to the top of the menu for greater visibility. The filtering of the program data allows it to be sorted and indexed for display to the user. The program data may be filtered into a new database containing program names and indexed by the number of times each program was purchased. The program data may also be indexed by buy times and program categories.

Certain metrics are established to help in evaluating the data. Sales by menu placement, cost, category and lifespan can be retrieved for viewing in graphic presentation. The graphic presentation, in the form of line or bar graphs, help the packager recognize any trends in the data. For example, the first movie on a movie menu might not have sold as well as a second movie listed. A chart can be retrieved to show that the first movie has been at the top of the menu for two weeks and buy rates are naturally falling off. Steps can then be taken to move items in the menus to correct this, though many of these steps are automated in the menu creation system.

The automated procedures create menus that are distinct between different cable headends 208 because of demographic differences in the viewing audience. To help with this, a separate database of subscriber demographics exists and is frequently updated. The cable headends 208 are able to alter the menu positions in order to further tailor the presentation, or to add local shows. Any changes to the menus are sent back to the operations center 202 at the same time as the viewer data, in order to prevent erroneous data analysis. Menu changes at the cable headend are described in detail in U.S. Pat. No. 5,600,364, entitled Network Controller for a Cable Television System, the disclosure of which is hereby incorporated by reference.

Another use for the indexed data is creation of marketing reports. Programming changes are helped by accurate information of subscriber preferences. Also subscriber purchasing trends, and regional interests can be tracked.

In an embodiment, an Executive Information System (EIS) is used to give high level access to both "buy" (what the customer purchases) and "access" (when the product was viewed, how often and duration) data. The EIS represents information in both a graphical and summary report format. "Drill down" functions in the EIS help the packager derive the appropriate product (product refers to programs, events or services) mix.

The EIS provides an on-line software tool that allows for real-time evaluation of current product positioning. The EIS includes user friendly icons to guide the packager through available functions. The functionality in the EIS provides general information on current programming sales status. By working through the tiers in the EIS, the packager has access to more specific information.

The graphical tools allow for analysis of current data through the use of multiple graph types such as line graphs, bar and pie charts. These tools will allow the packager to manipulate independent variables such as time (hour, day of the week, week, month), demographic information, program category information (genre, property, events), cable headend information and pricing information for determining the appropriate programming mix within the allotted time slots.

The EIS also allows the packager to derive expected monetary returns through program line-ups by integrating outside industry databases. For instance, the EIS could be used to determine expected returns from a particular program by correlating buy information from the existing programs in the line up with a subscriber ratings service database to determine the outcome of programs within a particular genre not in the current line up.

Report tools within the EIS aggregate buy access at the highest level. Due to the volume of available information statistical analysis methods are used for deriving marketing intelligence within the EIS.

A yield management tool is incorporated within the EIS. The yield management tool encompasses operations research techniques, statistical methods and neural net technology to decide program mix as it pertains to program substitutes, program complements, time slice positioning, repetitions and menu positioning.

The EIS is automated to the extent of providing viable alternative as to the proposed product mix. The EIS may encompass a Monte Carlo simulation for developing alternative product mix scenarios. The EIS receives data from internal and external industry sources to provide expected revenue projections for the different scenarios. Other software subroutines of the CAP 260 will automatically call upon the EIS to assist the program delivery system 200 in important decision making, such as menu configuration and transponder allocation. Human interaction is required to change marketing parameters for fine tuning the desired product scheduling.

Figure 5:
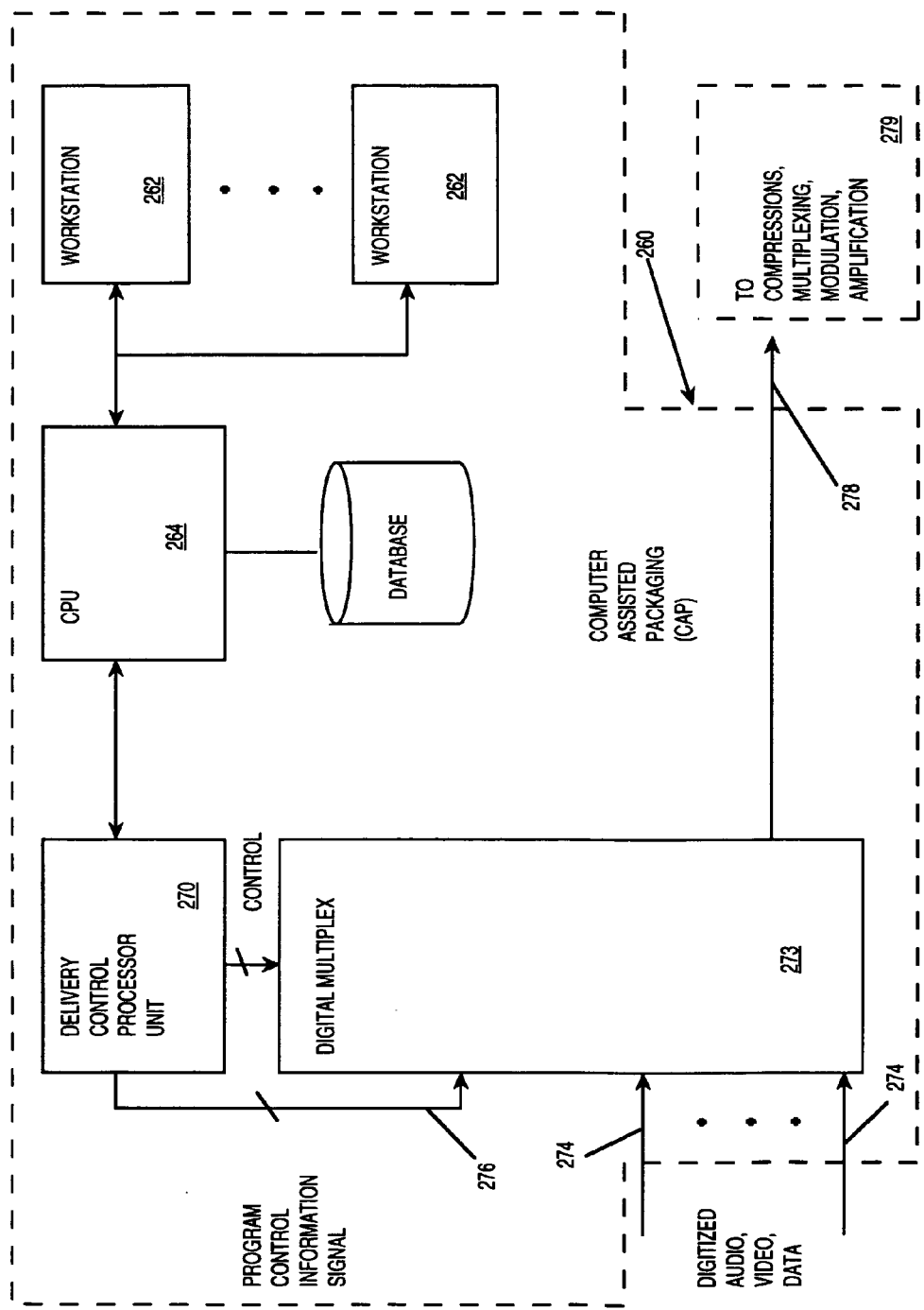
FIG. 5 is a more detailed schematic of the hardware of the Operations Center and CAP.

Although the packaging of the program information and programs, including the creation of program control information, program lineup and menu designing configuration, may be conducted at the CAP 260, other functions of the operations center 202 may be controlled by a delivery control processing unit 270 (shown in FIG. 5). The delivery control processing unit 270 may perform the tasks of incorporating the program control information signal from the CAP 260, coordinating the receipt and combining of external program video/audio and internal video/audio and combining the signals as necessary for transmission. This distribution of functions among the CAP 260 and delivery control processing unit 270 allows for greater speed and ease of use.

FIG. 5 shows a more detailed diagram of the CAP 260 and the delivery control processor unit 270. Once external and stored digital and analog sources have been converted into a standard digital format 274, they are input into standard digital multiplex equipment 273 (of the type manufactured by Scientific Atlanta, General Instruments, and others). Additionally, a program control information signal 276 is input into the digital multiplex equipment 273. These inputs 274, 276 are multiplexed appropriately under the control of the delivery control processor unit 270 as commanded by the CPU 264. The delivery control processor unit 270 is also responsible for the generation of the program control information signal 276 based on information received from the CPU 264. The delivery control processor unit 270 allows for the off-loading of real-time and near real-time tasks from the CPU 264. The CPU 264, as described earlier, processes information within its database and provides packager access to the CAP 260 via multiple workstations 262. The high-speed digital output 278 from the digital multiplex equipment 273 is then sent on to the compression (if necessary), multiplexing, modulation and amplification hardware, represented at 279.

C. The Program Control Information Signal

Table A is an example of information that may be sent in the program control information signal 276 to the set top terminals 220.

TABLE A

| *Ch. | *Program name | *Program length | *Menu code | *Description | *Video |
|---|---|---|---|---|---|
| 12:00 PM | | | | | |
| 1 | Cheers | .5 | E24 | C | N |
| 2 | Terminator | 2.0 | A33 | Tx | S |
| 3 | PrimeTime | 1.0 | D14 | N | N |
| 4 | Football Special | .5 | B24 | S | N |
| 12:30 PM | | | | | |
| 1 | Simpsons | .5 | E14 & C13 | C | S |
| 4 | Football Game | 3.0 | B13 | S | N |

The program control information signal 276 generated by the operations center 202 provides data on the scheduling and description of programs via the network controller 214 or, in an alternate configuration, directly to the set top terminal 220 for display to the subscriber.

In an embodiment, the program control information signal 276 is stored and modified by the network controller 214 and sent to the set top terminal 220 in the form of a set top terminal control information stream (STTCIS). This configuration accommodates differences in individual cable systems and possible differences in set top converter or terminal devices. The set top terminal 220 may integrate either the program control information signal 276 or the STTCIS, together with data stored in the memory of the set top terminal 220, to generate on-screen menu displays for assisting the subscriber in choosing programs for viewing. (Throughout the description the term "program control information" refers to control information coming from the cable headend 208 to the set top terminal 220, whether it is sent directly from the operations center 202, processed by the network controller 214, and then forwarded to the set top terminal as STTCIS, or transmitted over telephone lines or the alternate communication media 216.)

With further reference to Table A, the types of information that can be sent via the program control information signal 276 include: number of program categories, names of program categories, which channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

The goal of the menu driven program selection system of the present invention, described in greater detail in a co-pending U.S. Pat. No. 5,734,853 entitled SET TOP TERMINAL FOR CABLE TELEVISION DELIVERY SYSTEM, which is incorporated herein by reference, is to allow the subscriber to choose a program by scrolling through a series of menus, using a remote control 900 for cursor movement. A desired choice in the series of menus may identify one particular channel and one time for activation of that channel. With a chosen channel and activation time the set top terminal 220 can display the selected program on the television for the subscriber. To achieve this goal, in an embodiment, an intelligent alpha-numeric code may be assigned to each program. The alpha-numeric code identifies the category of the program, the menu in which the program is displayed, its transmission time(s), and the position in the menu in which the program is displayed. In a preferred embodiment, the program control information signal 276, including menu codes, is sent continuously from the operations center 202 to the network controller 214, and ultimately to the set top terminal 220. For example, four hours worth of programming information can be sent via the program control information signal 276 continuously in the format shown in Table A.

Table A shows the basic information that is needed by the set top terminal 220. The program descriptions shown are coded abbreviations. For example, C stands for comedy, N for news, S for sports, A for cartoons, and TX for text. If there is a textual description for a program, such as a movie, the description may be given following that program's coded description or may be communicated following the four hours of programming information. As is shown in the coded listing, program descriptions for programs greater than a half hour in length need not be repeated (each half hour). The video description code informs the set top terminal 220 whether there is still or live video available to advertise the program.

For example, a sporting program may be assigned a code of B35-010194-1600-3.25-Michigan St. vs. USC. The letter B assigns the program to category B, sports. The second alpha-numeric character number 3 assigns the program to the third menu of the sports category. The third character of the code, number 5, assigns the program to the fifth program slot on the third menu. The next six characters, Jan. 1, 1994, represent the date. The following four characters, 1600, represent the start time which is followed by the length of the program and the program name. This entry represents a sports show, a college football game, which will be aired at 4:00 PM on New Years day 1994.

In the 12:30, Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the set top terminal 220 may determine the proper menu location for each program and the proper time and channel to activate for the subscriber after menu selection. In the embodiment, the menu codes may be generated at the operations center 202.

Table B shows an example Events Table that may be downloaded to the set top terminal 220 using an Event Data file that contains information about events and pricing. The three columns of the Table B identify the field number, the field itself and the type of information downloaded in an Event Data file. The first column contains field numbers 1 through 11. The middle column contains corresponding field parameters, including event type, event ID, global channel ID, price, start time, end time, start date, end date, P-icon, name and description. The third column contains corresponding field type information. The field type information typically includes an unsigned integer; hours, minutes and seconds; months, day and year; and ASCII character identifier.

TABLE B

| Field # | Field Type | |
|---|---|---|
| 1 | Event Type<br>1 = YCTV | Unsigned Int |

TABLE B-continued

| Field # | Field Type | |
|---|---|---|
| | 2 = Pay-Per-View | |
| | 3 = Reg.TV | |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event Data data file. In particular, Table C shows two data streams corresponding to two event types. The first data stream identifies a YCTV event in the first field. The second field designates the event ID, which is 1234 in this example. The third field includes the global channel ID number two. The fourth field indicates the cost of 50 cents for this event. The fifth and sixth fields indicate the respective start and end times of 3:00 a.m. to 3:00 p.m., respectively. The seventh and eighth fields show the corresponding start and end date, designated as Aug. 25, 1993 and Aug. 27, 1993, respectively. Field nine indicates the P-icon set to a graphics file. Finally, fields ten and eleven indicate the name and description of the event selected, which in this case is Sesame Street™ and Barney™. The second data stream in the Event.Dat example shown in Table C includes analogous information for Terminator 4™, which is designated in field one as a pay-per-view event.

TABLE C

Event Data Example

1'1234'2'50'03:00:00'15:00:00'08/25/93'08/27/93'pbs.pcx'Sesame Street & Barney's Sesame Street and Barney Abstract
2'1234'2'50'20:00':00'22:00:00'08/25/93'08/25/93't4.pcx'Terminator 4' Terminator 4 Abstract The program control information signal 276 and the STTCIS may be formatted in a variety of ways and the on-screen menus may be produced in many different ways. For instance, if the program control information signal 276 carries no menu format information, the menu format for creating the menus can be fixed in ROM at the set top terminal 220. This method allows the program control information signal 276 to carry less information but has the least flexibility since the menu formats cannot be changed without physically swapping the ROM holding the menu format information. In an embodiment, the menu format information is stored at the set top terminal 220 in temporary memory either in a RAM or EPROM for example. This configuration provides the desired flexibility in the menu format while still limiting the amount of information needed to be communicated via the program control information signal 276. New menu format information could be sent via the program control information signal 276 or the STTCIS to the set top terminals 220 each time there was a change to a menu.

In an embodiment, the menus remain fixed and only the text changes. Thus, the program control information signal 276 may be limited to primarily text and a text generator can be employed in the set top terminal 220. This embodiment keeps the cost of the set top terminal 220 low and limits the bandwidth necessary for the program control information signal 276. Another embodiment uses one or more separate channels full-time (large bandwidth) just for the menu information.

Figure 6A:
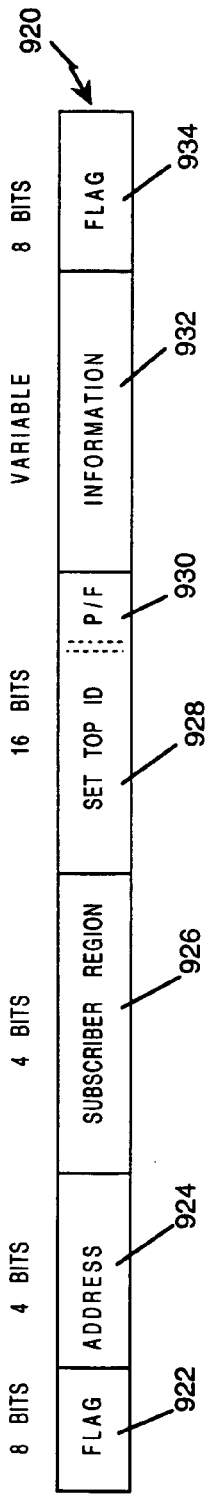
FIG. 6a is a chart of the program control information carried by the program control information signal.
Figure 6B:
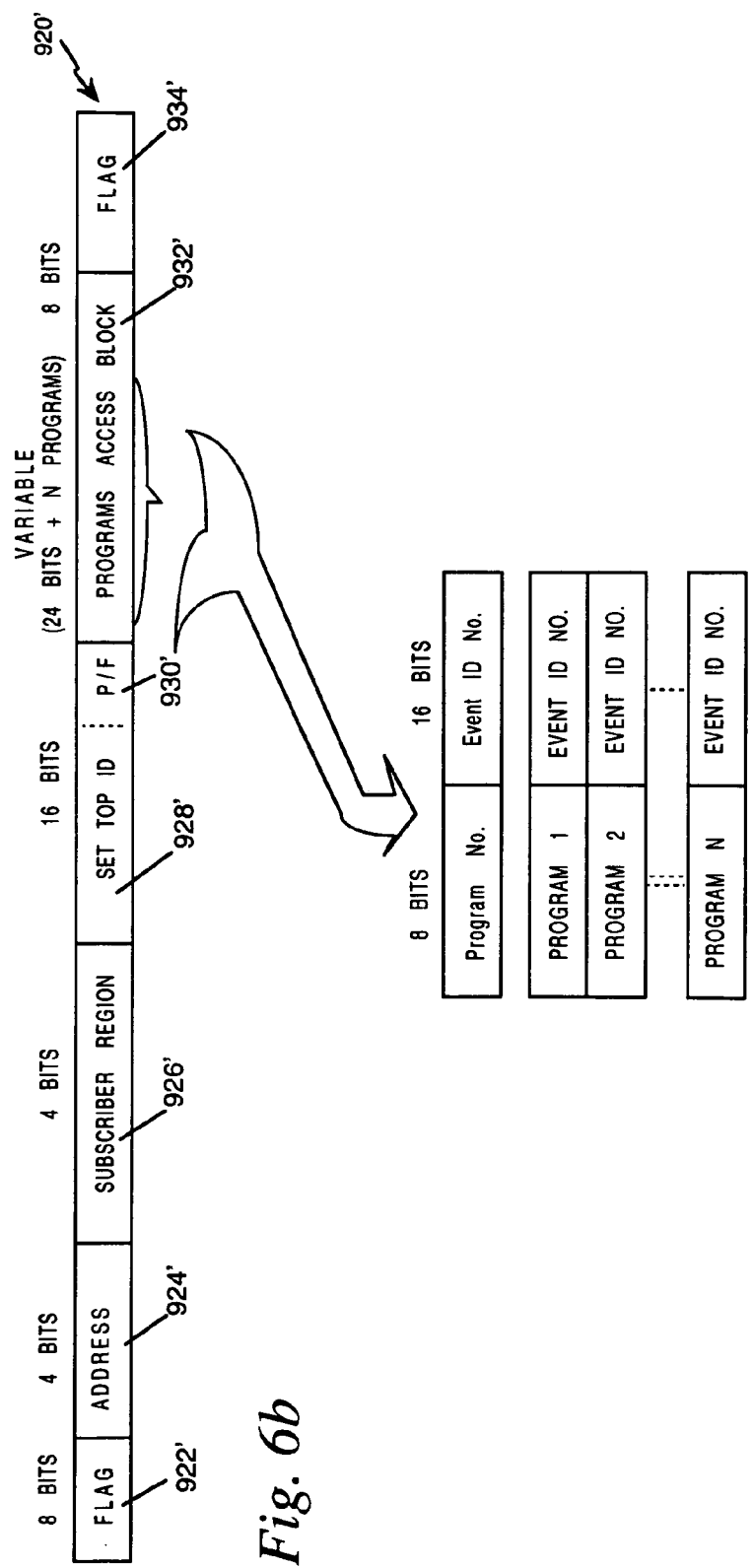
FIG. 6b shows a bit-wise data format for program control information.

FIGS. 6a and 6b show a data format 920 at the bit-level for one embodiment of a program control information signal 276. The data format consists of six fields: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence that appears at the beginning 922 and end 927 of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response 920' (FIG. 6b) from the set top terminal 220 addressed. The polling response 920' is substantially similar to the from format 920, and is commonly numbered, but with a prime (') designation appended for clarity. The frame format 920 also provides a variable-length information field 932 for other data transmissions, such as information on system updates. The frame format ends with an 8-bit flag 934 (or trailing flag) that is identical in format to the leading flag 922, as set forth above. Other frame formats, such as MPEG, for example, will be apparent to one skilled in the art and can be easily adapted for use with the system.

D. Software Subroutines

The program control information signal 276 is produced substantially by the CAP CPU 264 and the delivery control processor unit (DCPU) 270. An overview of the software modules, focusing on the processing of signals and communication between the CAP CPU 264 and the DCPU 270 is shown in FIG. 7. The software modules for the CAP CPU 264 and the DCPU 270 include dispatcher 484, processing 486 and communications 488, each of which performs like-named functions, as well as supporting database 490 access. Processing within the CAP CPU 264 is controlled by the dispatcher 484 software module which may generate processing commands based on user command (e.g., do something now), schedule events (e.g., do something at noon) or based on the occurrence of other events (e.g., do something when the database is updated). The dispatcher 484 sends messages to the processing software module 486 instructing it to process information within the database 490 and generate control information for the DCPU 270.

Figure 8:
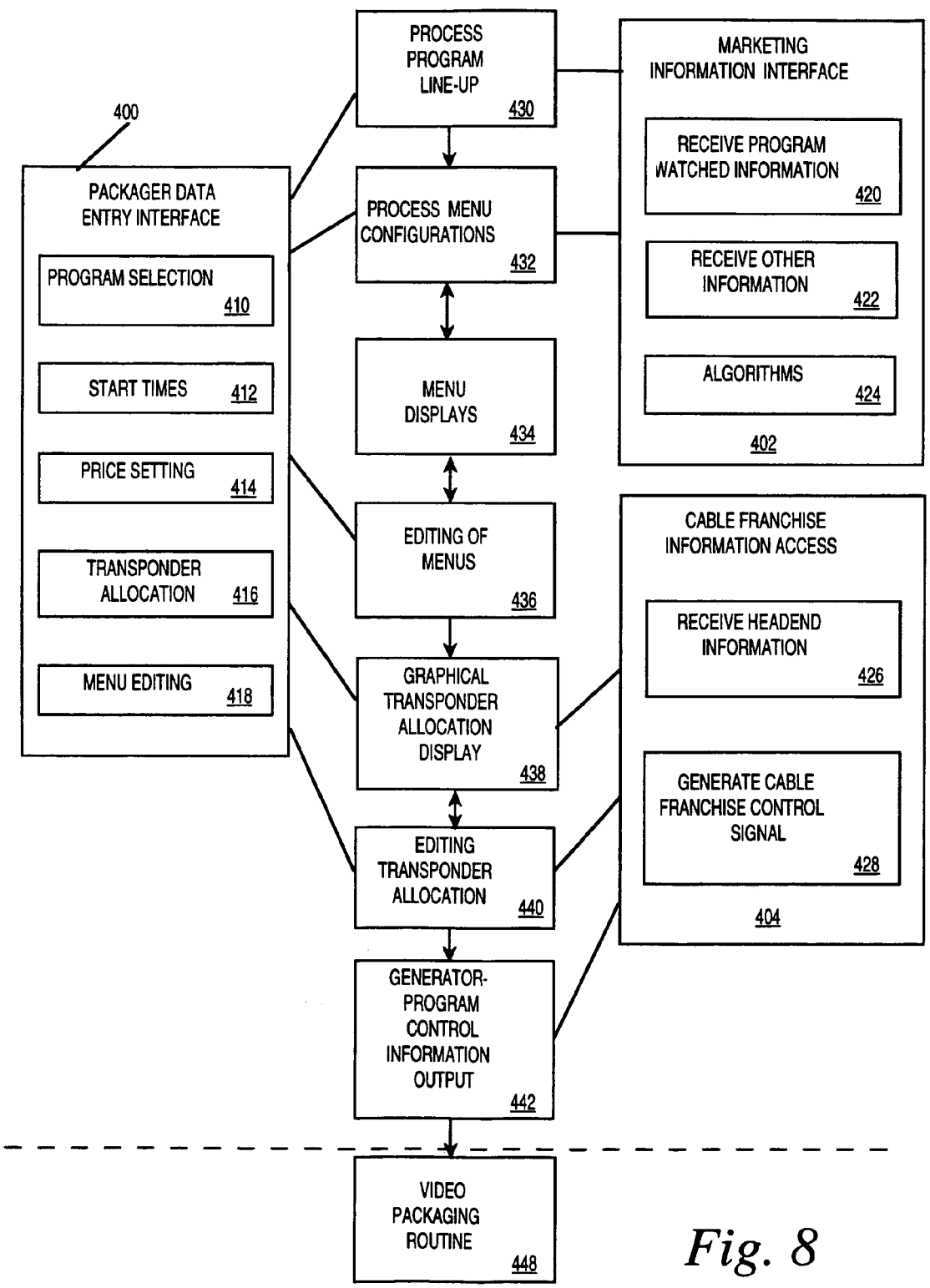
FIG. 8 is a schematic of the subroutines for the CAP software.

FIG. 8 is a high level diagram of CAP software subroutines and their interrelations. A Main Program (not shown) orchestrates the use of the various subroutines as needed to perform the CAP's tasks. The Packager Data Entry Interface (PDEI) 400, Marketing Information Interface (M1) 402, and Cable Franchise Information Access (CFIA) 404 subroutines perform the interface functions between the CAP Main Program and outside data or information. The remaining subroutines shown in the center column of FIG. 8 perform the processing and manipulations necessary to the functioning of the CAP 260.

The Packager Data Entry Interface (PDEI) 400 subroutine includes routines that enable the packager to interactively enter program selections 410, start times of programs 412, price setting 414, transponder allocation 416, and menu editing 418. The PDEI subroutine 400 controls the keyboard and mouse data entry by the packager and runs in concert with the processing and editing subroutines described later.

The Marketing Information Interface (MII) 402 subroutine interfaces the processing and editing subroutines with marketing data. This interface regularly receives programs watched information from billing sites 420, cable headends 208, or set top terminals 220. In addition, other marketing information 422 such as the demographics of subscribers during certain time periods may be received by the MII 402. The MII 402 also uses algorithms 424 to analyze the program watched information and marketing data 420, 422, and provides the analyzed information to the processing and editing subroutines. In an embodiment, the Executive Information System (EIS) with a yield management subsystem is included in the MII subroutine described above.

The process program line-up subroutine 430 uses information from the MII 402 and PDEI 400 to develop a program line-up. Importance weighting algorithms and best fit time algorithms are used to assign programs in time slots.

The process menu configurations subroutine 432 determines appropriate menu formats to be used and positions programs on menu screens. Information from the MII 402 and PDEI 400 are used to determine program positions on menus.

The menu display algorithms 434 displays menus as the menus would be seen by the viewer on a large CRT or color monitor.

The editing of menus subroutine 436 works with the menu display algorithm and PDEI 400 to allow the packager to edit menus on-the-fly during viewing of the menus.

The graphical transponder allocation display 438 sends information to create graphical displays enabling the packager to comprehend the allocation of transponder space across the entire television delivery system 200.

In a manner similar to the display and editing of menus represented at blocks 434, 436, the packager may utilize the editing transponder allocation subroutine 440 to interactively reallocate assignment of transponder space. In the preferred embodiment, the EIS with yield management may be used by the packager to assist in decisions on allocating transponder space.

The generator subroutine 442 creates the program control information signal 276 for output. The generator subroutine 442 receives the cable franchise control signal and uses this signal to help create a custom signal for each cable headend 208.

The Packaging Routine 448 obtains and packages the programs, along with the program control information signal 276, for transmission to the transponders.

E. System Operations

Figure 9:
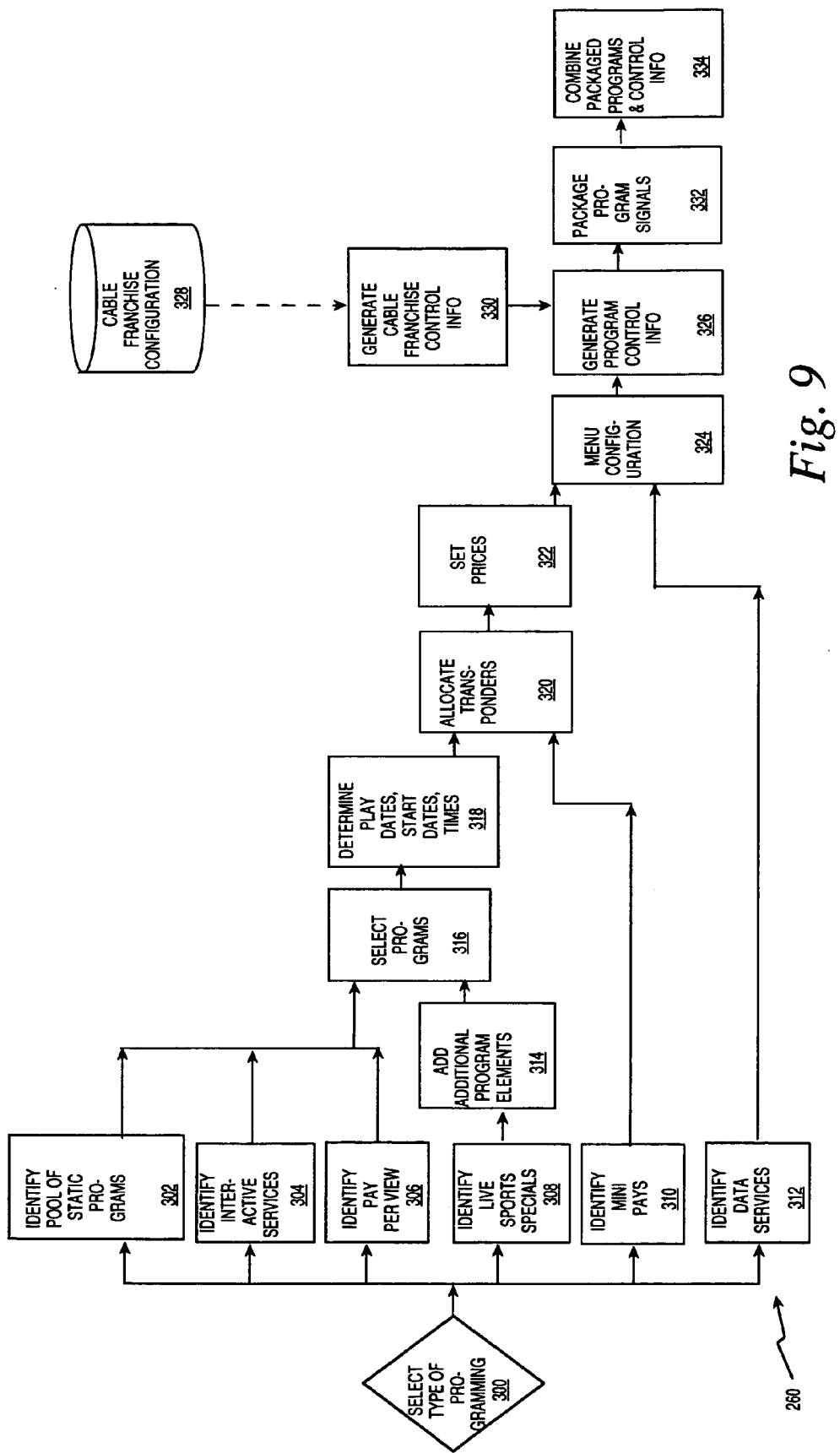
FIG. 9 is a block diagram of the computer assisted packaging.

FIG. 9 shows operations that must occur in order for the packaged signal to be sent to the satellite 206. As shown in FIG. 9, the first step in the operation of the CAP 260 is selecting the type of programming 300 that will be packaged. There are six broad categories in which most television programming can be classified: static programming 302, interactive services 304, pay per view 306, live sports specials 308, mini pays 310, and data services 312. Static programs are programs which will show repetitively over a period of time such as a day or week. Static programs include movies showing repetitively on movie channels, children's programs, documentaries, news, entertainment.

Program services, with defined start and end time periods, behave like static programs and may be handled in a similar manner.

Interactive services 304 typically include interactive programs using the Vertical Blanking Interval (VBI) or other data streams synchronized with the programming to communicate interactive features (such as those used in education), and games. Using this feature, interactive home shopping programs are possible. Pay per view 306 are programs which are individually ordered by the subscriber. After ordering, the subscriber is authorized to access the program for a limited time, (e.g. three hours, two days, etc.). Live sports specials are live events usually related to sports which subscribers are unlikely to watch on taped delay.

Mini pays 310 are channels to which existing set top converter boxes (not shown) and the set top terminals 220 of the present invention may subscribe. The subscriptions for mini pays 310 may be daily, weekly, or monthly. An example would be the Science Fiction channel. Data services 312 are services in which information is interactively presented to the subscriber using a modem or other high rate of speed data transfer. Some examples are Prodigy, America On Line, services for airline reservations, and TV guide services (e.g. TV Guide X*PRESS™, InSight™, etc.). Data could also include classified or other forms of advertising.

Referring to FIGS. 5 and 8, the packager begins the CAP processing using the Packager Data Entry Interface Software 400 and a workstation 262. After selecting the type of programming, the packager must identify a pool of programs (within a category) to be packaged. Returning to FIG. 9, the next CAP 260 step varies for different program categories. For the category of live sports 308, additional program interstitial elements 314 such as promos and other sports news may be added before further processing. For the live sports 308, static (or program service) 302, interactive services 304 and pay per view 306 categories, the next CAP 260 step is for one television program to be selected 316. This is followed by each program individually being assigned dates to be played, a start date (for continuous play) and start times 318. Many dates and start times may be assigned to any given program. Using this methodology, programs may be purchased by viewers in time slices (e.g., one week). The program information for these categories may then be processed for allocation of transponder space and setting of prices, as indicated at blocks 320, 322, respectively.

Mini pays 310 and data services 312 require less processing by the CAP 260. After identifying the mini pays 310, the CAP 260 may proceed to allocation of transponder space and pricing, block 320, for the mini pays 310. Data services in the preferred embodiment generally do not require allocation of transponder space and generally do not require price setting. The information for data services 312 may be directly processed for menu configuration, block 324. In alternate embodiments, the data services 312 may be processed through these portions of the CAP 260 program.

The CAP 260 uses an interactive algorithm 416 to allocate transponder space 320 and set prices 322. The factors weighed by the algorithm are: 1. buy rates of the program, 2. margin of profit on the program, 3. length of the program, 4. any contractual requirement which overrides other factors (such as requirement to run a specific football game live in its entirety). The information on buy rates of the program may be obtained by the Marketing Information Interface 402 from a Central Statistical and Billing Site, a Regional Statistical and Billing Site, the cable headend 208 or directly from the set top terminals 220. The CAP 260 must consider the priority levels of programming (e.g., FIG. 13) when allocating transponder space. Particularly, as in the preferred embodiment, transponders are assigned to three specific priority levels. The CAP may automatically (without packager intervention) access the MII 402 and the EIS to obtain necessary decision making information on transponder allocation.

Following transponder allocation and price setting 320, 322, respectively, the CAP 260 proceeds to menu configuration 324. The positioning of programs within the menu configuration 324 can have an effect on subscriber buy rates for the program. (The processing of menu configurations 432 is also described in reference to FIG. 8.) Therefore, an algorithm accounting for either a manually assigned program importance or a calculated weight of the program importance is used to determine each programs position within the menu scheme. For instance, a popular program with a high profit margin may be assigned a high weight of importance and shown in a prominent place in the menu scheme. Alternatively, a high profit program with sagging sales may be manually assigned a prominent place in the program schedule to increase sales.

After a series of entries by the programmer/packager at the Operations Center 202, the CAP 260 displays draft menus 434 or schedules (including priority levels) for programming. The packager may now manipulate the menus and schedules and make changes as necessary 436. After each change, the packager may again display the menus or schedules and determine if any more changes are necessary 436. The packager may use the Executive Information System with yield management as described below to assist in editing the menus and schedules. When the packager is satisfied with the menu configuration 324 and scheduling of television programs, the packager may then instruct the CAP 260 to complete the process.

After menu configuration 324, the CAP 260 may begin the process of generating a program control information signal 326 (see also FIG. 8 software description at 442 and 404). In order to generate program control information signals 326 which are specific to a particular cable headend 208 system, the CAP 260 incorporates cable franchise configuration information 328. In the preferred embodiment, unique cable franchise configuration information 328 is stored at the operations center 202. The cable franchises upload changes to their specific franchise information 426 from time to time to the operations center 202 for storage 328. Preferably, a separate CPU (not shown) handles the management of the cable franchise information 328. From the stored cable franchise information 328, the CAP 260 generates a cable franchise control information signal 330 unique to each franchise.

Using the unique cable franchise control information signals 328 and the menu configuration 324 information, the CAP 260 generates the program control information signal 276, as shown at function block 326. The program control information that is unique to a particular cable franchise may be identified in various ways such as with a header. With the header identification, the cable headend 208 may extract the portions of the program control information signal 276 it needs. The CAP 260 may complete its process by electronically packaging the programs into groupings 280 for the signal transmission and adding the program control information signal 276 to the packaged programs 334 to form a single signal for transmission. Through manual entries by the packager (PDEI 400) or by comparing against a list of programs, the CAP 260 will determine whether the programs are arriving from external sources 280 or sources internal 286 to the operations center 202.

Upon completion of the CAP's functions, the operations center 202, or the uplink site 204 (FIG. 1), compresses 288 (if necessary), multiplexes 290, modulates 292 and amplifies 294 the signal for satellite transmission 296. In a basic embodiment, the CAP 260 will also allow entry of time slots for local avails where no national programming will occur.

Figure 10:
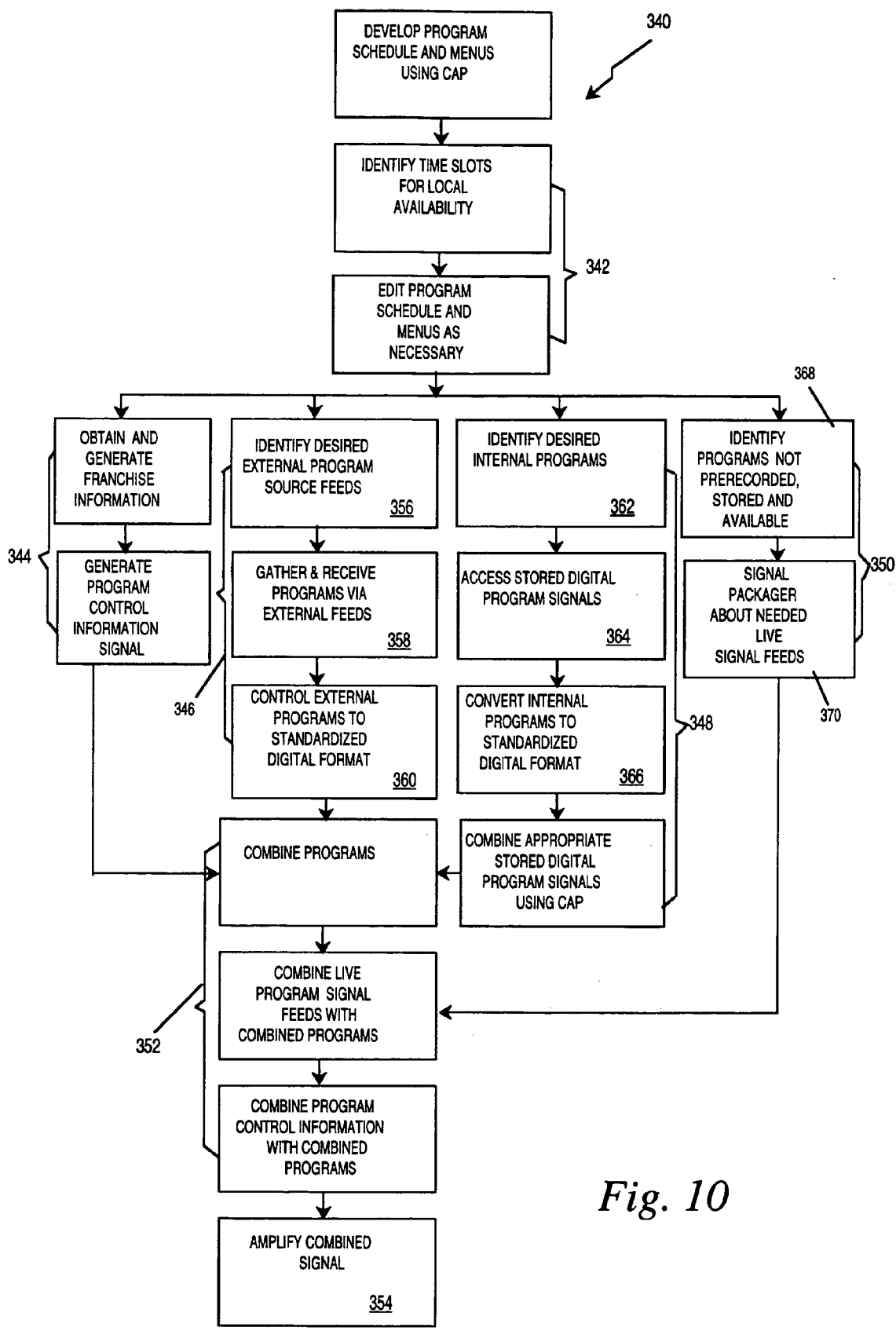
FIG. 10 is a flow chart of the processing occurring at the operations center.

FIG. 10 is a more detailed flow chart 340 of some of the functions performed by the CAP 260 after an initial program schedule has been entered and menu configurations generated. This flow chart highlights some of the functions that can be performed in parallel. The flow chart 340 shows six basic functions that are performed by the CAP 260: (1) editing program schedule for local availability 342 (only for non-standard services, i.e., those services that are national cable services); (2) generating program control information signals 344; (3) processing external programs 346; (4) processing internal programs 348; (5) processing live feeds 350; and, (6) packaging of program information 352. In an alternate embodiment, the CAP 260 is capable of incorporating local programs and accommodating local availability for local television stations.

F. Allocation of Cable System Bandwidth

Figures 11, 12:
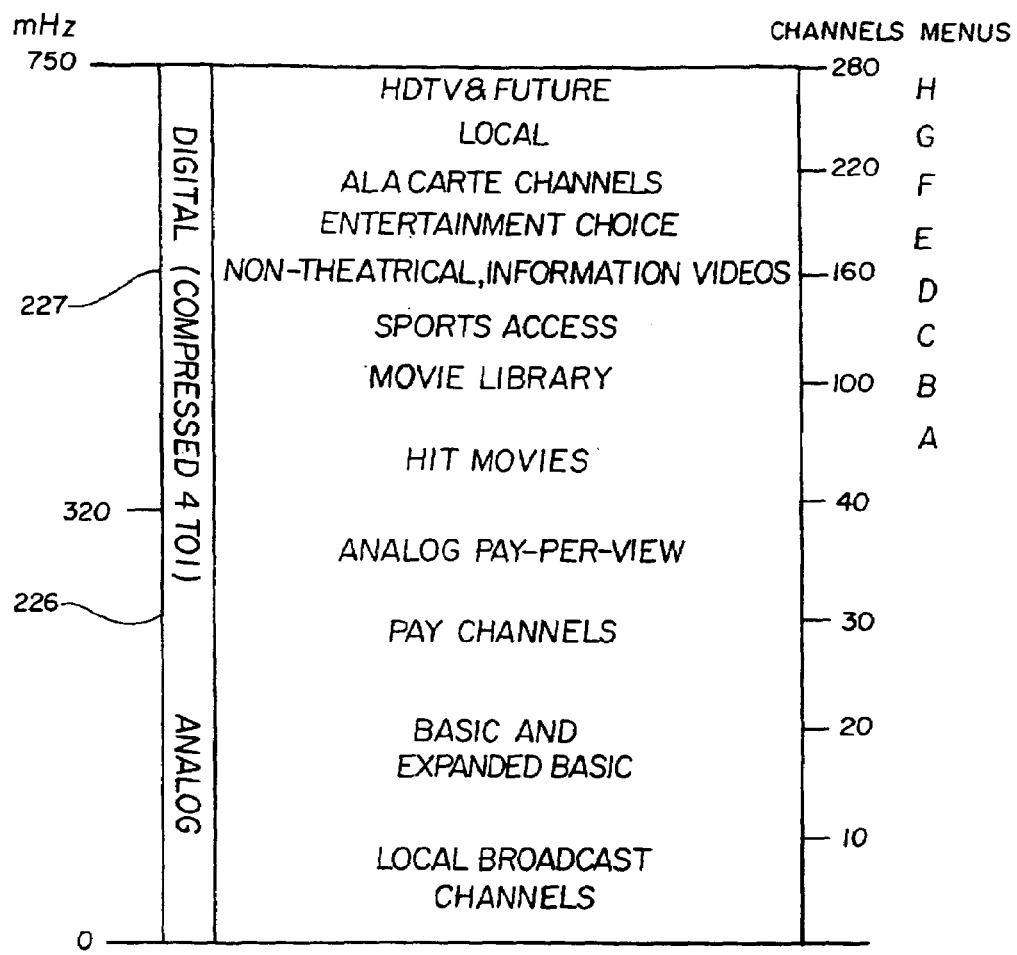
FIG. 11 is a diagram of the bandwidth allocation for a 750 MHz system.
FIG. 12 is a diagram/chart of the compressed channel allocation for the system.

One task of the operations center 202 is effective utilization of available bandwidth from the operations center 202 to the subscriber homes. FIG. 11 shows effective allocation of 750 MHz of bandwidth (I MHz to 750 MHz) for television programming. In FIG. 11, bandwidth is allocated for both analog 226 and digitally compressed 227 signals. In an embodiment, the bandwidth is divided so that each category of programs receives a portion of the bandwidth. These categories correspond with major menus of the set top terminal software. The representative categories shown in FIG. 11 include: (1) high definition TV (HDTV) made possible through the use of compression technology, (2) A La Carte Channel category which provides specialty channels for subscription periods such as monthly, and (3) pay-per-view.

FIG. 12 shows a chart 228 of compressed channel allocation for a variety of programming categories 229 that have been found to be desirable to subscribers. By grouping similar shows or a series of shows into blocks of channels 230, the system 200 is able to more conveniently display similar programming with on-screen television menus. For example, in the movie category, which has the greatest allocation of channels, the same movie may be shown continuously and simultaneously on different channels. Each channel starts the movie at a different time allowing the subscriber to choose a more suitable movie starting time (e.g., every 15 minutes).

G. Cable System Use of Control Signal

Figure 14:
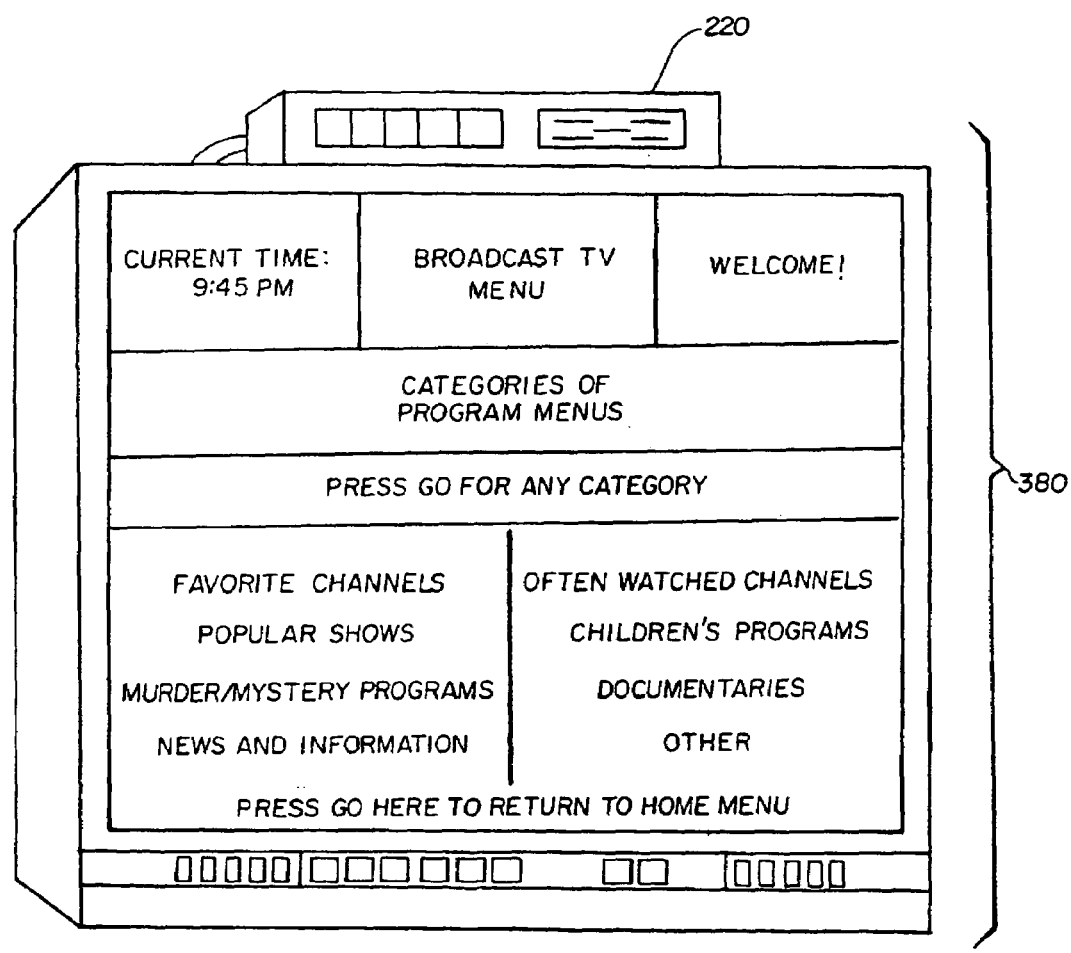
FIG. 14 is a drawing of a broadcast television menu screen to be displayed on a set top terminal.
Figure 15:
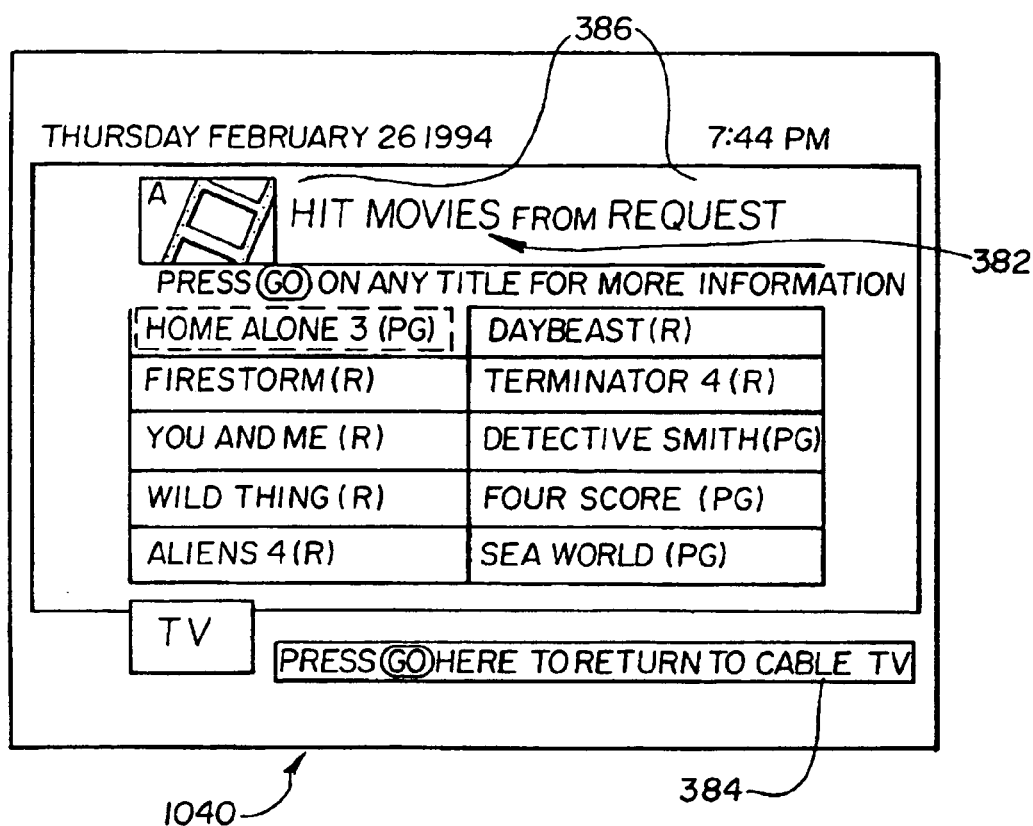
FIG. 15 is a drawing of a hit movie menu screen to be displayed on a set top terminal.
Figure 16:
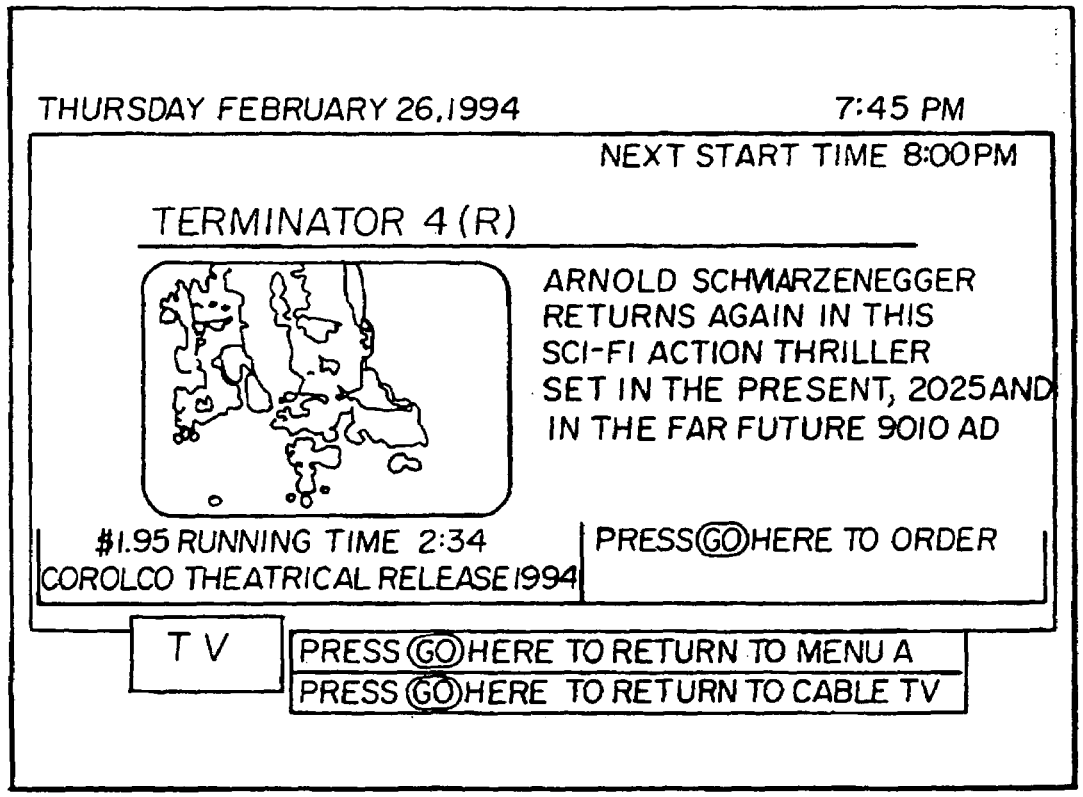
FIG. 16 is a drawing of a hit movie description menu screen to be displayed on a set top terminal.

FIGS. 14 through 16 depict sample menu screens produced by the set top terminal 220 using the program control information signal 276. FIG. 14 shows a menu that enables the subscriber to select a program category or program service from among a choice of eight program categories. FIG. 15 shows a menu for the subscriber to select a hit movie from among ten hit movies. FIG. 16 provides information about a movie (or event) and enables a subscriber to order the movie for viewing.

FIGS. 14 through 16 show text generation by the set top terminal 220. This text is generated using information received via the program control information signal 276. FIG. 15 shows the text 380 generated for the hit movies major menu. In the preferred embodiment, text 380 such as that shown in FIGS. 14 through 16 is generated separately by a text generator (not shown) in the set top terminal 220. Those portions of the text that generally remain unchanged for a period of weeks or months may be stored in EEPROM or other local storage. For example, the text "HIT MOVIES from" 382 will consistently appear on each hit movies' major menu. This text may be stored on EEPROM or other local storage. Further, text such as that which appears at the lower center part of the screen "PRESS HERE TO RETURN TO CABLE TV" 384 appears many times throughout the menu sequence. This text may also be stored locally at the set top terminal 220. Text which changes on a regular basis, such as the movie titles (or other program selections), will be transmitted to the set top terminal 220 by either the operations center 202 or the cable headend 208. In this manner, the cable headend 208 may change the program selections available on any major menu modifying the program control information signal sent by the operations center 202 and transmitting the change. The network controller 214 of the cable headend 208 generally modifies the program control information signal and transmits the set top terminal control information signal 12 (STTCIS). It is preferred that the text 380 is generated by the set top terminal 220 separately from the graphics because the text can be stored locally in a more compact manner requiring less storage space at the set top terminal 220. In addition, it allows for easy communication of text changes from the operations center 202 or cable headend 208 to the set top terminal 220.

FIGS. 14 through 16 show the use of day, date and time 386 information on menus. This information may be obtained in a variety of ways. The day, date, and time information 386 may be sent from the operations center 202, the cable headend 208 (signal processor or network controller 214), the uplink site, or generated by the set top terminal unit 220 internally. Each manner of generating the day, date, and time information 386 has advantages and disadvantages which may change given the particular embodiment and costs. In the preferred embodiment, the day, date, and time 386 are generated at a central location such as the operations center 202 and are adjusted for regional changes in time at the cable headend 208.

In order for the set top terminal 220 to generate submenus for subcategories of categories shown in FIG. 14 (which relate to the content of the programs), and to generate menus for movies such as FIG. 16, the set top terminal 220 must receive information on the content of the programs from the Operations Center 202 (via the cable headend 208). The set top terminal 220 could receive this information in the form of the program control information signal (or STTCIS). As shown FIG. 16, in addition to the text needed for these program menus, video or program scenes are also necessary.

Live video signals may be used in windows of certain menus such as FIG. 16. These video signals can be sent via the program control information signal 276, the STTCIS, or can be taken off channels being transmitted simultaneously with the menu display. If the video signal is taken off a channel, less information needs to be sent via the program control information signal 276. However, this technique requires that separate decompression hardware be used for the program control information and the channel carrying the video. Separate decompressors for the video signals and program information signal allows for the greatest flexibility in the system and is therefore the preferred embodiment. A separate decompressor also assists in assuring that the switch from menus to television programming is smooth and without any significant time delay.

Live video for menus, promos or demos may be sent to the set top terminal 220 in several ways: a) on a dedicated channel, b) on a regular program channel and scaled to size, c) sent along with the program control information signal, etc. However, in the preferred embodiment, a great deal of short promos or demo video are sent using a split screen technique on a dedicated channel.

Using a split screen technique, any number of different video clips may be sent (e.g., 2, 4, 6, or 8 video clips). To show the video clip on a menu, the video must either be scaled and redirected to a video window on a menu screen or a masking methodology can be used. Masking involves playing the entire channel of video (all 2, 4, 6, or 8 split screens) in background and masking the unwanted video clip portions of the split screen by playing the menu in foreground and overlaying the unwanted background video. Masking is the least expensive method because it does not require any special hardware and it increases video throughput to the set top terminal 220. However, using the masking technique without any video redirecting causes each video clip to be located in a different position on the screen. It also requires the masking to be different for each video clip and makes consistent format difficult. On the other hand, scaling and redirecting video is generally difficult, expensive and requires additional hardware.

In order for the operations center 202 to prepare the promo video signal to be sent to the set top terminal 220, the operations center 202 must first identify the duration and actual video cut to be used for each promo and its position within the promo video signal. This information is maintained within the operations center 202 database. When it is time to produce the promo video signal (either to tape or to broadcast), each promo cut is scaled, positioned and combined with the other promos to form the single promo video signal. This is performed by readily available commercial equipment. Each promo is run repeatedly while the promo video signal is being generated. The audio signals of the individual promo cuts may be combined into the promo video signal audio tracks based upon the number of audio tracks available. The mapping of the audio tracks to the promos is also stored in the operations center database. Additionally, the mapping of promos to the programs that they are previewing is also stored in the operations center database. All promo database data is made available to the set top terminal 220 through the STTCIS.

In an embodiment, the operations center 202 transmits six video/graphic promos for advertising purposes all on one channel. The throughput of the video/graphics on a single channel can be increased through the use of digital compression techniques. The set top terminal 220 uses either video scaling and redirecting techniques or masking to utilize the six video scenes. Although the set top terminal 220 actually performs the manipulation of video as necessary to generate the "live" menus for the subscriber, the appropriately prepared video signals must be formed and sent by the operations center 202 to the set top terminal 220. If a promo for a given program is available at the set top terminal 220, the subscriber may command the set top terminal 220 to display the promo. Generally, this is done through program selection from a menu screen by the subscriber. The selected program is referenced to information about available promos and allows the set top terminal 220 to tune to the proper channel, select the appropriate menu overlay mask based on the promos position and switch on the audio track(s) if they are available. The promos position on the screen dictates the displaying of the "live" text (refer to the video window of FIG. 16). The program associated with the currently selected promo may be purchased from this menu screen. Events, services and slices of time may be purchased from promotional menus.

Management of promo video signals at the operations center 202 is similar to that of other programs except that more information is needed in order to specify the details of the promo video signal. The broadcasting of the promo video signal is identical to the broadcasting of a video program.

In order to limit the amount of bandwidth needed to transmit the program control information signal, various compression techniques employed for non-video may be used such as block coding, contour coding, blob encoding, and run-length encoding. Further, the program control information signal may be divided into text and graphics, or video, text and graphics and then recombined at the set top terminal 220 using a text generator, graphics decompression, and video decompression as necessary.

As shown in FIG. 2, an analog cable TV system 205 can continue to exist alongside and within the digitally compressed system of the present invention. The digital transmissions do not effect the analog system. In fact, the analog cable signal may be transmitted simultaneously on the same cable as the digital signal. Cable headends 208 may continue to supply subscribers with local channels in an analog signal format.

In an embodiment, the operations center 202 and uplink 204 (FIG. 1) or master control site 211 (FIG. 3) are collocated. However, the operations center 202 and uplink site 204 may be located in different geographical places. Also, functions and equipment within the operations center 202 may be remotely located. For instance, the program storage may be at a different site and the programs may be sent to the CAP 260 via landline.

Alternate embodiments of the system 200 of the present invention may use multiple operations centers described above. In such an embodiment, one operations center may be designated the master operations center and all other operations centers be slave operations centers. The master operations center performs the functions of managing and coordinating the slave operations centers. Depending on the method in which the slave operations centers share functions, the master operations center coordination function may involve synchronization of simultaneous transmissions from multiple slave operations centers. To perform its functions, the master operations center may include a system clock for synchronization.

Just as in the alternate embodiment wherein multiple operations centers 202 are used, a delivery system may have multiple satellite uplinks. Preferably, each operations center 202 has one or more uplink sites. Each operations center 202 controls the functions of its assigned uplink sites and may assign one site as a master uplink site.

In another alternative configuration, in regions or areas without cable services, where subscribers might use backyard satellite systems (TV RO) to receive packaged television services, the set top terminal 220 will include the appropriate hardware to allow connection to the backyard satellite reception equipment, i.e., a typical communication port. In this configuration, the backyard satellite system will receive programming signals originating from the operations center 202 directly from the satellite transponders. No cable headend 208 is utilized with a backyard satellite system. The menu system within the set top terminal 220 will be programmed directly from the operations center 202. The operations center 202 program signals and control signals arrive at the set top terminal 220 essentially unchanged. Additionally, in this configuration, an upstream communication mechanism must be in place at the subscriber's home (e.g., modem) to communicate information to the operations center 202 such as program ordering information. The set top terminals 220 can be equipped with a modem port for this upstream communication to the operations center 202.

H. Program Menu Structure

Subscribers are able to access an expanded television program package and view selected programs using a menu-driven access system that allows each subscriber to select individual programs by sequencing a series of menus. The menus are sequenced by the subscriber using simple alphanumeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next or return to a previous menu. In this fashion, the subscriber can sequence the menus and select a program from any given menu. The programs are grouped by category so that similar program offerings are found on the same menu.

If the subscriber selects a specific program from a menu, the set top terminal 220 determines on which channel the program is being shown, demultiplexes and extracts the single channel transmitted from the cable headend 208, the operations center 202, or other program broadcast site. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message. The menu-driven program system provides the subscriber with one-step access to all major menus, ranging from hit movies to sport specials to specialty programs. From any of the major menus, the subscriber can in turn access submenus and minor menus by cursor or alpha-character access.

There are at least two different types of menus used by the menu-driven program access system, the Program Selection menus and the During Program menus. The Program Selection menus include the Introductory menus 1000, the Home menus 1018, the major menus 1020, and the submenus 1050. The During Program menus include the hidden menus 1390, and the program overlay menus 1390.

Figure 17:
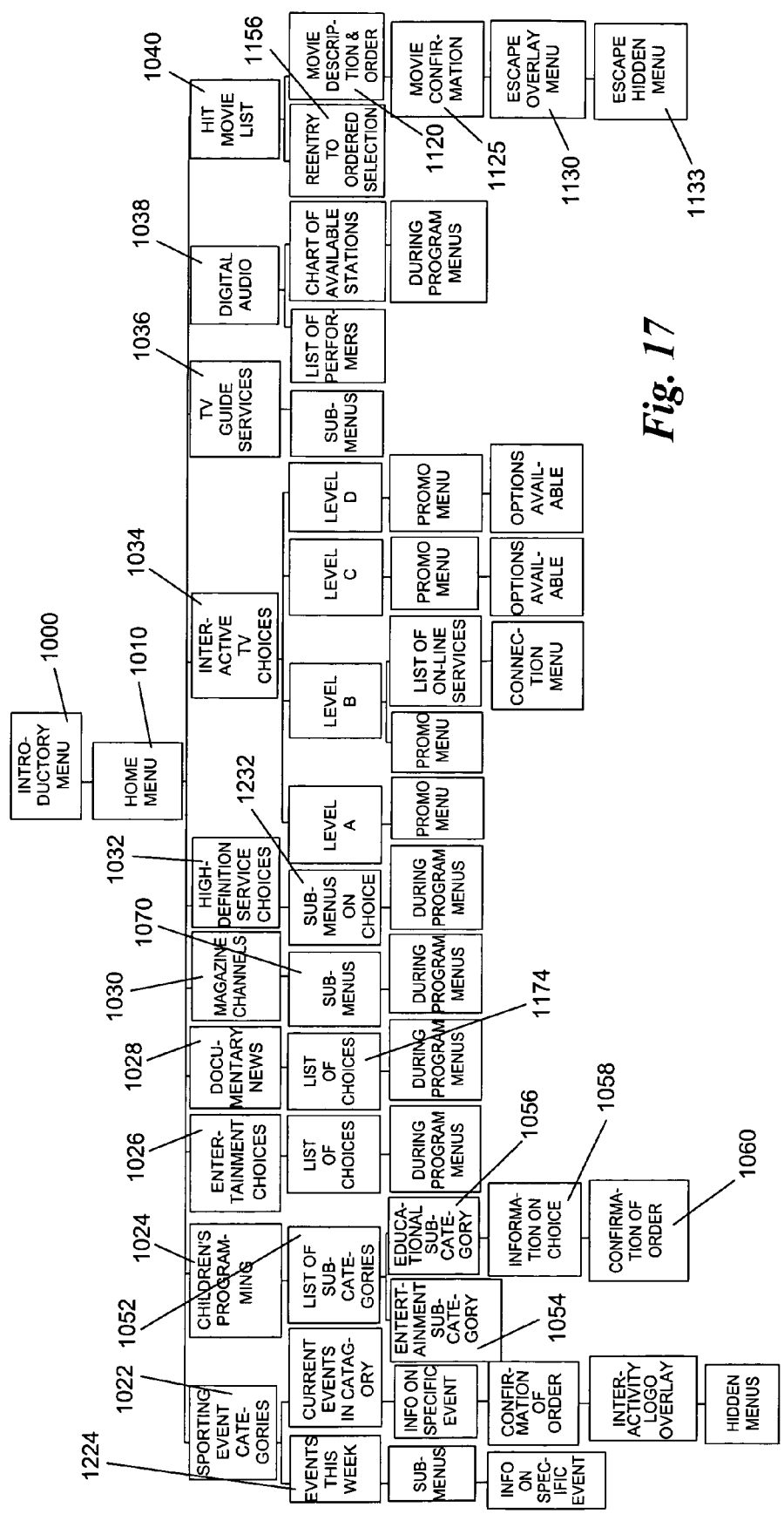
FIG. 17 shows a program menu structure.

FIG. 17 shows one basic structure of the program menu system. Although the term "menus" has been used above, the menus could also be seen as defining zones or categories of programming. The first series of menus, Introductory menu 1000, Home menu 1010, Major Menus 1020, and Submenus 1050 execute subscriber program selection inputs. The During program menus 1200 provide the subscriber with additional features or options after a program has been selected and shown. There are two primary types of During program menus 1200, Hidden Menus 1380 and Program Overlay Menus 1390. Both are described in the following text and figures. The menu sequence and each menu structure has been particularly program designed using the "eye-off-the-remote" design concept. A subscriber can easily navigate through the menu system with the cursor movement and "go" buttons 970, 975. Since the subscriber never needs to take his eye off the television screen, the cable operator is likely to have the subscriber's complete attention.

Following the Introductory menu screen 1000 the subscriber will normally be advanced to the Home menu screen 1010. The Home menu 1010 is the basic menu that the subscriber will return to make the first level of viewing decisions. From the Home menu 1010, the subscriber is able to access all television programming options. Some programming options may be accessed through cursor movement on the screen, others directly by a button selection on the remote control 900, or both, on-screen selection and remote control 900 direct access.

In the normal progression through the menu screens, the subscriber will be forwarded to a major menu screen 1020 that correlates to the remote control 900 selection or selection from the Home menu screen 1010. The selections on the Home menu 1010 are for large categories of programming options and therefore the major menu 1020 allows the subscriber to further refine the search for the desired television program.

Following the major menu 1020 the subscriber may navigate through one or more submenu screens 1050 from which one particular program for viewing may be chosen. For most programming selections the subscriber will proceed from the Home menu 1010 to a major menu 1020 and then to one or more submenus 1050. However, for certain programming options or functions of the set top terminal 220 the subscriber may skip one or more menus in the sequence. For example, in an embodiment the subscriber may directly access a major menu 1020 by pressing a single icon button. In an alternative embodiment, the Introductory menu 1000 will provide the subscriber with the capability of directly accessing information on his cable television account without proceeding through a series of menus.

The During Program menus (including hidden menus 1380 and program overlay menus 1390) are displayed by the set top terminal 220 only after the subscriber has selected a television program. In order to avoid disturbing the subscriber, the set top terminal 220 does not display the hidden menus 1380 until the subscriber selects the appropriate option to display the hidden menu 1389. The hidden menus 1380 contain options that are relevant to the program selected by the viewer. For example, a hidden menu 1380 may contain options that enable a subscriber to enter an interactive mode or escape from the selected program.

The Program Overlay Menus 1390 are similar to the Hidden Menus 1380. However, the Program Overlay Menus 1390 are overlayed onto portions of the displayed video and not hidden. The software for the Program Overlay Menus 1390 allows the subscriber to continue to watch the selected television program with audio but places graphical information on a portion of the television screen. Most of the Program Overlay Menus 1390 are graphically generated to cover small portions of video. Some of the Program Overlay menus 1390, which are by their nature more important than the program being viewed may overlay onto greater portions of the video. Examples of types of overlay menus 1390 include Notification Menus 1392 and Confirmation Menus 1394. In an embodiment, the software for the Program Overlay Menus 1390 controls the reduction or scales down the (entire) programs video and redirects the video to a portion of the screen.

Submenus provide the cost of viewing the program and the program's length in 12 hours and minutes. From the submenus, the subscriber is given at least three options: (1) to purchase a program (2) to return to the previous menu, and (3) to press "go" and return to regular TV. The subscriber may also be given other options such as previewing the program.

Using an on-screen menu approach to program selection, there is nearly an unlimited number of menus that can be shown to the subscriber. The memory capability of the set top terminal 220 and the quantity of information that is sent using the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment described.

The goal of the menu driven program access system 200 is to allow the subscriber to choose a program by touring through a series of menus, organized generally as depicted in FIG. 17, utilizing the remote control 900 for cursor movement. The final choice in the series of menus will identify one particular channel and one time for activation of that channel. Armed with a channel and activation time the set top terminal 220 can display the selected. program on the television for the viewer. To achieve this goal a sample embodiment assigns an intelligent alpha-numeric code to each program. This alpha-numeric code identifies the category of the program, the menu in which the should be displayed, its transmission time(s), and the position on the menu that the program should be displayed.

In an embodiment, the menu format information is stored at the set top terminal 220 in temporary memory either in a RAM, FLASH ROM, EEPROM or EPROM. This configuration provides the desired flexibility in the menu format while still limiting the amount of information needed to be communicated via the program control information signal. New menu format information can be sent via the program control information signal or the STTCIS to the set top terminals 220 each time there is a change to a menu.

Program access information for each program watched is stored at the set top terminal 220 until it is polled by the network controller 214 for information retrieval using the program control information signal or STTCIS. This information retrieval can be accomplished by using the polling request message and response formats, 920 and 920' respectively, as shown in FIGS. 6a and 6b, and described above, but any suitable polling request and response message format may be used to interrogate each set top terminal 220 sequentially, one by one. The set top terminals 220 are identified by a unique address and set top terminal identifier. It is preferred that the set top terminal 220 transmit information and messages to the network controller 214 only when given permission by the network controller 214 to do so.

Where, for example, specialty programs have been accessed since the previous poll, the set top terminal 220 is given permission to transmit a polling response 920' in the form of a status report that includes any such access information. The network controller's control receiver (not shown) is tasked with the receipt of set top terminal polling responses or status reports. These status reports generally include information that allows the network controller 214 to track a subscriber's program access history.

Figure 18:
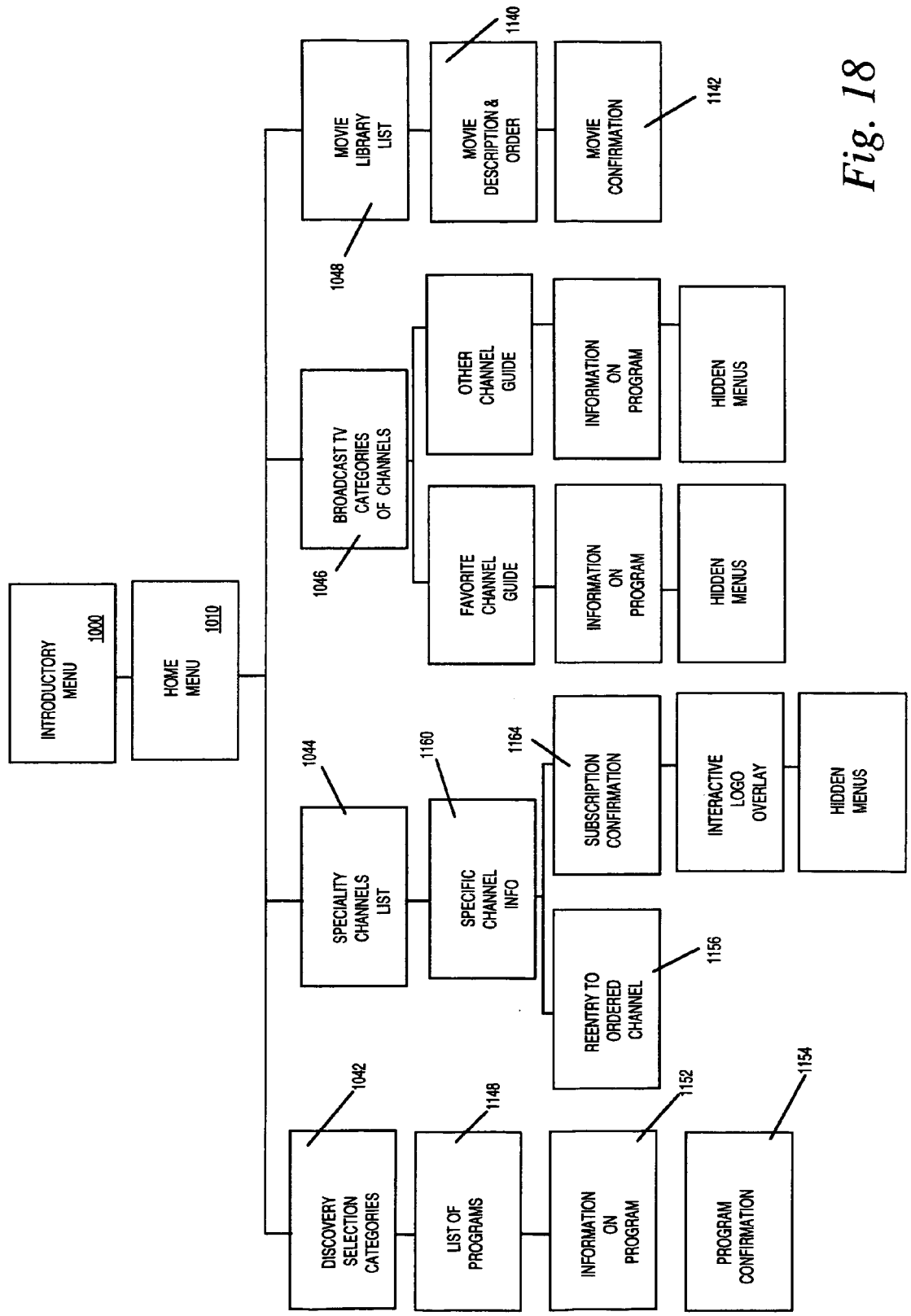
FIG. 18 is another program menu structure.

FIG. 17 shows an embodiment for subscriber-selection-of-television programming. FIG. 18 shows additional major menu 1020 categories, 1042, 1044, 1046 and 1048. The Introductory menu 1000 followed by the Home menu 1010 is one sequence of on-screen displays. In the embodiment shown in FIG. 17, the Home menu 1010 provides a choice often major menus 1022, 1024, 1026, 1028, 1030, 1032, 1034, 1036, 1038 and 1040. Upon selection of a major menu 1020 category from the Home menu 1010, the program proceeds to a major menu 1020 offering further subscriber selections. Each major menu 1020 may be customized to target the expected viewership. Depending on the number of available program choices the major menus 1020 may either breakdown the major category into sub-categories or provide the subscriber with access to further information on a particular program.

For example, the major menu for children's programming provides a list of 1 subcategories 1052 from which the subscriber selects. Upon selection of a subcategory a submenu 1054, 1056 listing program choices within that subcategory is shown to the subscriber. Upon selection of a particular programming choice within the first submenu 1050, the subscriber is then provided with a second submenu 1058 describing the program that the subscriber has selected. From this menu, the subscriber may now confirm the program choice and receive a confirmation submenu 1060 from the set top terminal 220 software.

Figure 19A:
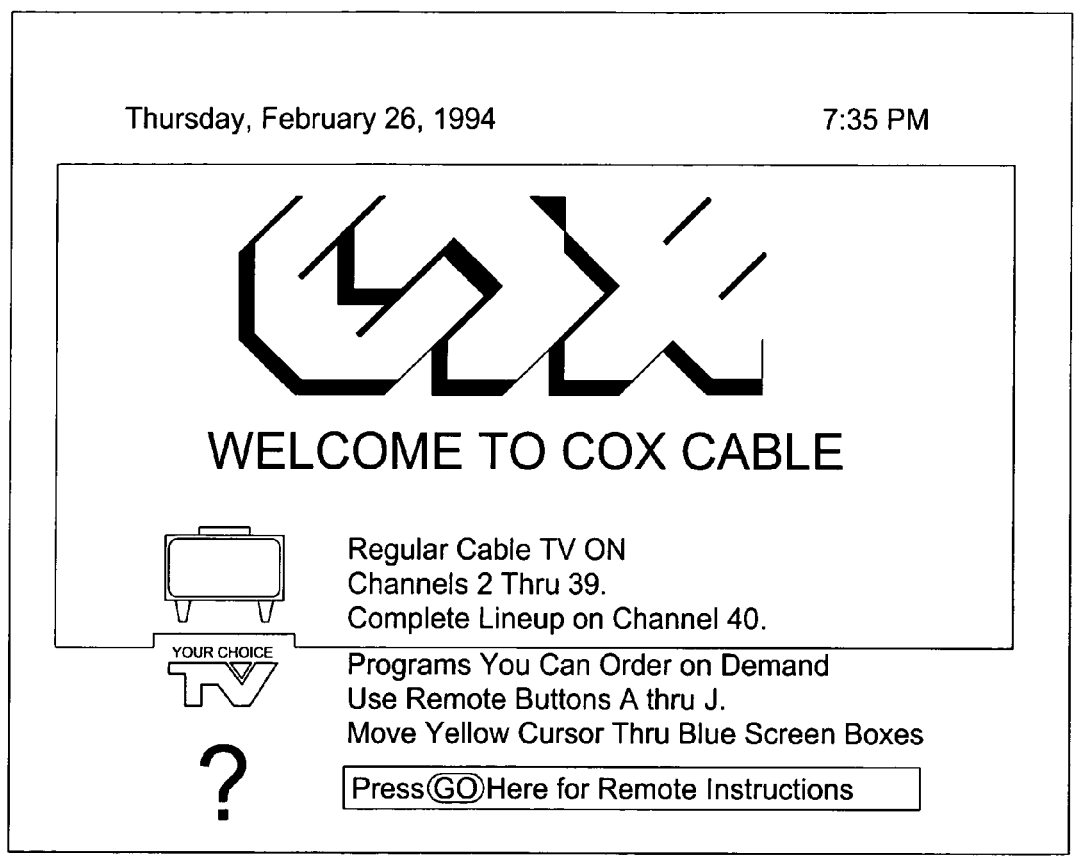
FIGS. 19a and 19b show introductory menu screens.
Figure 19B:
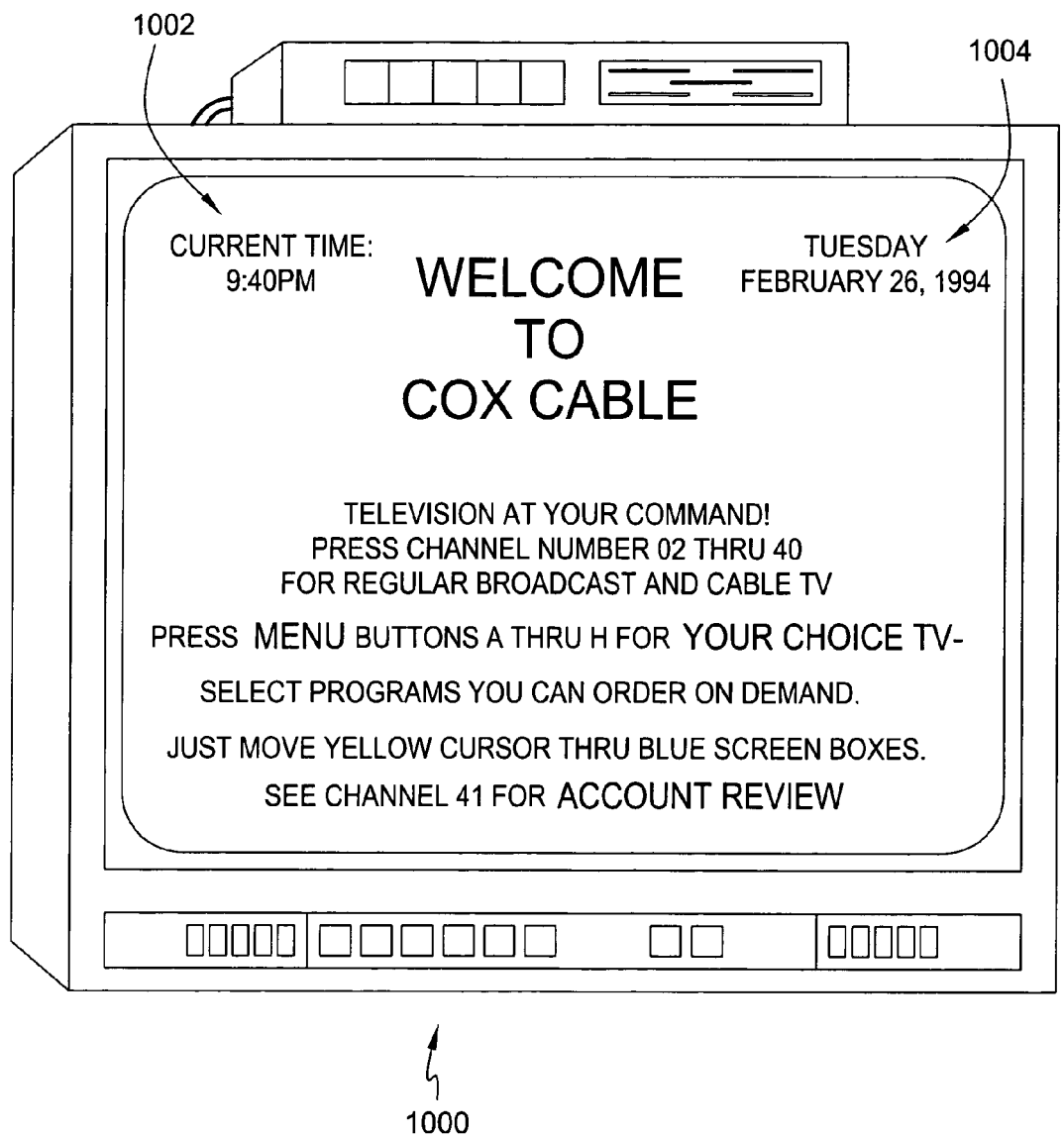
Figure 20A:
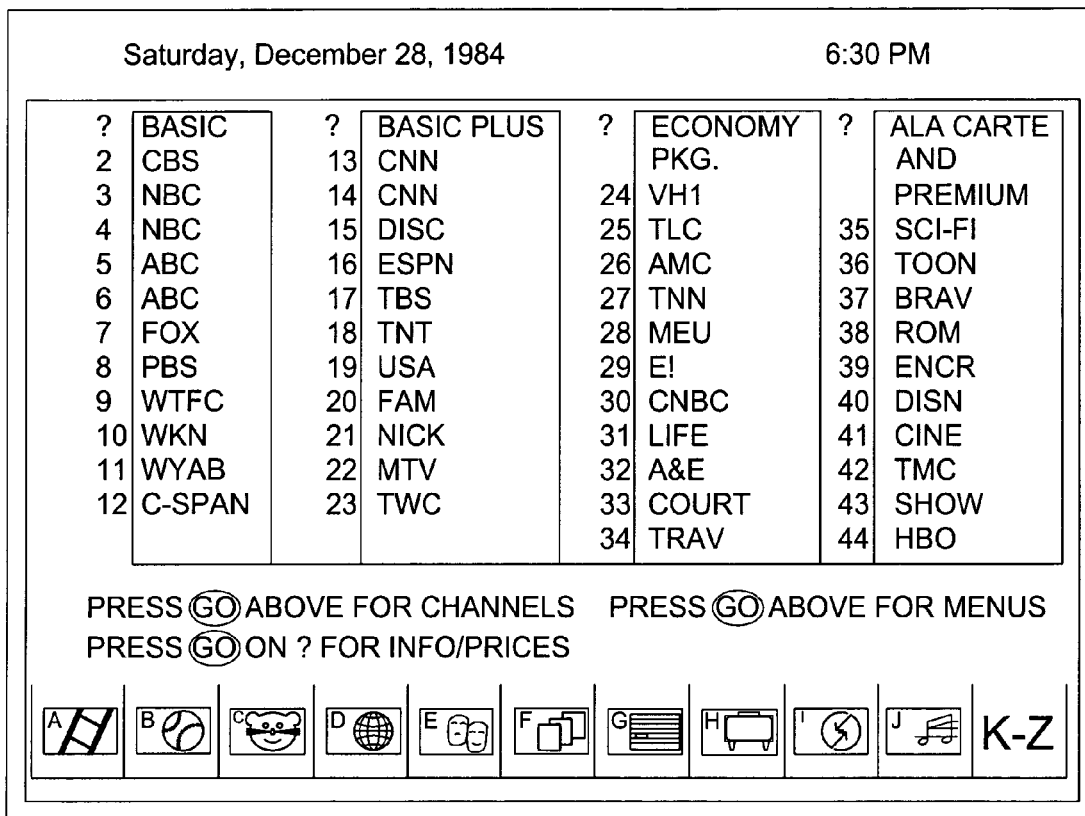
Figure 20B:
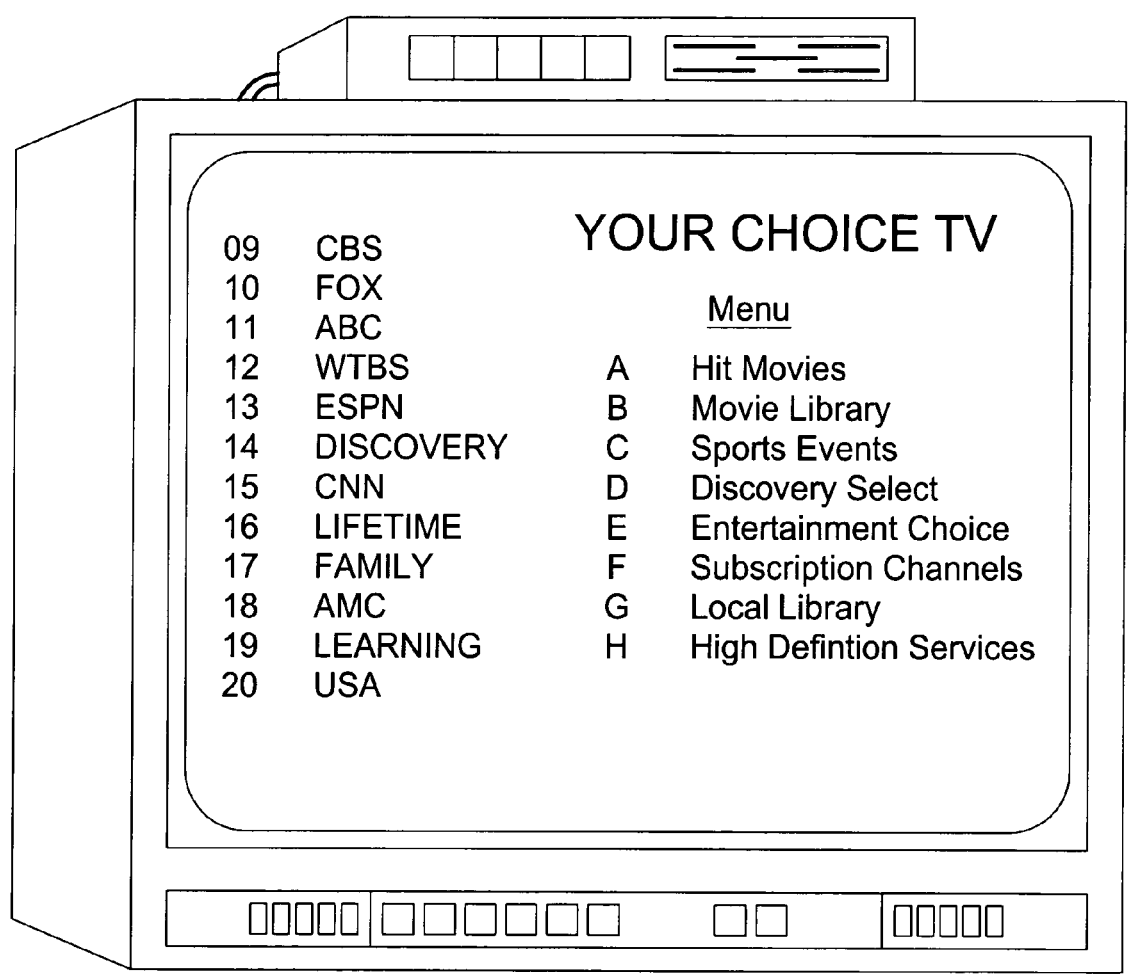
Figure 20C:
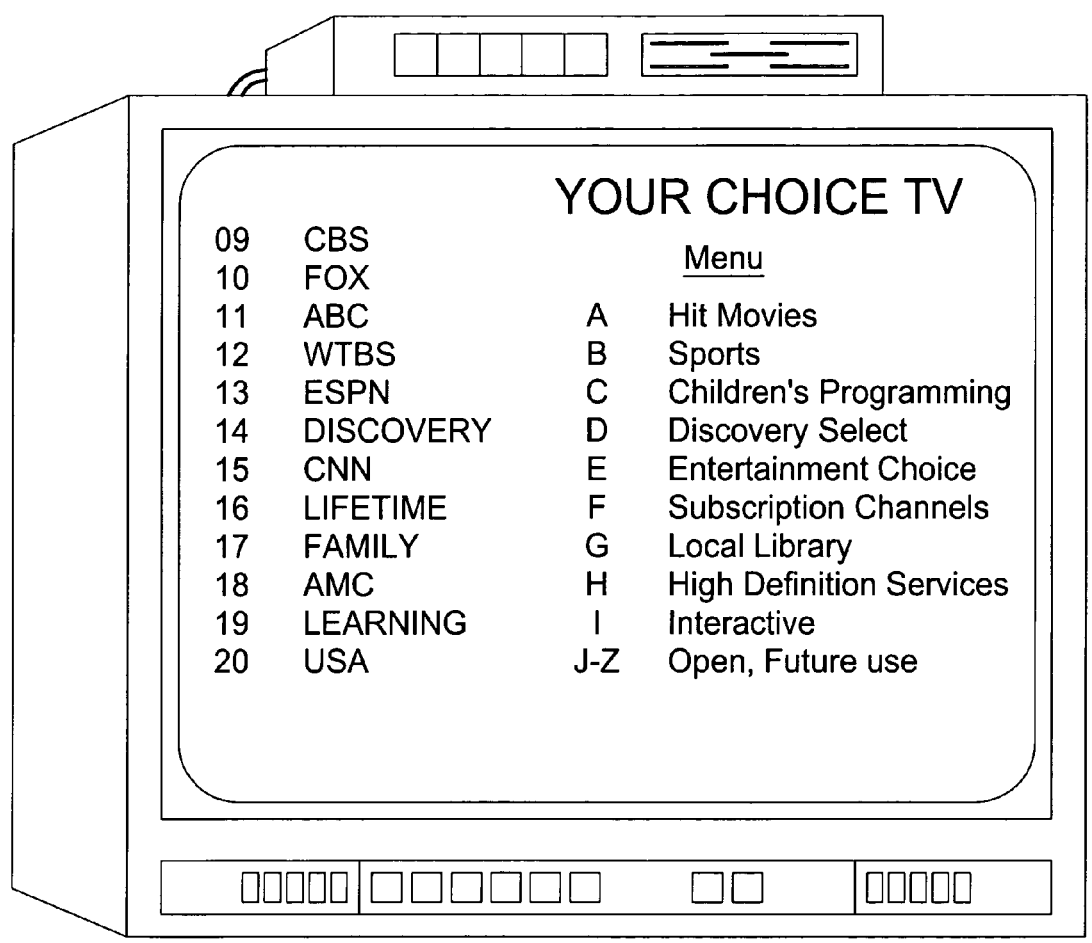

FIGS. 19a and 19b show examples of introductory menu screens that are displayed on the subscriber's television. The introductory menu screen shown in FIG. 19a, welcomes the subscriber to the program delivery system 200 and offers the subscriber three options. The subscriber may choose regular cable television (for example, channels 2 through 39), programs on demand (e.g., movies), or instructions on the use of the remote control 900. Other basic program options are possible on the introductory menu screen. For example, instead of, or in addition to, the remote control 900 instructions, a system "help" feature can be offered on the Introductory menu 1000. FIG. 19b shows an alternate embodiment for the Introductory menu 1000. In the upper left-hand corner of the menu, there is a small window 1002 that may be customized to the subscriber. A subscriber will be given the option of showing the current time in this window. In the upper right-hand corner a second customized window 1004 is available in which a subscriber may show the day and date. These windows may be easily customized for subscribers to show military time, European date, phase of the moon, quote of the day, or other informational messages. These windows may be customized by subscribers using on-screen menu displays following the Introductory menu 1000. Alternately, the windows may be used to target videos, including advertisements to individual subscribers.

FIGS. 20a, 20b, 20c, and 20d are examples of home menus 1010 that may be used in the set top terminal 220 software. FIGS. 20a–20d all employ multiple window techniques to make the menu user friendly and offer a significant number of choices. The Home menu 1010 of FIG. 20d adds an additional feature at the bottom of the television screen 1011. This option allows a subscriber to see only those program selections that are available on broadcast television. FIGS. 20a–20d are but a few of the numerous variations available for the Home menu 1010.

Figure 21A:
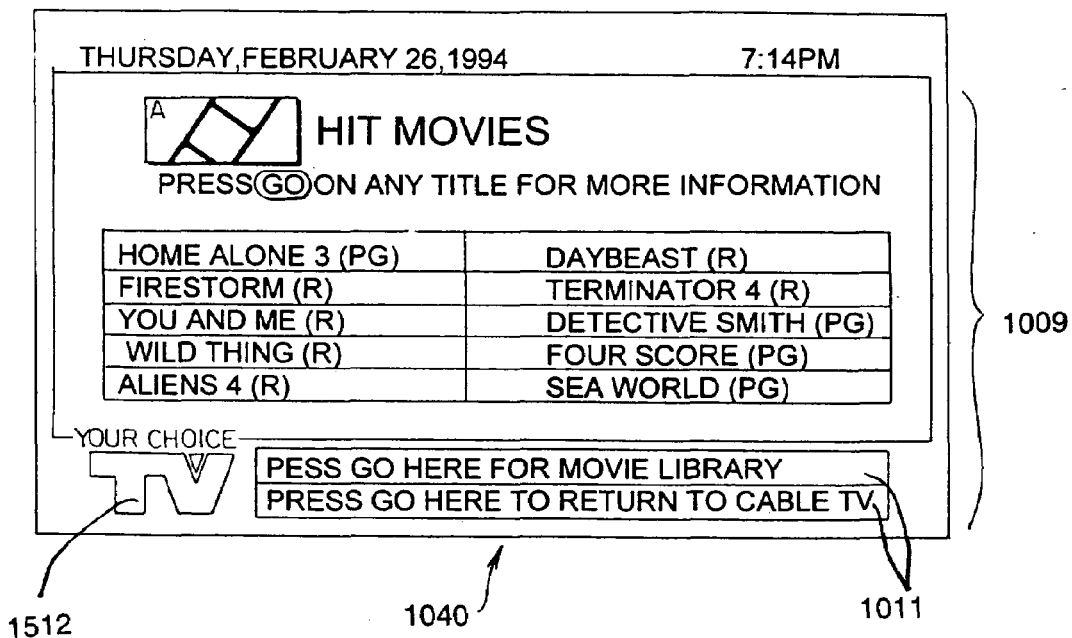
FIGS. 21a and 21b show major menu screens for hit movies.
Figure 21B:
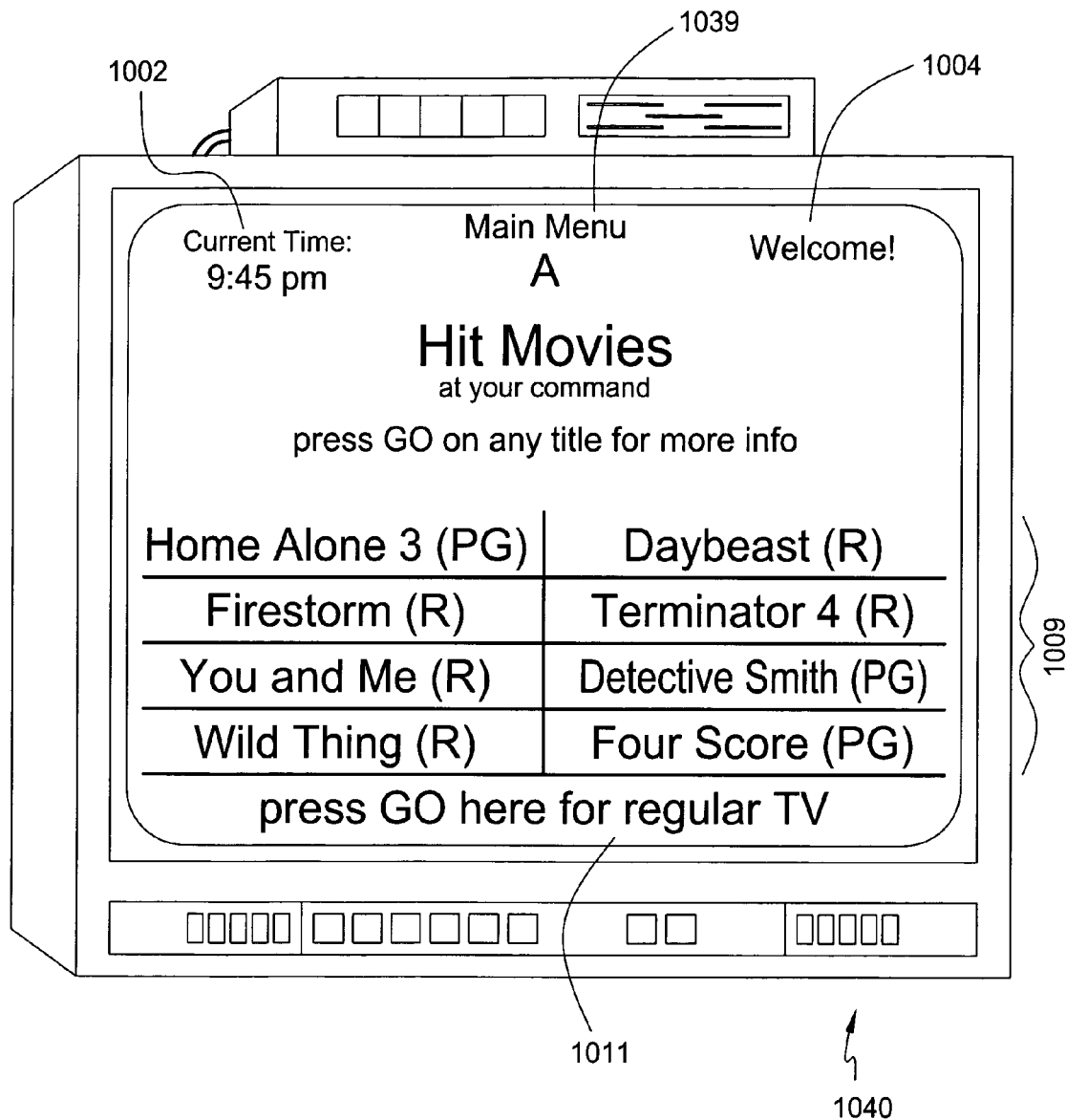

FIGS. 21a and 21b are examples of major menus 1020. In particular, FIGS. 21a and 21b show a major menu 1040 whose category is hit movies. In FIG. 21b, the left upper window 1002 displays current time and the right upper window 1004 displays a message. This menu provides a list of eight movie titles and their rating 1009. If the subscriber desires further information on any particular movie he may select a movie using the cursor movement buttons and press the "go" button on the remote control 900 or set top terminal 220.

To make the menu aesthetically pleasing, the instructions are given across the center of the screen and choices in large legible type are provided. Additionally, at the bottom of most menu screens 1011, the subscriber is given the option of returning to regular TV or returning to the Home menu 1010.

Figure 22A:
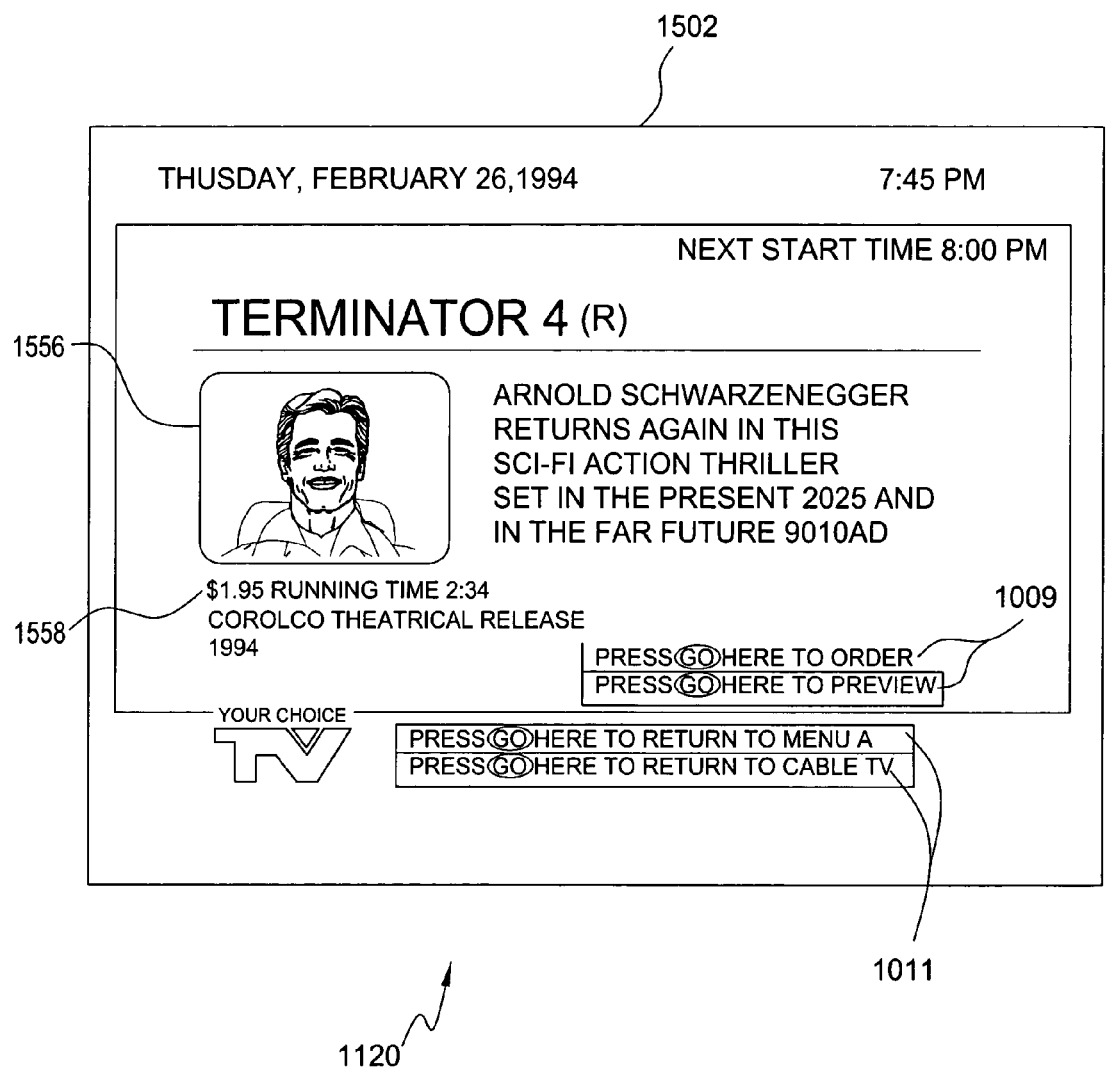
FIGS. 22a and 22b show submenus related to the FIGS. 21a and 21b major menus.
Figure 22B:
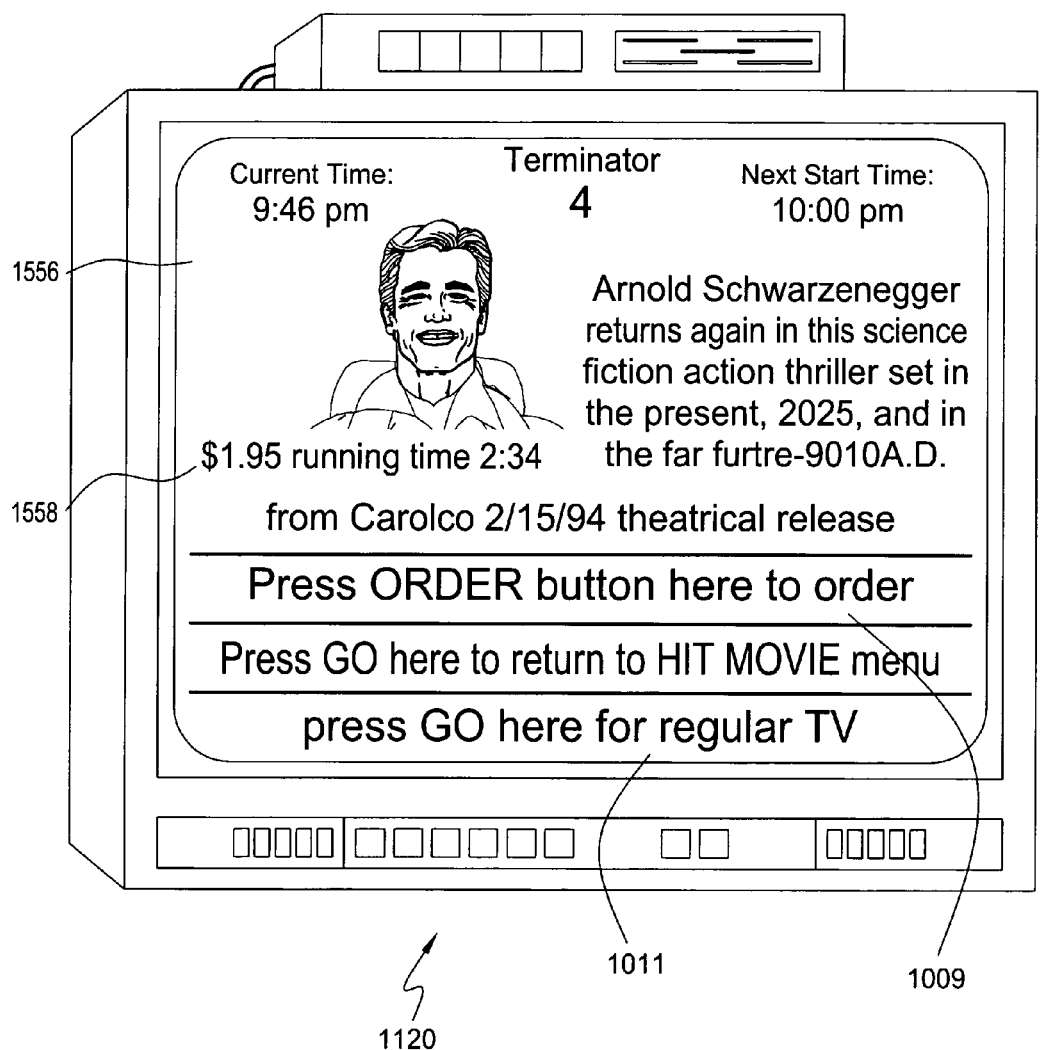

In FIG. 21b, the movie titled Terminator 4™ is highlighted, signifying that the subscriber has chosen this program option from the hit movie major menu. FIGS. 22a and 22b show submenus 1120 which would follow the selection of Terminator 4™ on the hit movie major menu.

In order to allow subscribers to view hit movies at their convenience, multiple start times for the same movie are provided. In order to provide the multiple start time service, the same movie must be shown on multiple channels at staggered start times. For example, if Terminator 4™ is a two-hour length movie it can be shown continuously on eight different channels, with each showing delayed fifteen minutes after the previous showing. This allows the subscriber to begin viewing the movie within a fifteen minute time interval. Since the subscriber is not required to find the channel which has the correct start time, the subscriber is unaware that the movie is being shown on eight different channels. In fact, with the use of the submenus 1120, the subscriber is able to nearly effortlessly choose the correct channel and correct activation time for viewing the desired movie. The channel selection is invisible to the subscriber.

The FIGS. 22a and 22b movie description submenus 1120 retain the title in a window at the top center of the screen. A multiple window technique is used in the middle of this menu to display a description of the movie and one or more video frames that assist the subscriber in selecting the movie. This window of video 1556 that is provided by the menu may be a still picture, a short but repetitive video cut, or a portion of the movie that is currently showing on any one of the channels carrying the movie at the time of the submenu's 1050 display.

Moving towards the bottom of the menu, the subscriber is given at least three options. One, the ability to order the movie 1009, two, to return to the hit movie menu 1011, and three, to press "go" and return to regular TV 1011. In the preferred embodiment, the subscriber is also given the option of previewing the movie. FIGS. 22a and 22b show that the Order option has been selected by the subscriber 1009.

Figure 23A:
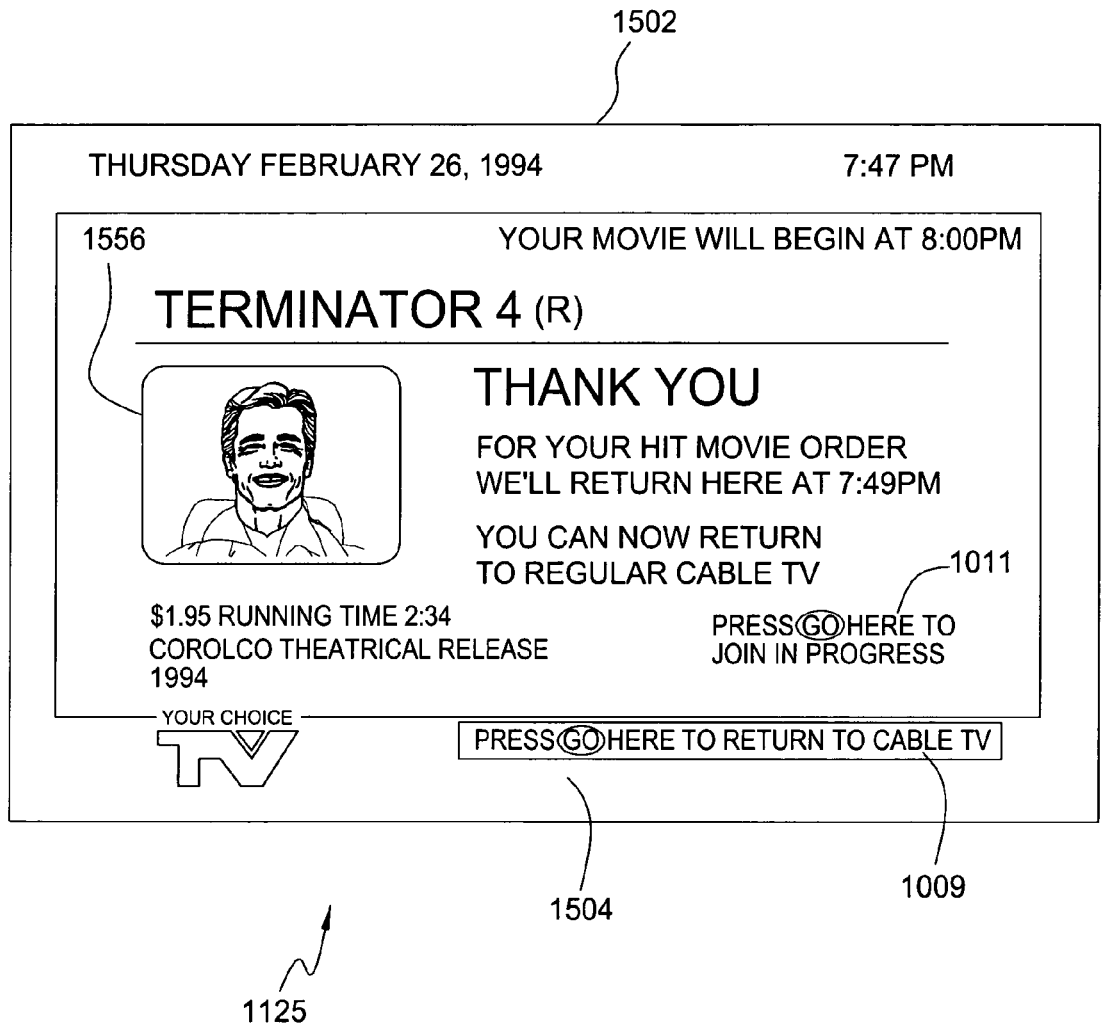
FIGS. 23a and 23b show additional submenus related to the FIGS. 21a and 21b major menus.
Figure 23B:
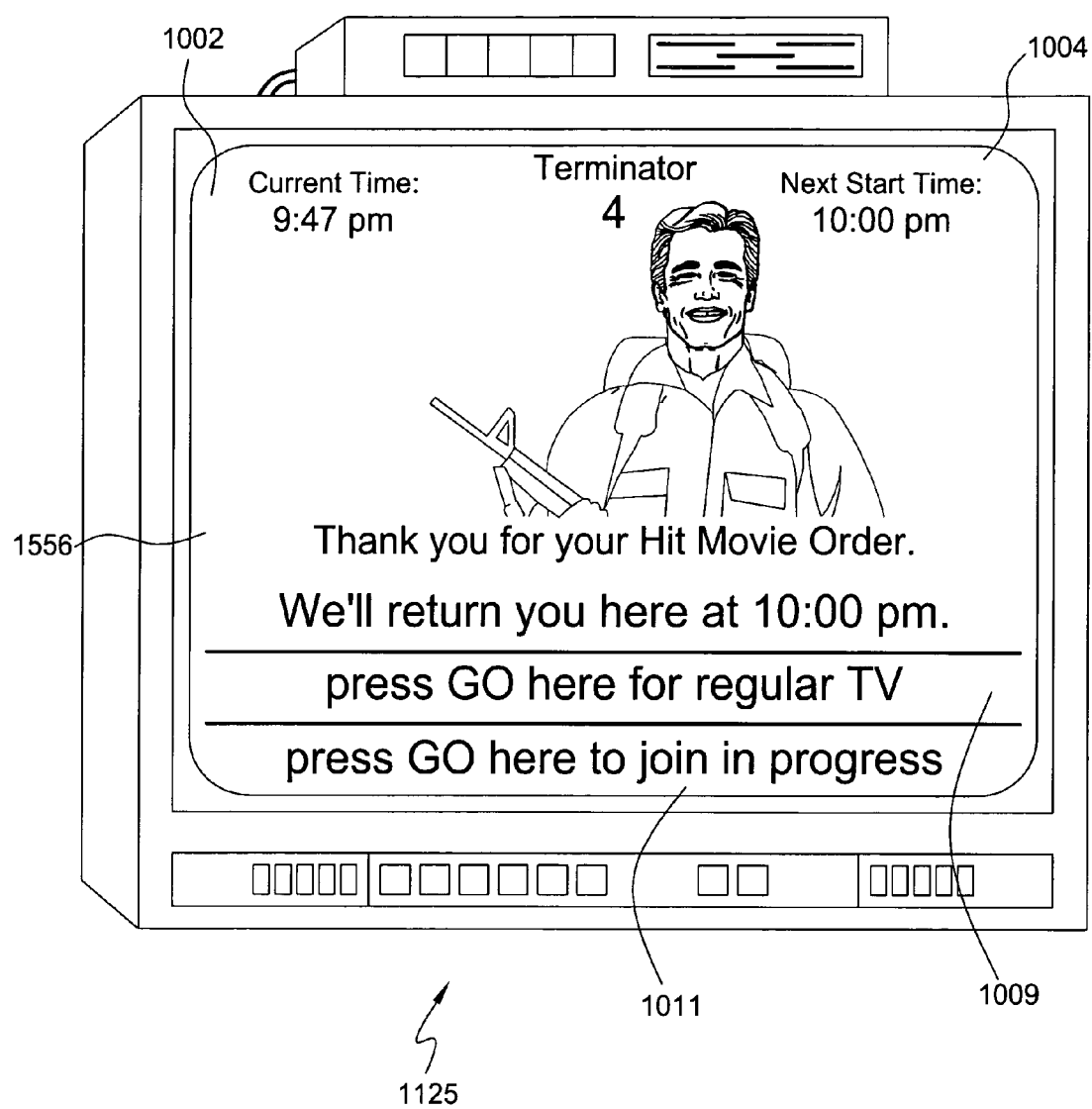

FIGS. 23a and 23b show the next submenu 1125 in the hit movie menu sequence from the selection of Terminator 4™ This particular submenu 1125 shows confirmation of the subscriber's hit movie order of Terminator 4™. FIG. 23a retains the sash across both the top 1502 and bottom 1504 of the screen. The format of the FIG. 23b menu 1125 maintains the current time in the left upper window 1002, the title in the top center window, and the next start time in the upper right-hand window 1004.

Figure 24A:
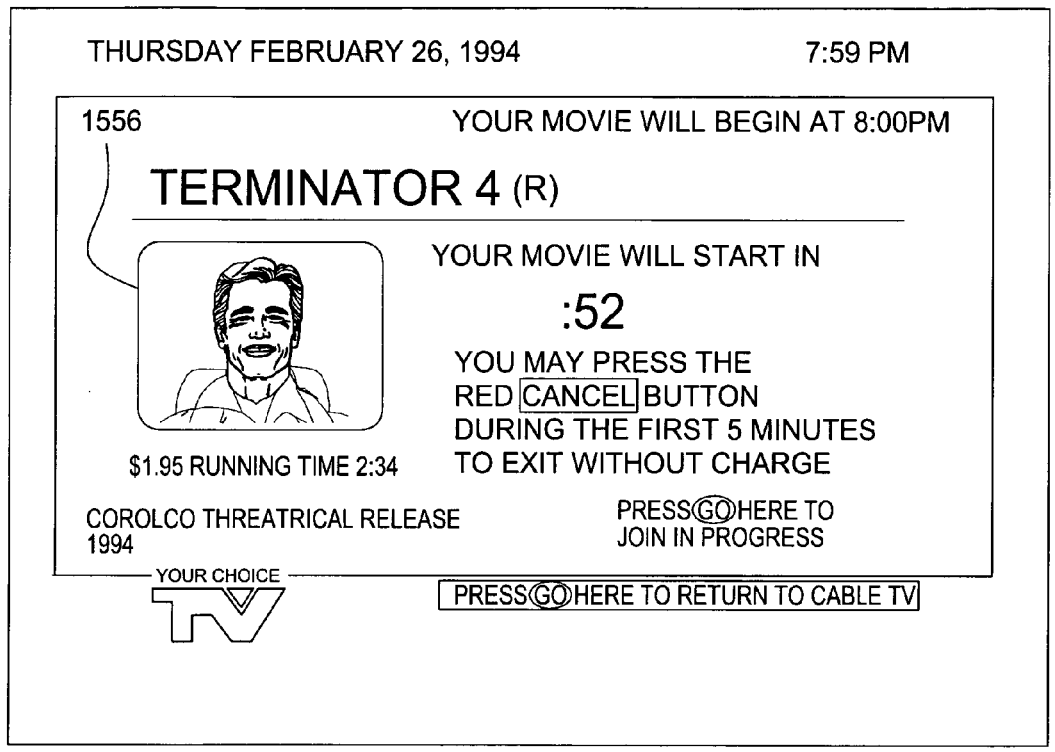
FIGS. 24a and 24b are hit movie notification submenus.
Figure 24B:
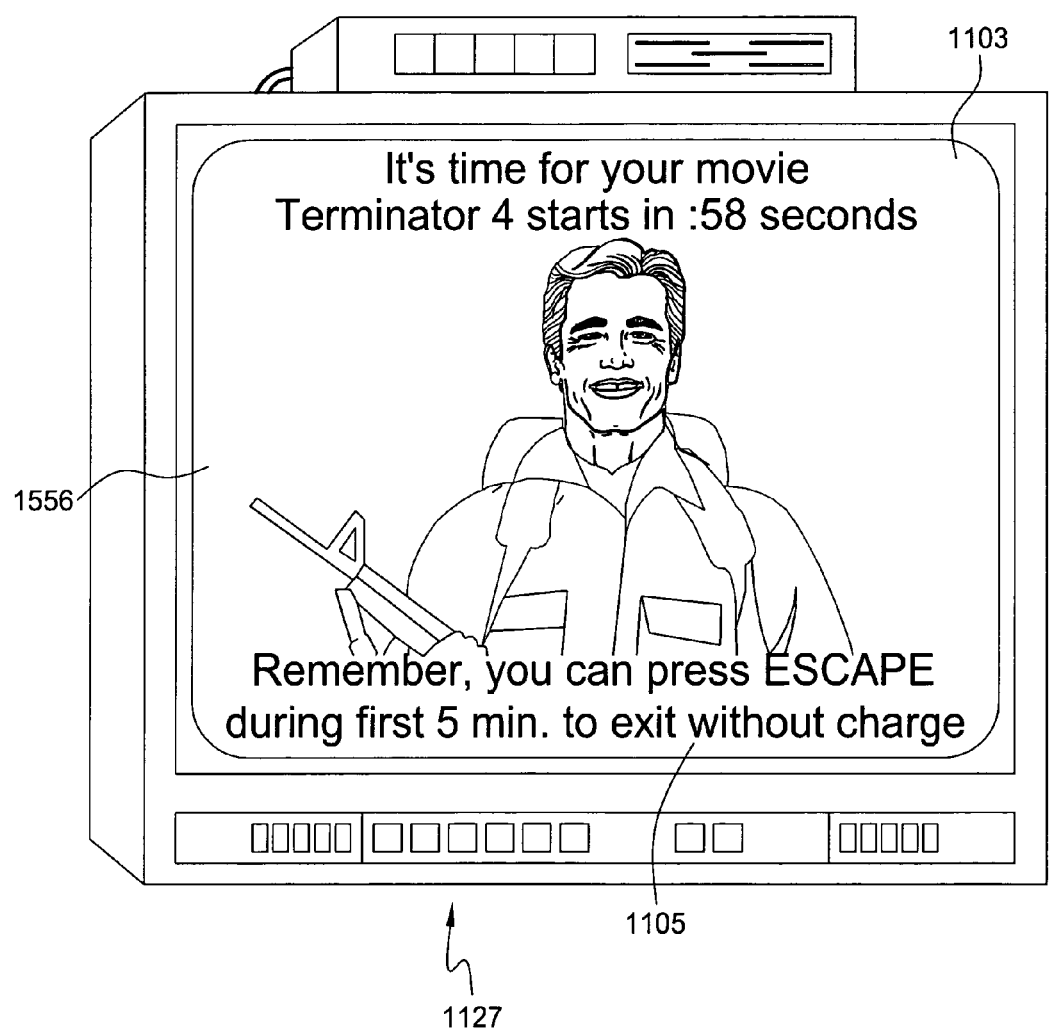

FIGS. 24a and 24b are notification submenus informing the user that his program selection is about to begin (e.g., counting down until start time). Using this submenu, the set top terminal 220 warns the subscriber prior to switching away from the channel being viewed to a prior selected program channel. This notification submenu is provided to the subscriber approximately one or more minutes before the set top terminal 220 changes the viewing channel.

Both notification submenu examples allow the subscriber to cancel the movie order. In FIG. 24a, the subscriber is notified in the center of the screen that he may cancel within the first five minutes. In FIG. 24b the subscriber may press escape to cancel the order without charge. The notification submenu of FIG. 24b informs the subscriber of the start time at the upper portion of the screen.

FIG. 25a is an overlay menu 1133 warning that the subscriber is escaping a program after being charged for the order of that program. The warning overlay menu 1133 of FIG. 25a follows in sequence and is prompted by a hidden menu which constantly monitors for subscriber input during viewing of the program.

Figure 25B:
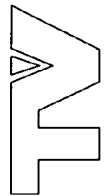
FIG. 25b is a hit movie re-entry submenu.

FIG. 25b is a reentry to ordered selection submenu 1135 for the hit movie category. The reentry to ordered selection submenus appear whenever the subscriber selects a programming option (program, event, or subscription channel), that the subscriber has already ordered. The selection submenu 1135 has a program title window with a text title entry, and a description of the order that has already been placed for the program (or channel). In an embodiment, the submenus that allow reentry to ordered selection provide the subscriber with the added option of joining the program within any fifteen minute interval. This feature allows the subscriber who has viewed one-half of a particular program to rejoin the program at the half-way point.

Figure 26:
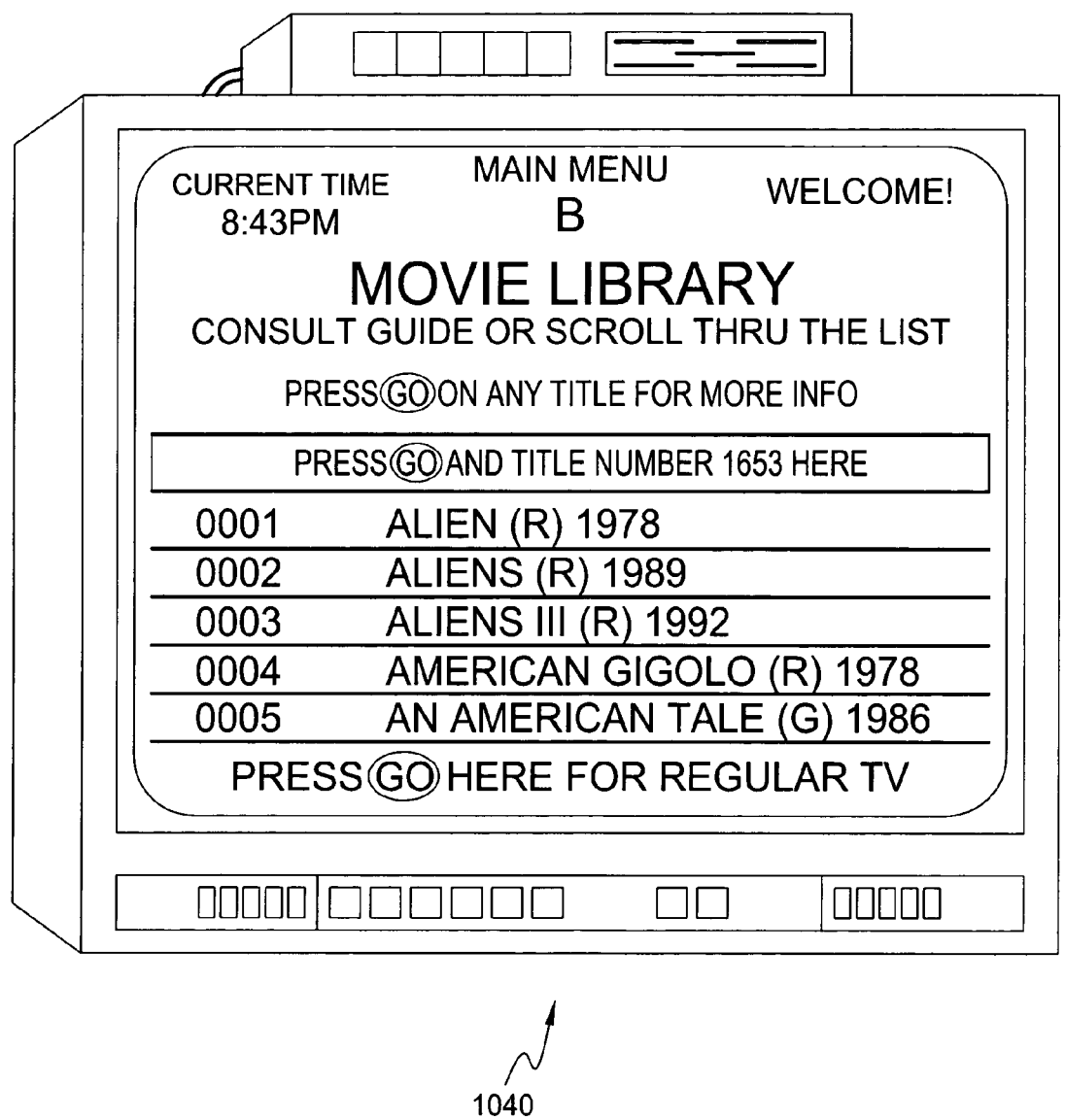
FIG. 26 is a movie library major menu.

FIG. 26 shows the major menu for the movie library category 1048. The movie library category provides subscriber access to a large number of movies. Using several transmission channels, each movie in the library is shown at least once during a one-month period. Using the movie library, a subscriber may access information on a particular movie and ascertain the various start times for that movie.

The movie library major menu shown is an extended menu having many follow-on extensions to the major menu shown. The extended menus continue to show lists of movies in alphabetical order. In an alternative embodiment, the movie library is broken down into subcategories of various types of movies. For instance, movie categories such as murder-mystery, documentaries, westerns, and science fiction may appear on the movie library major menu. By selecting one of these movie library subcategories the subscriber is moved to a particular submenu for that movie library subcategory. Each submenu may list movie titles whose contents fall within the particular subcategory.

Figure 27:
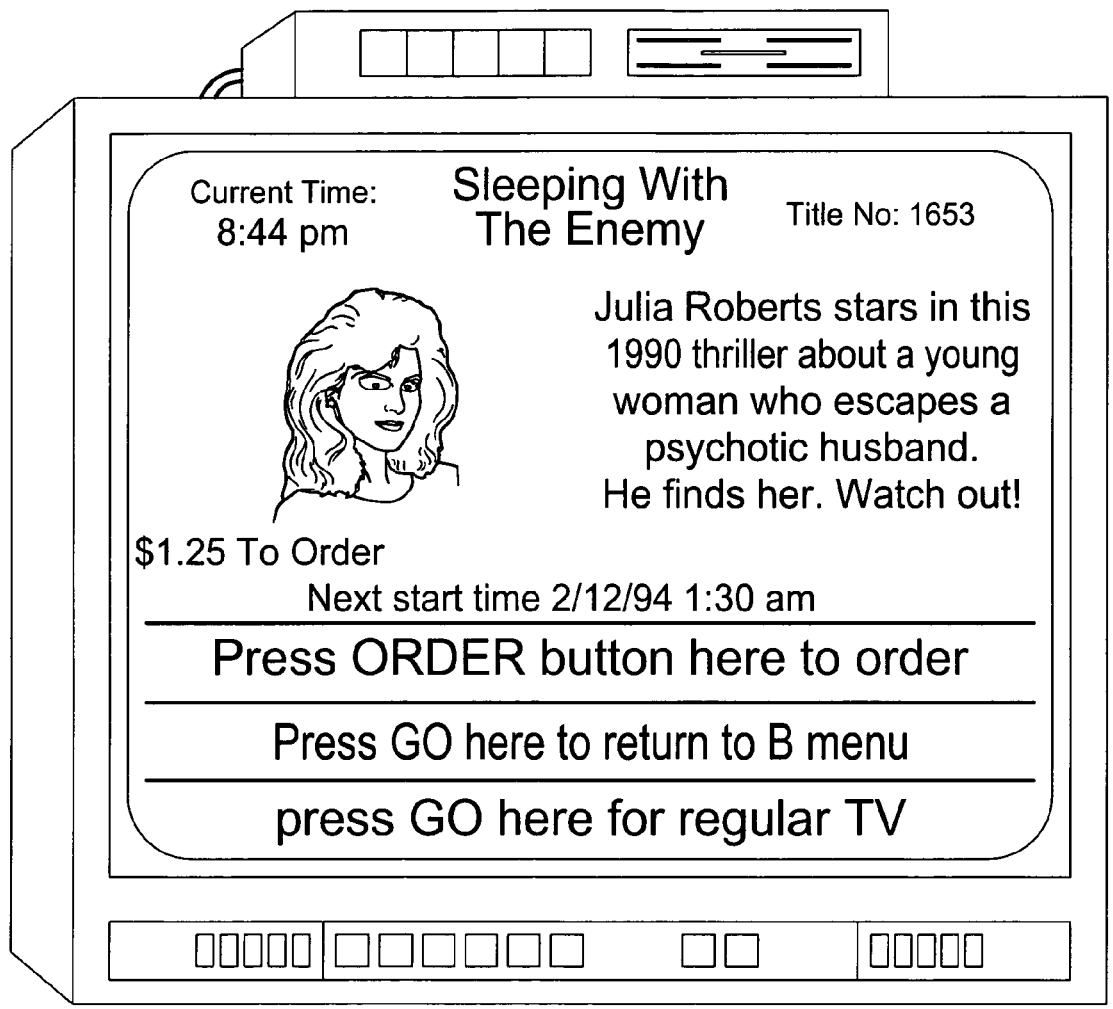
FIG. 27 is a drawing of a hit movie description menu.

Following selection of a movie title, the subscriber is displayed a movie description submenu. FIG. 27 shows a typical movie description submenu 1140. To maintain a similar pattern throughout the menus, FIG. 27, movie description submenu 1140 for the movie library, is designed similarly to FIG. 22b which is a movie description submenu for the hit movies category. The primary difference between FIGS. 27 and 22b is the display of the movie library title number in the upper right-hand corner of FIG. 27. FIG. 27 provides three options for the subscriber. The subscriber may order the movie described, return to the movie library major menu, or return to regular TV.

Figure 28:
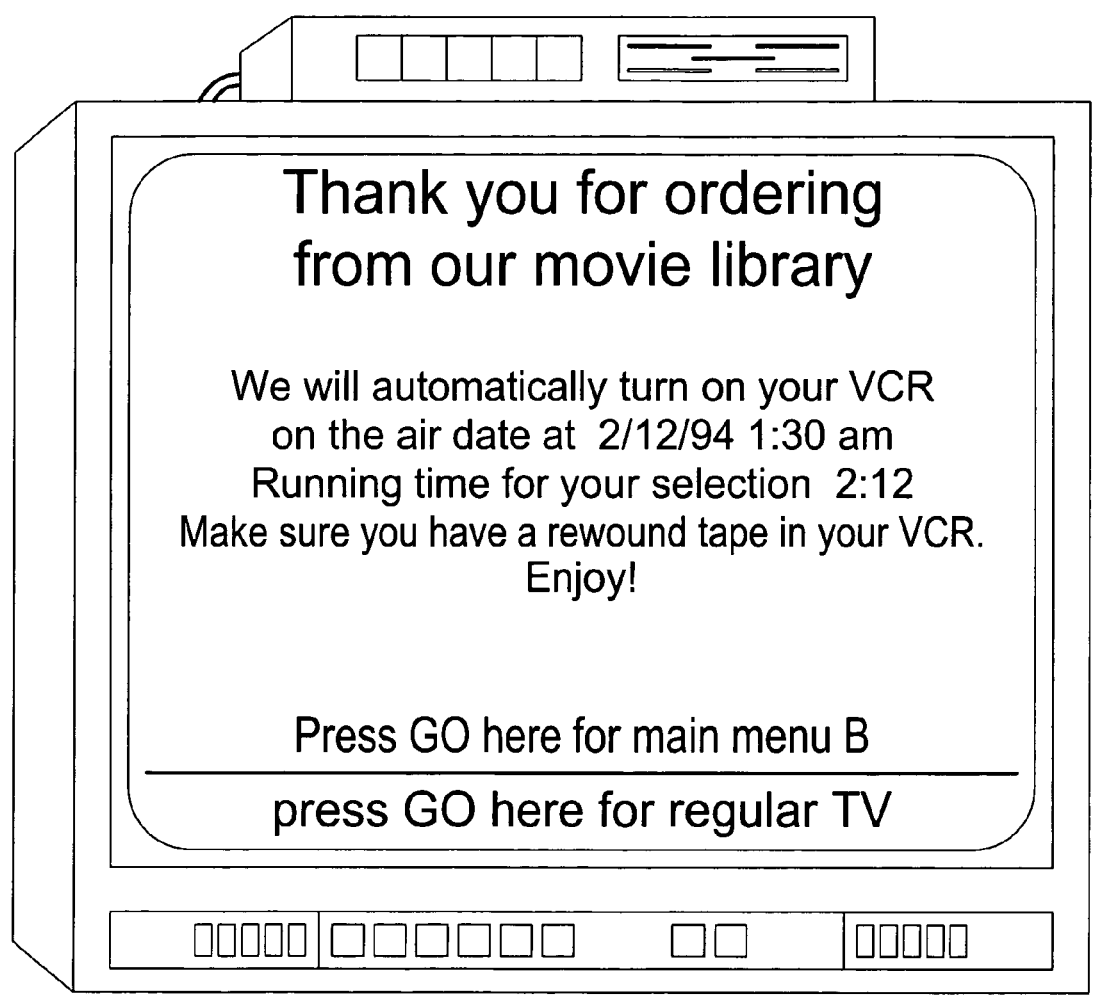
FIG. 28 is a drawing of a movie library confirmation submenu.

FIG. 28 shows a confirmation submenu 1142 for the movie library. This menu screen confirms the movie selection, start date, start time and informs the subscriber that the VCR will be automatically turned on. During display of the submenu 1142, the subscriber may return to the movie library major menu, return to regular TV or cancel the movie library order by pressing the escape button. FIG. 28 shows that the subscriber has selected to return to regular TV. The subscriber's VCR or other video taping equipment must be connected to the set top terminal 220 for the automatic taping feature to operate.

Figure 30A:
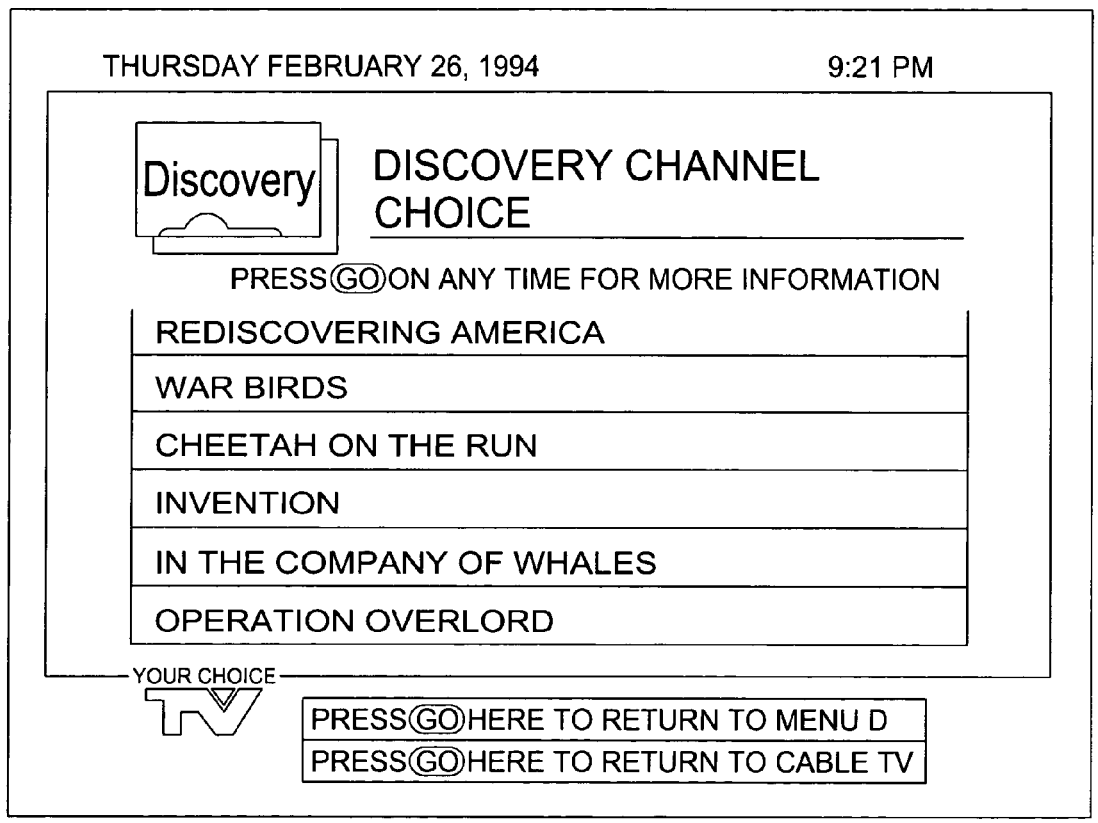
FIGS. 30a and 30b are drawings of submenus for the major menus shown in FIGS. 29a and 29b.
Figure 30B:
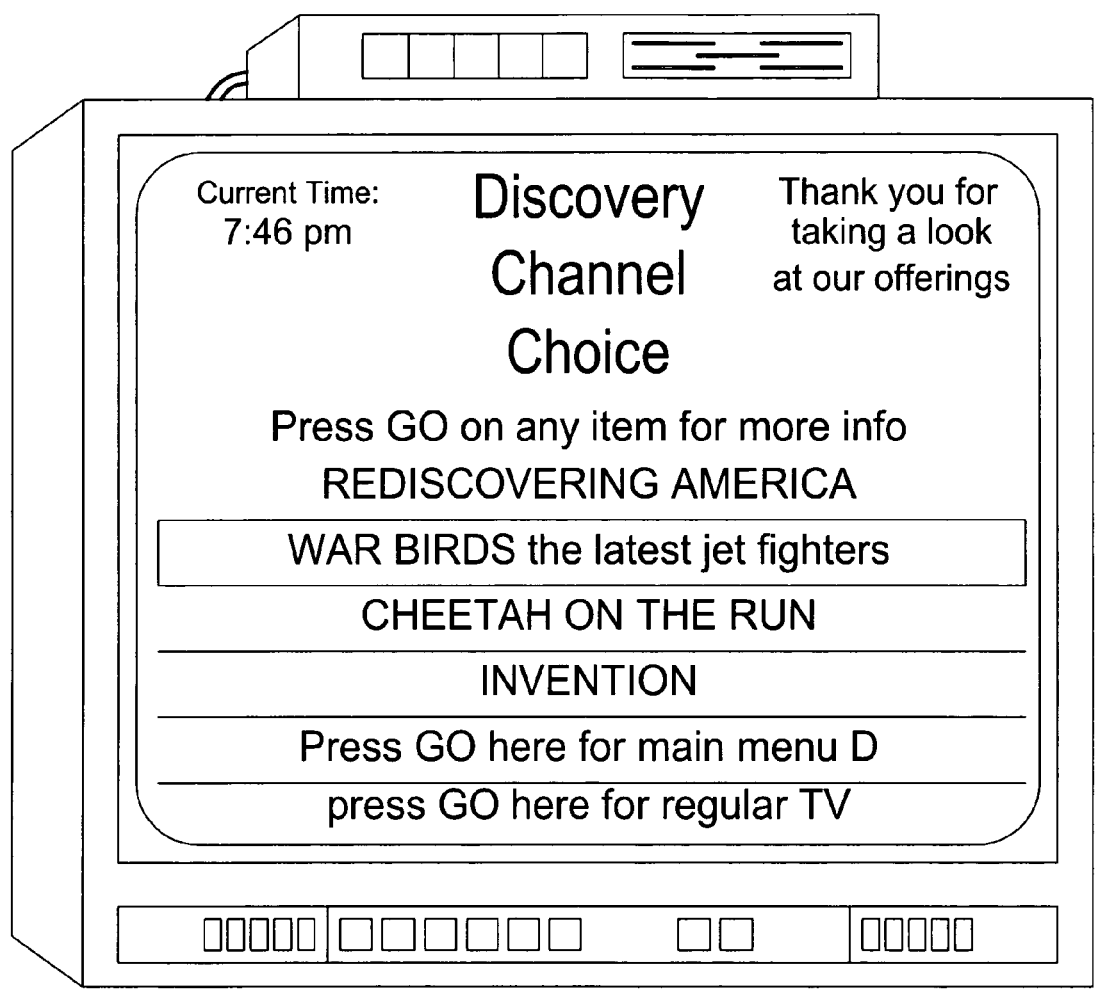
Figure 31A:
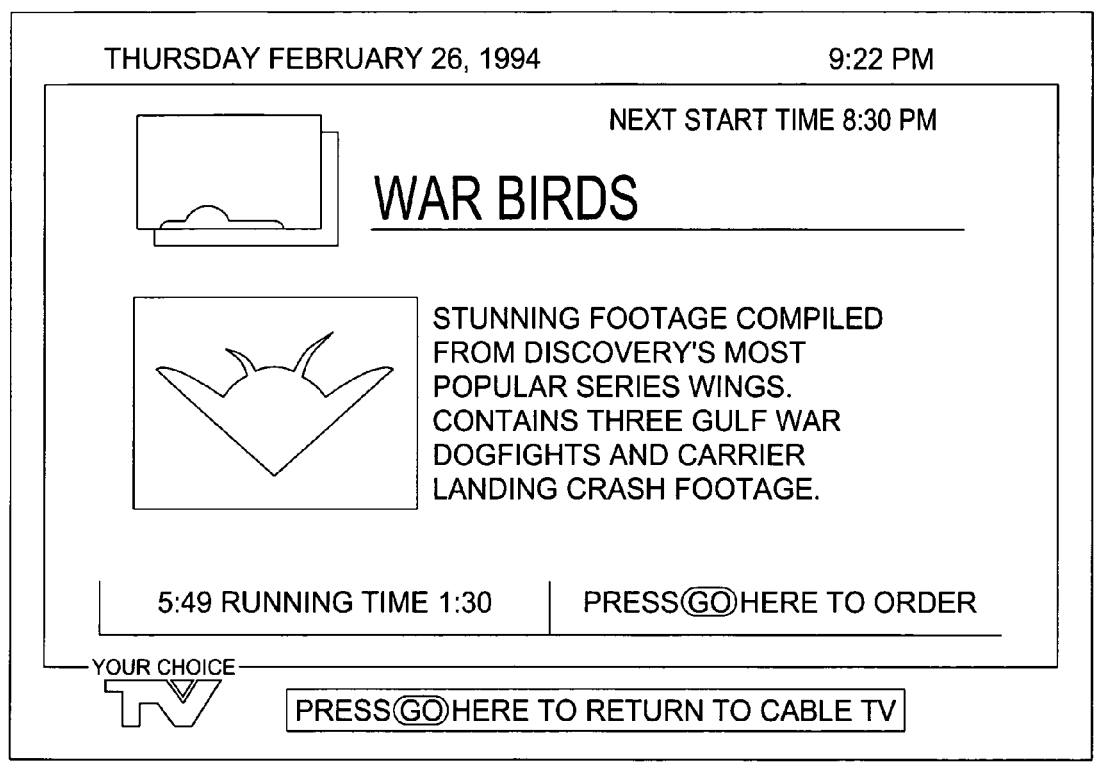
FIGS. 31a and 31b and FIGS. 32a–32c are drawings showing examples of submenus for the menus shown in FIGS. 30a and 30b.
Figure 31B:
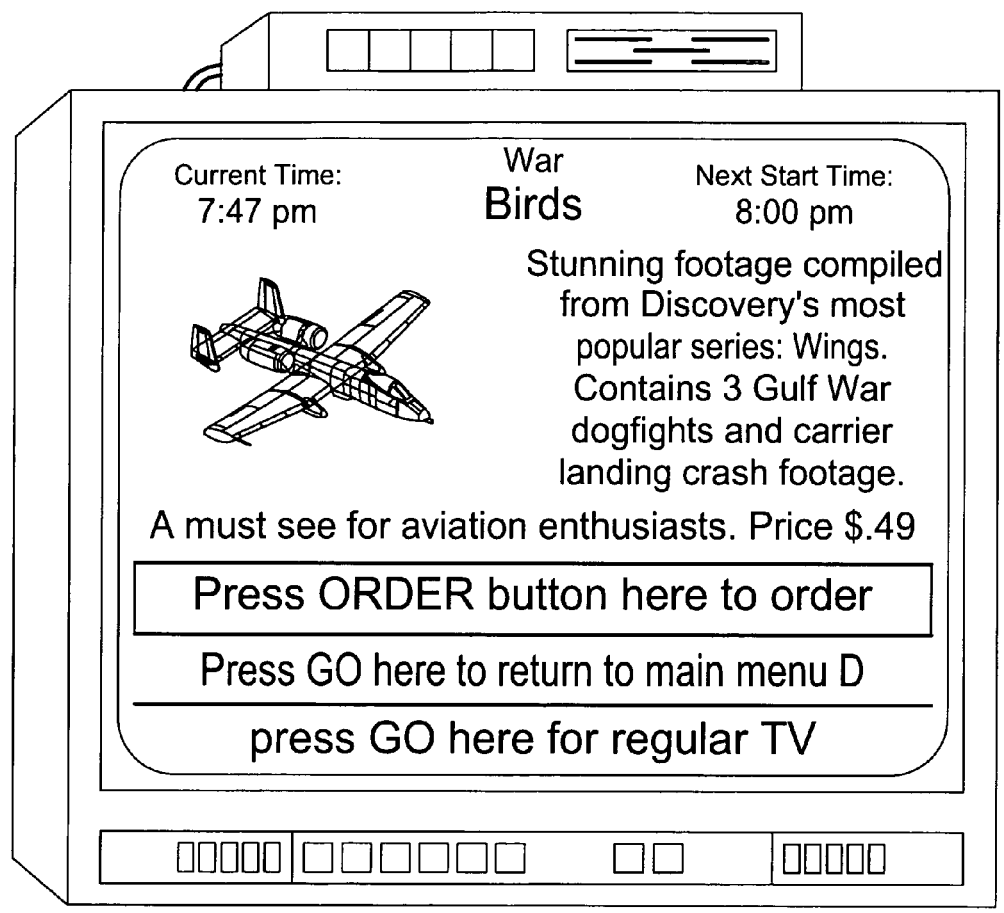
Figure 32A:
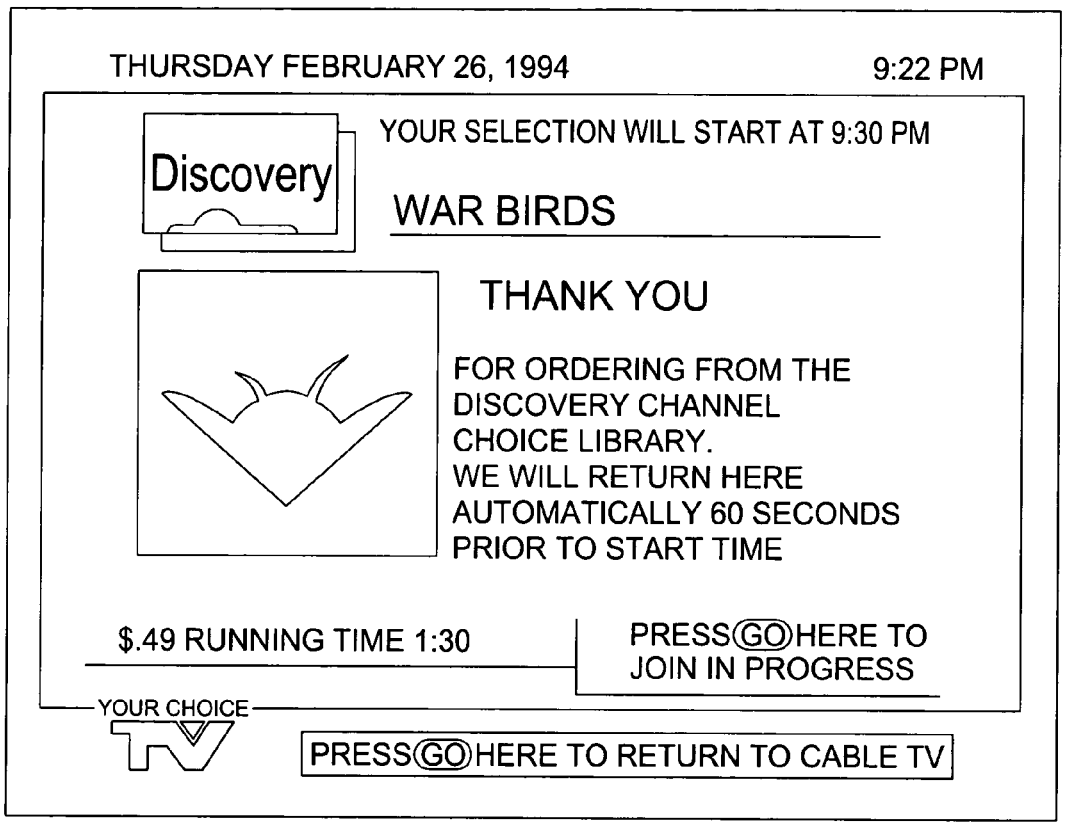
Figure 32B:
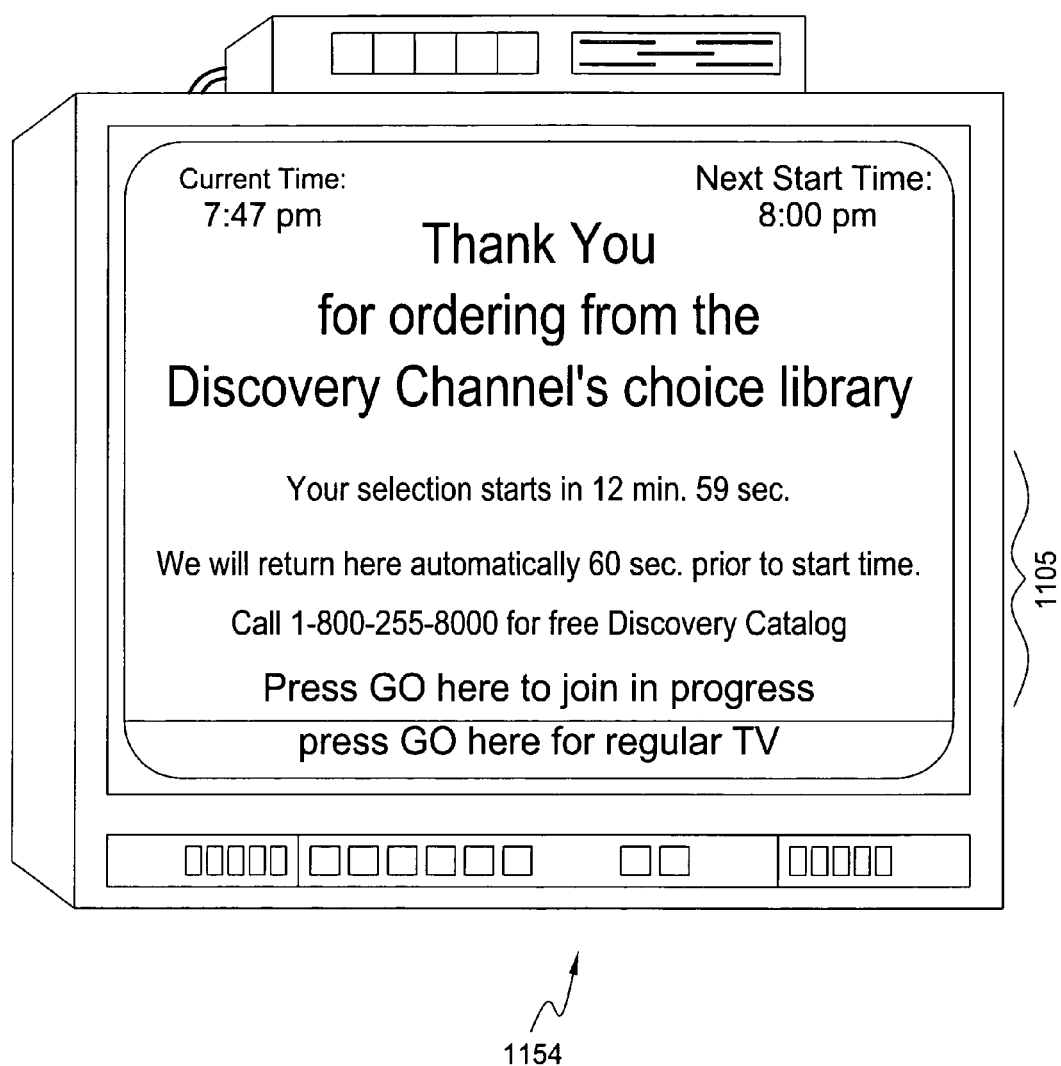

The series of FIGS. 29a, 30a, 31a and 32a, and the series of FIGS. 29b, 30b, 31b, and 32b depict a typical menu sequence including a major menu 1028, 1042 (FIGS. 29a and 29b), a subcategory submenu 1148 (FIGS. 30a and 30b), a program description submenu 1152 (FIGS. 31a and 31b), and a confirmation submenu 1154 (FIGS. 32a and 32b). This simple progression of menus repeats itself through the menu tree of FIGS. 17a and 17b.

Figure 29A:
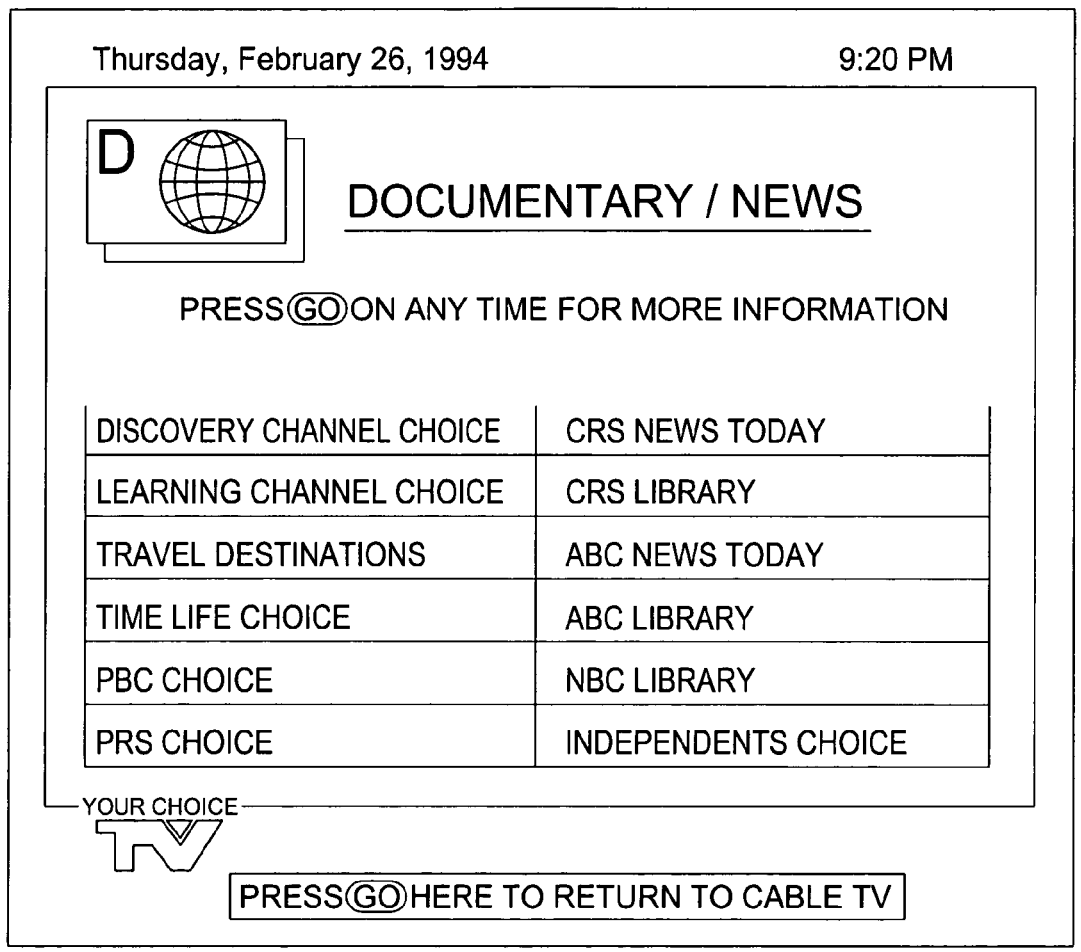
FIGS. 29a and 29b are drawings of major menus.
Figure 29B:
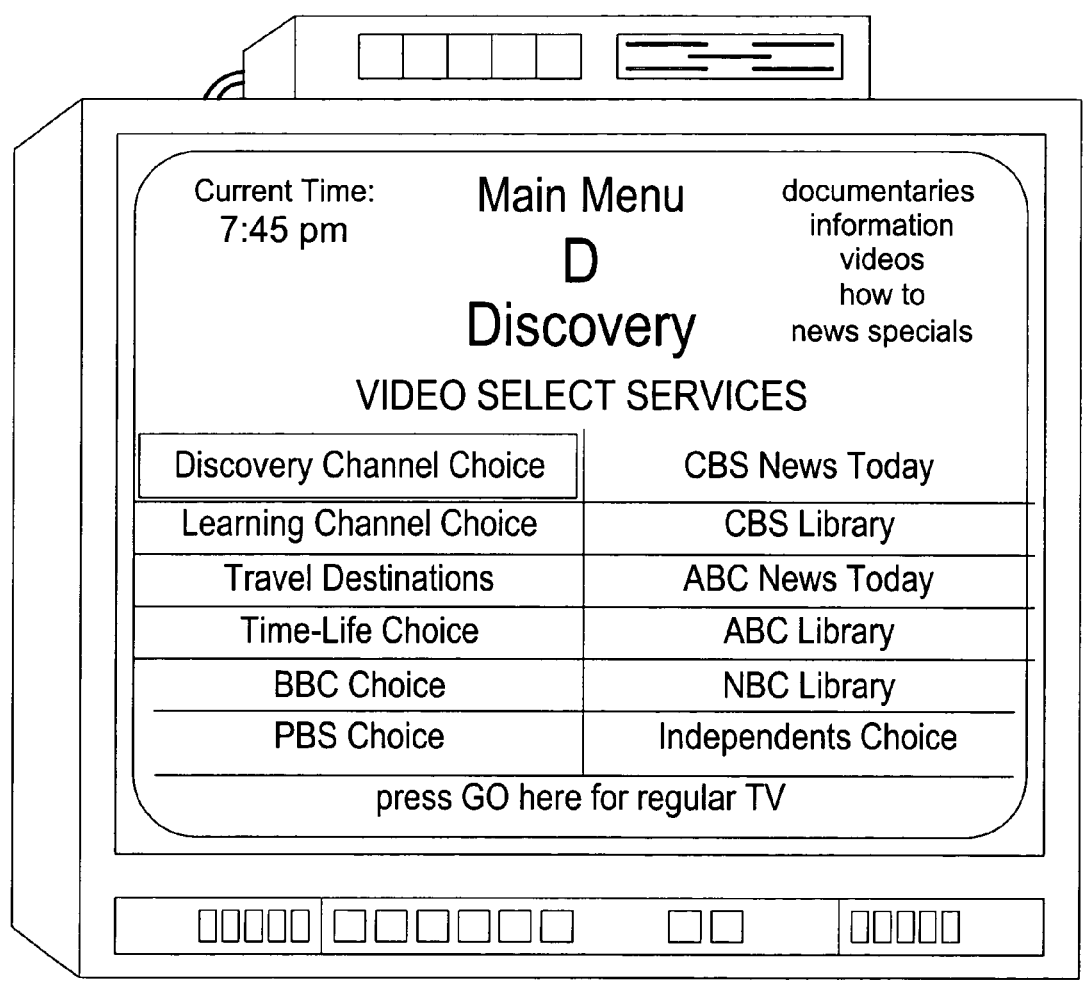

In an embodiment, FIGS. 29a, 30a, 31a, and 32a are a series of menus which are categorized in the Documentary and News Major category. Whereas in the alternate embodiment, FIGS. 29b, 30b, 31b, and 32b are a series of menus that relate to the Discovery® video selection services category. FIG. 29b is the Discovery® video selection service major menu 1042. This major menu shows twelve different categories of services available to the subscriber. The upper right-hand corner window of this major menu briefly describes the types of services which are available on this menu. After selecting a subcategory from this major menu the set top terminal 220 moves the subscriber to a submenu describing programs that are available in the subcategory. FIGS. 29a and 29h show that the subcategory Discovery® channel choice has been selected by the subscriber from a major menu.

FIG. 30a is a submenu for subcategory Discovery® channel choice 1148, and shows six programming choices available for this subcategory. In an alternate embodiment, FIG. 30b displays only four program choices. By choosing one of the programming choices on this Discovery® channel choice submenu, the subscriber may obtain more information about the particular program. Again, the subscriber is able to return to the major menu or return to regular TV by selecting options in the lower part of the screen. In FIGS. 30a and 30b, the subscriber has highlighted and selected the program War Birds for further description.

FIGS. 31a and 31b are description submenus 1152 which describe an available program, War Birds. FIGS. 31a and 31b use the upper right-hand corner window 1004 to inform the subscriber of the next start time available for the particular program War Birds. In packaging the special selection of programs, the programmer may show an identical program on several channels in order to permit the subscriber greater flexibility in start times. FIGS. 31a and 31b show the use of a strip menu across the lower half of the screen displaying a message and the price of the program. Similar to other submenus, the subscriber may order the program, return to the major menu, or return to regular TV simply by selecting the choices on the lower part of the screen. FIGS. 31a and 31b depict the subscriber ordering the program War Birds.

FIGS. 32a and 32b are confirmation submenus 1154 similar to confirmation submenus in other major menu categories. The confirmation submenus 1154 are used to confirm the subscriber's order of the program War Birds. The FIG. 32a confirmation submenu 1154 retains the video window from the prior submenus and also displays the program run time. The confirmation submenu 1154 of FIG. 32b shows a strip window 1105 on the lower part of the screen displaying an "800" number and advertising the Discovery® catalog. Similar windows may be used throughout submenus to assist in advertising for particular programs, channels, or groups of programs. Many variations of the confirmation submenu are possible.

This confirmation submenu 1154 allows the subscriber to join the selected program already in progress or return to regular TV. In addition, by depressing the escape button, the subscriber may cancel the order of War Birds from this screen.

Figure 32C:
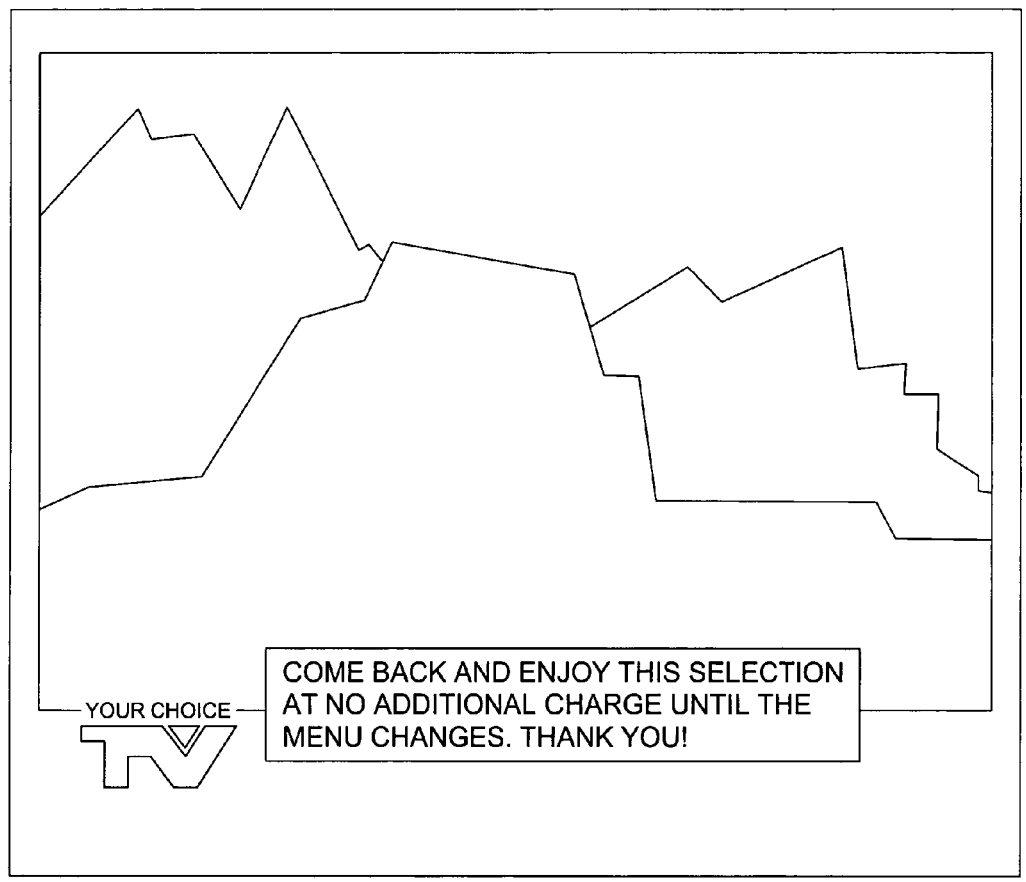

FIG. 32c is an example of an overlay menu 1156 presented when the subscriber is exiting from a program selection in which may be rejoined at a later time. The exiting ordered program overlay menu 1156 is appropriate whenever a subscriber may return to a program or channel without additional charges. Since many of the programs selections are authorized for viewing on a two-day, weekly, or monthly basis, the exiting ordered program overlay is useful in a number of situations.

This overlay menu 1156 follows a similar format as other overlay menus having a darker colored lower sash and lighter colored second sash with text information. The sashes are overlayed on the program video currently being watched by the subscriber.

Additionally, an exiting ordered program overlay menu 1156 may be provided for one-time viewing program selections to which a subscriber cannot return. The exiting ordered program overlay menus 1156 would thank the subscriber for ordering the particular program or channel and entice the subscriber to order a similar program from the same network. For example, an exiting program overlay menu 1156 for a live sports event such as boxing, would thank the subscriber and remind the subscriber that the network carries regularly scheduled boxing events on a weekly basis.

Figure 33:
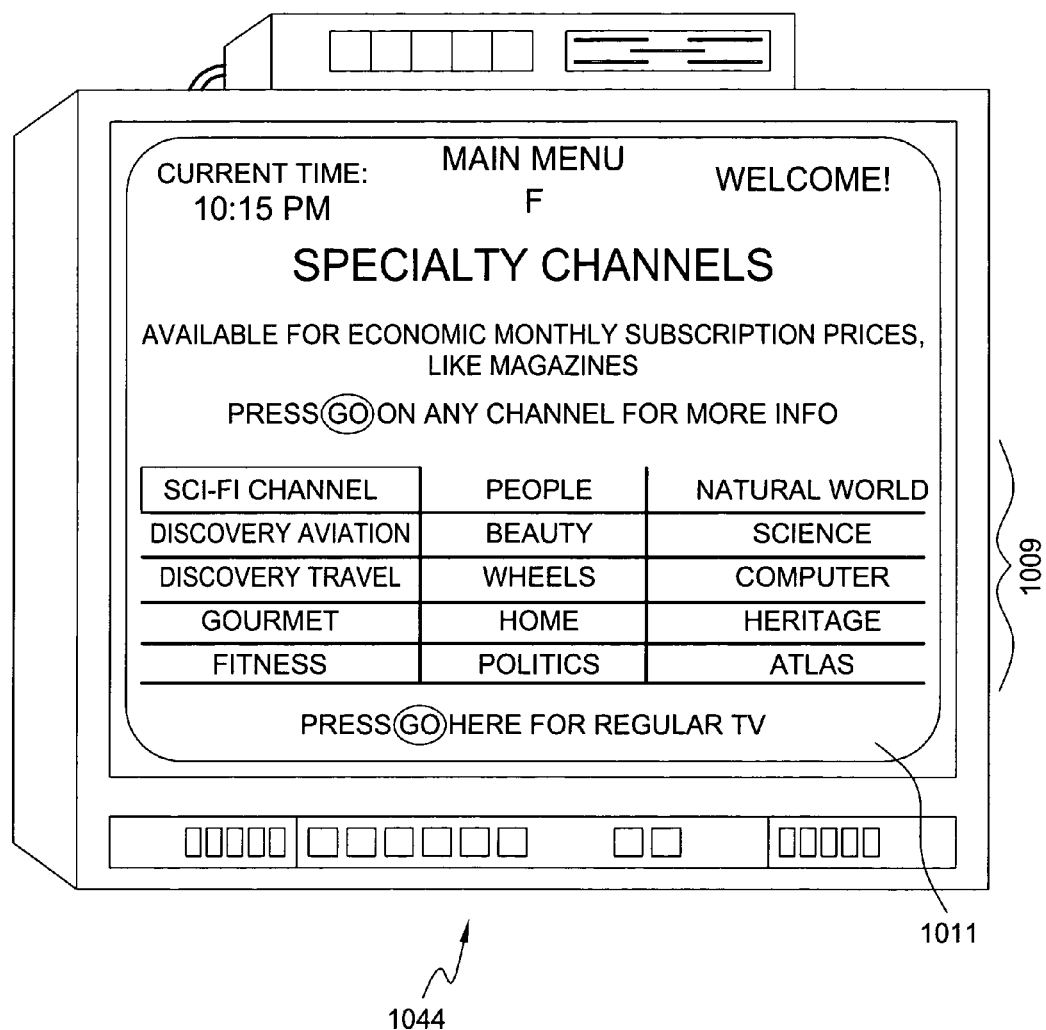
FIG. 33 is a drawing of a specialty channel major menu.
Figure 34:
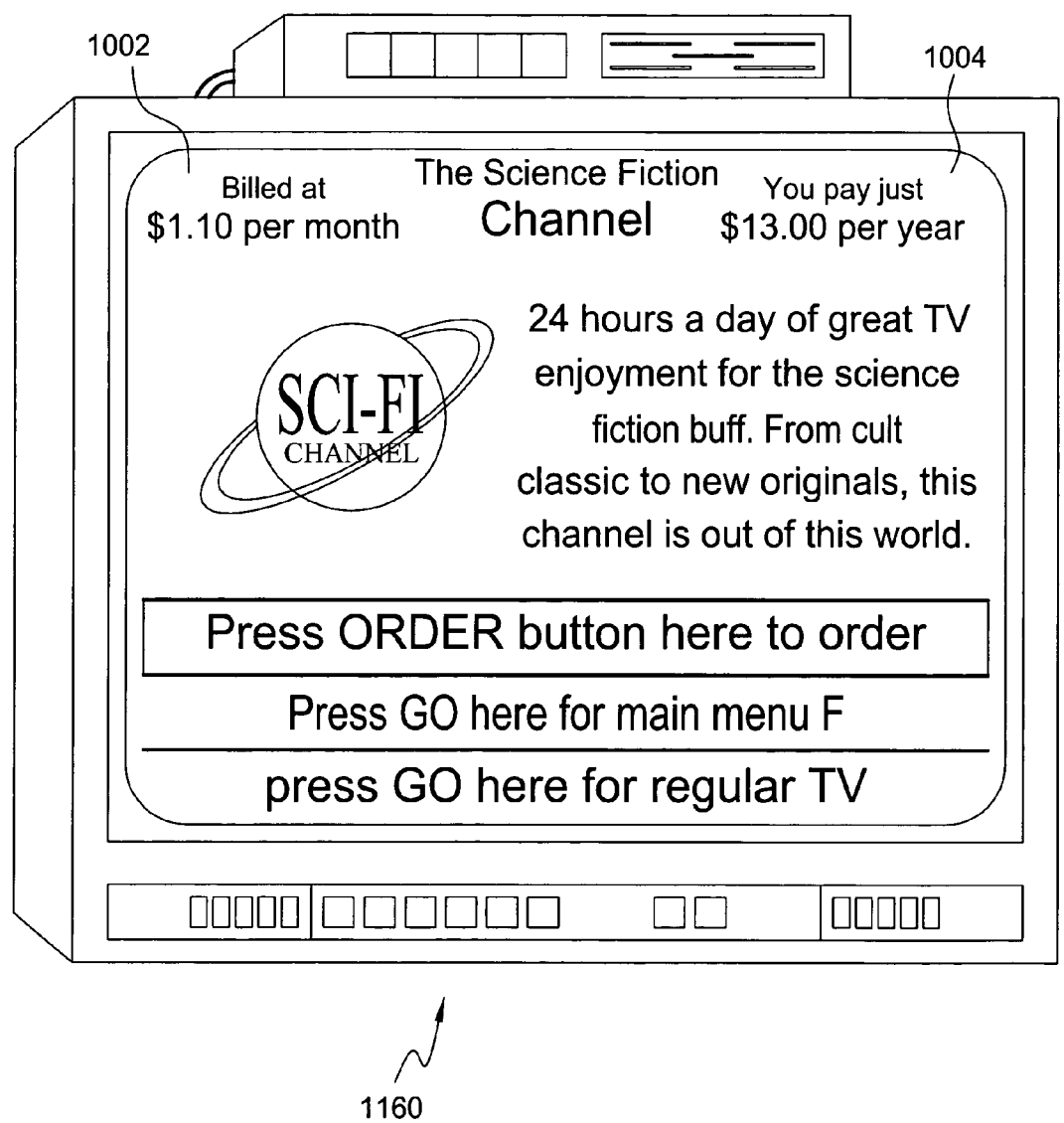
FIGS. 34 and 35 are drawings of submenus related to FIG. 33.
Figure 35:

FIGS. 33 through 35 relate to ordering specialty channels through the menu driven system. FIG. 33 is a major menu 1044 that lists fifteen specialty channels that are available for subscription and viewing. In the major menu 1044, the lower half of the screen 1009, which is utilized to provide the various programming choices, is divided into three vertical sections allowing room for fifteen choices. This major menu category is different from the others in that individual programs are not ordered but instead channels are subscribed to on a periodic basis such as monthly or yearly. To use the major menu 1044, the subscriber need only select and press "go" on the remote control 900 for the desired channel of his choice.

After the subscriber selects a channel, the channel description submenu 1160 of FIG. 34 replaces the major menu 1044 on the subscriber's television screen. The description submenu 1160 has windows that are similar to other description submenus used throughout the menu driven system. In the description submenu 1160, the upper right-hand corner 1004 is used to display the subscription cost for the channel. The upper left-hand corner 1002 of the description submenu 1160 is used to display the method in which the subscription price will be billed to the subscriber. In this specific scenario, the current time has little bearing on the subscriber's decision to order the displayed channel and therefore is not shown on the television screen. FIG. 34 shows that the subscriber has ordered the Science Fiction channel.

FIG. 35 shows a submenu 1164 that confirms the subscriber's order and thanks the subscriber for the order.

FIGS. 36–39 refer to the selection of a magazine channel. In particular, FIGS. 36–39 show a series of menus for selecting and ordering one specific magazine channel, the sci-fiction channel.

Figure 36:
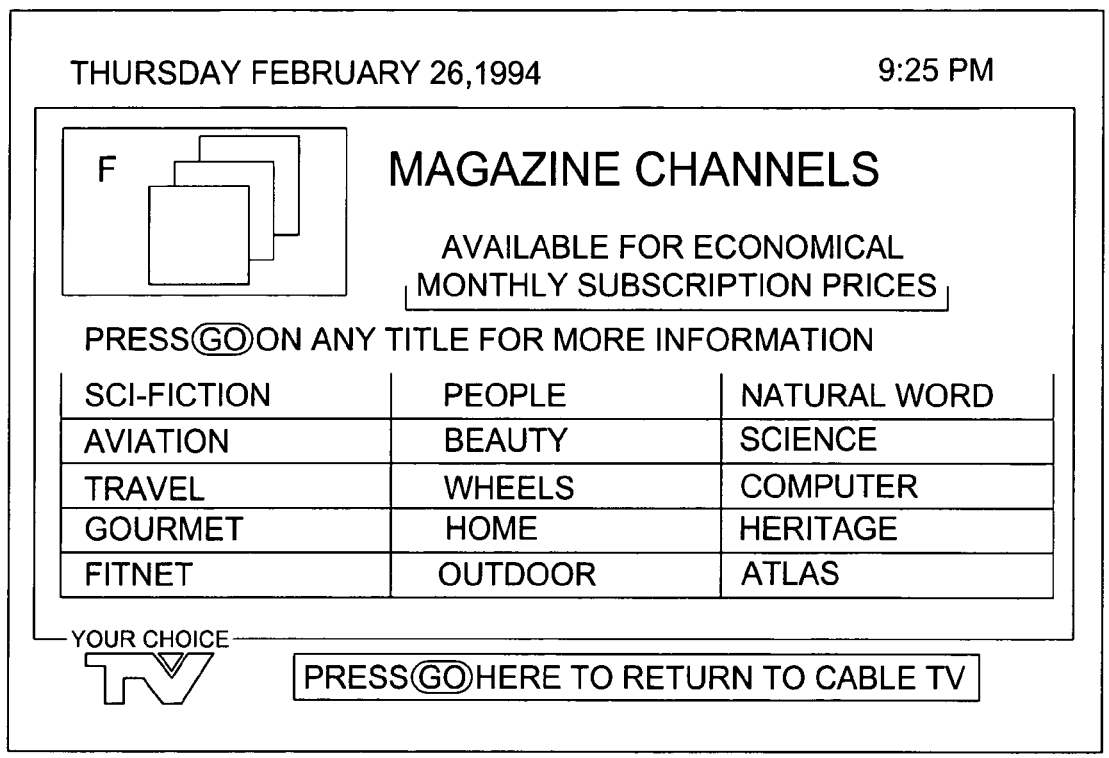
FIG. 36 is a drawing of a magazine channel major menu.

FIG. 36 shows a major menu for magazine channels 1030. This major menu falls under the letter F, Major Menu, and has an icon showing three magazines. The magazine channel major menu has a menu display block with 15 options, three columns, each with five selection options. Magazine channels are specialty channels targeted to a particular audience. In the preferred embodiment, each of the magazine channels has a monthly subscription. FIG. 36 shows the sci-fiction magazine highlighted.

Figure 37:
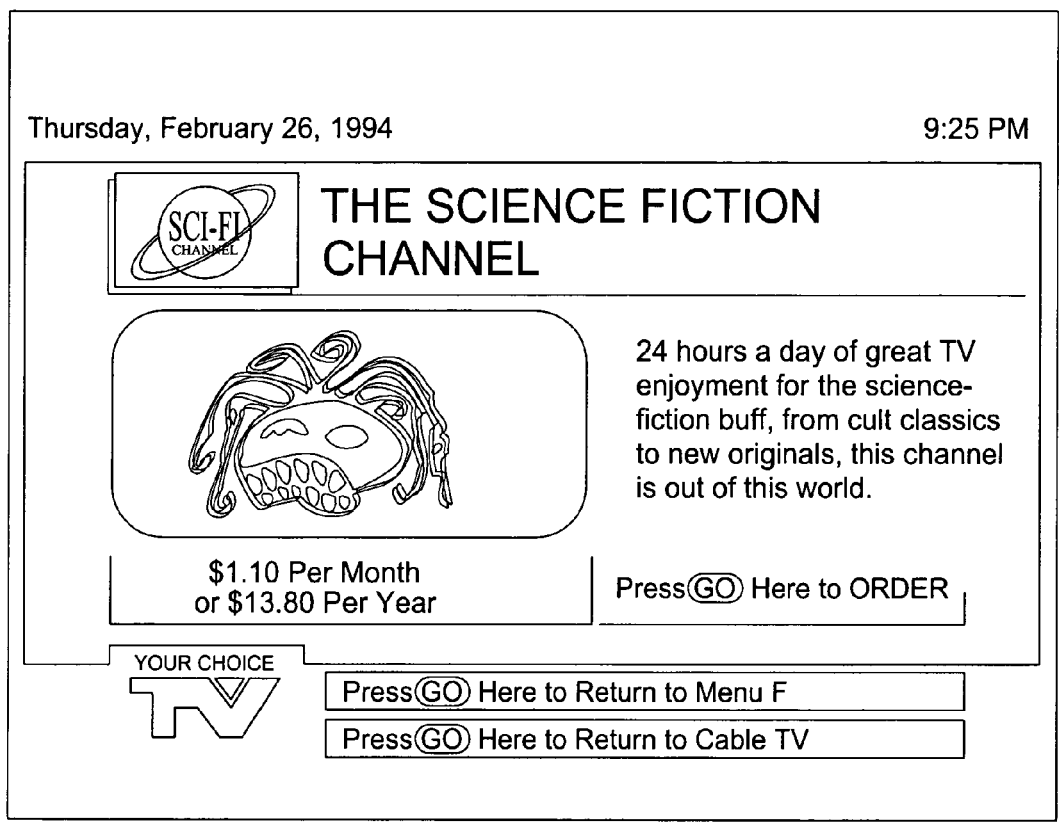
FIGS. 37–39 are drawings of submenus related to FIG. 36.

FIG. 37 is a channel description submenu 1170 for the science-fiction channel.

Figure 38:
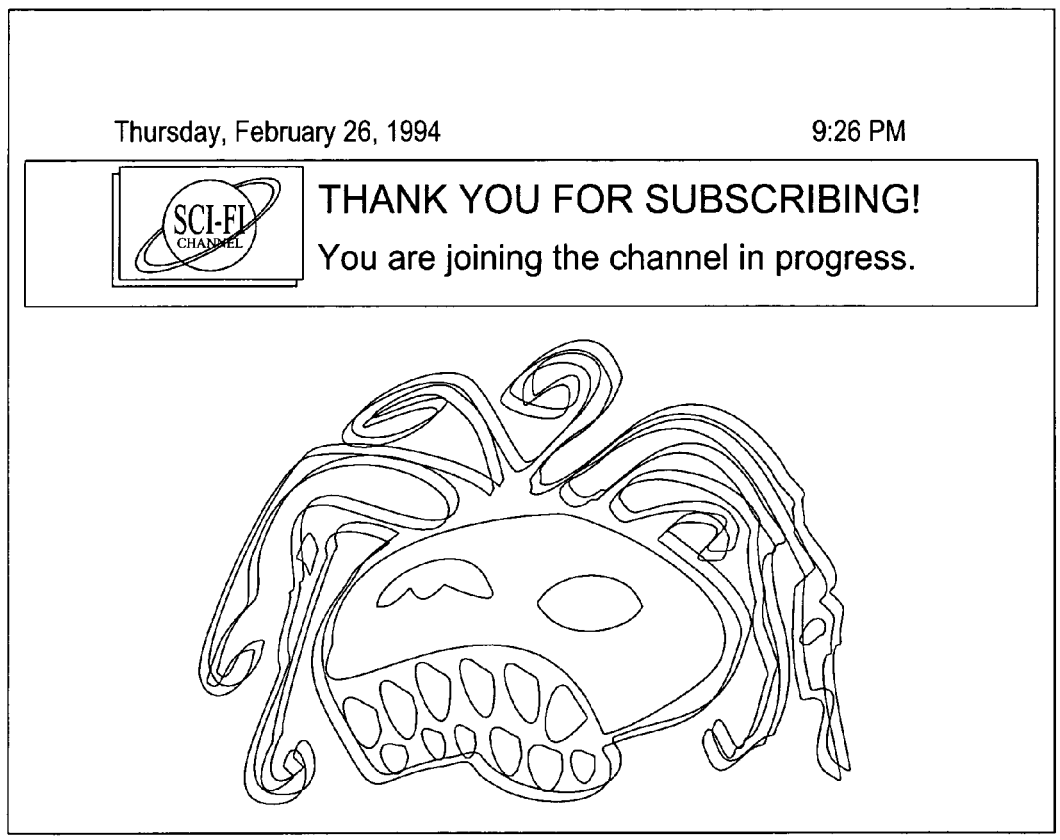

The subscriber who orders a science-fiction channel will receive the confirmation menu 1172 shown in FIG. 38. This is a representative confirmation menu for subscribing to any network channel. A second sash of approximately equal width to the upper sash of the background menu is displayed in a color preferably different than that of the upper sash. Within the confirmation sash, a network logo and a standard text description thanking the subscriber are placed on the screen. At any time during the display of the confirmation menu 1172, the subscriber may cancel the subscription to the channel by pressing cancel on the remote control 900 or by passing the set top terminal 220 termination button 645.

Figure 39:
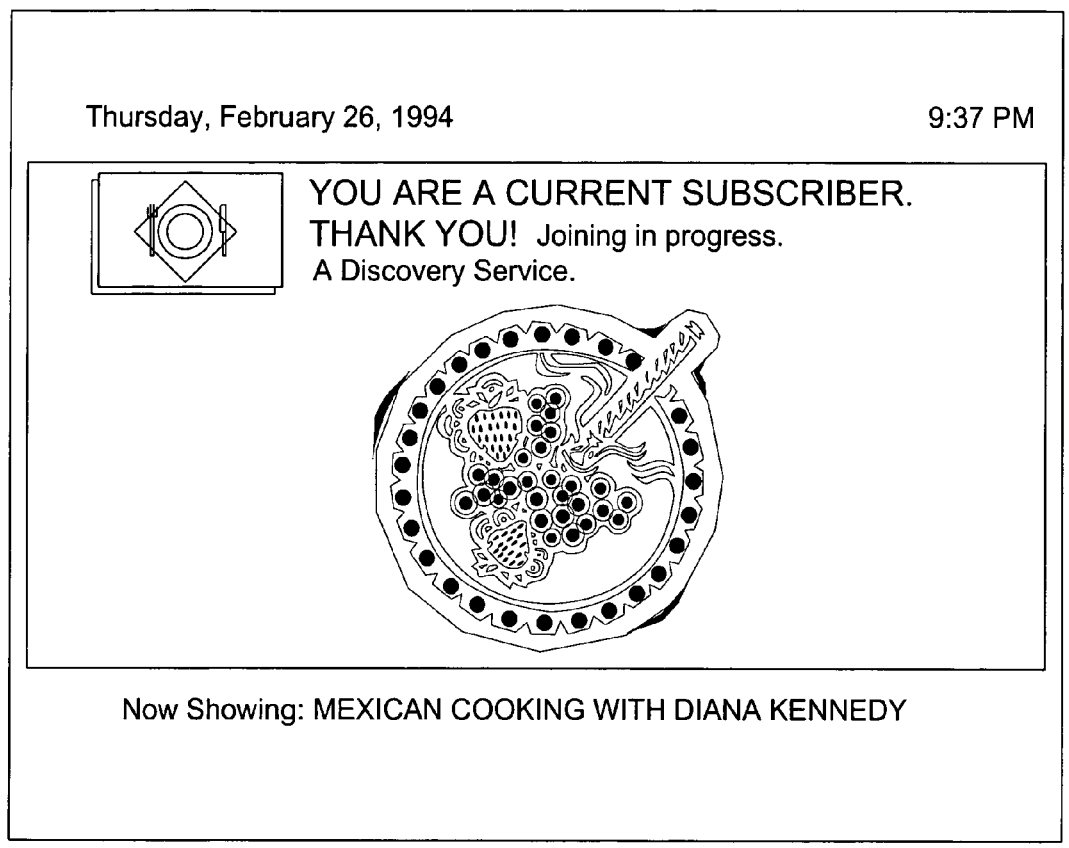

FIG. 39 shows a reentry to ordered subscription submenu. This particular reentry submenu (magazine channel reentry submenu 1173) is for the magazine channel Gourmet. A light colored second sash is provided at the top of the screen with the network logo and text informing the subscriber that the channel has already been ordered. The reentry submenus 1156 generally allow the subscriber to immediately join programming in process. The current program on the Gourmet channel is shown in most of the remaining portion of the screen.

Figure 40:
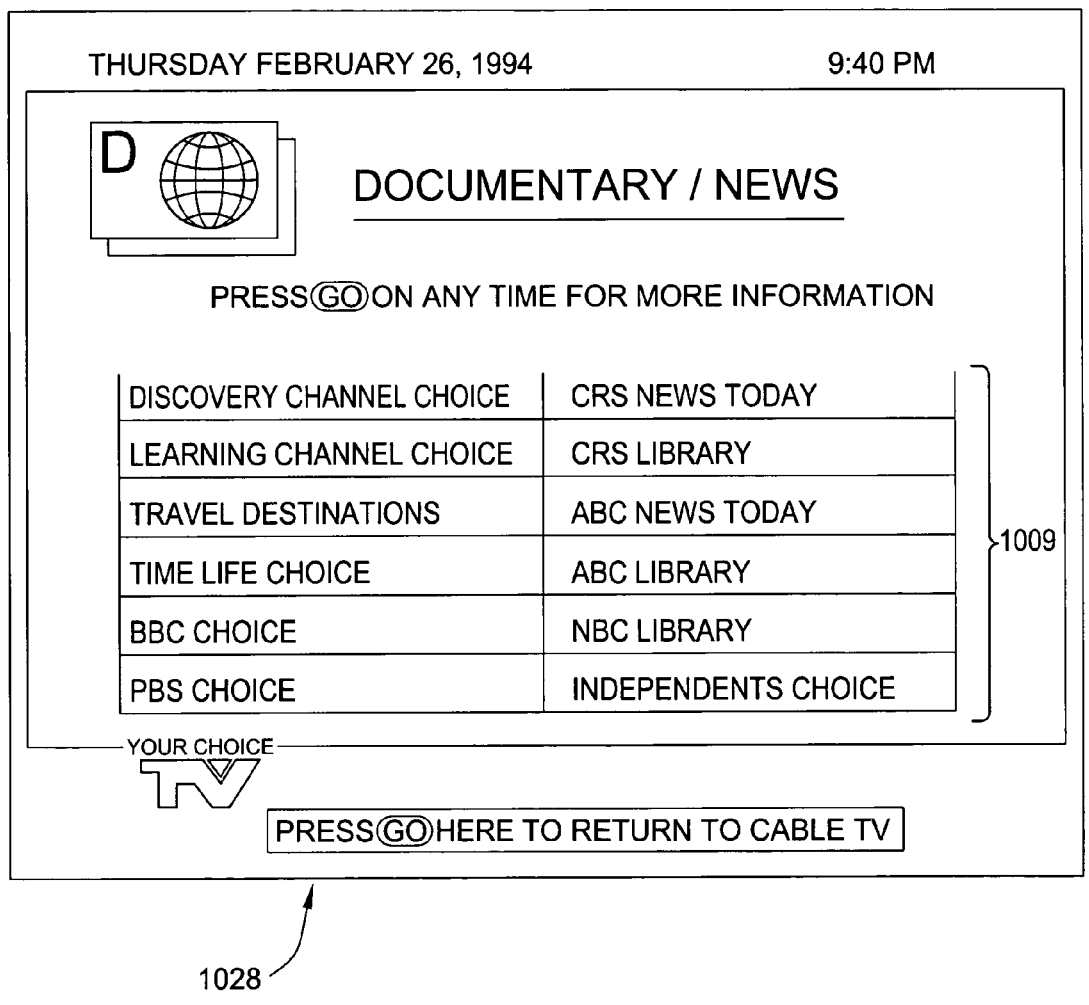
FIG. 40 is a drawing of a documentary/news major menu.

FIGS. 40–43 show a series of menus for selecting the documentary news program from the CBS library, called 60 Minutes. Although this is a regularly scheduled weekly program, it may be viewed by subscribers to the present invention at nonscheduled times. FIG. 40 shows a major menu 1028 for documentary and news programs. The major menu 1028 has a specific icon and letter designation that are shown in the upper left hand corner of the screen. The major menu 1028 has 12 selection options 1009 in the menu display blocks. They comprise two rows, each with six options. In this particular major menu 1028, the upper left hand corner option is highlighted. In general, the upper left hand corner option is the default for the cursor highlight overlay 1526.

Figure 41:
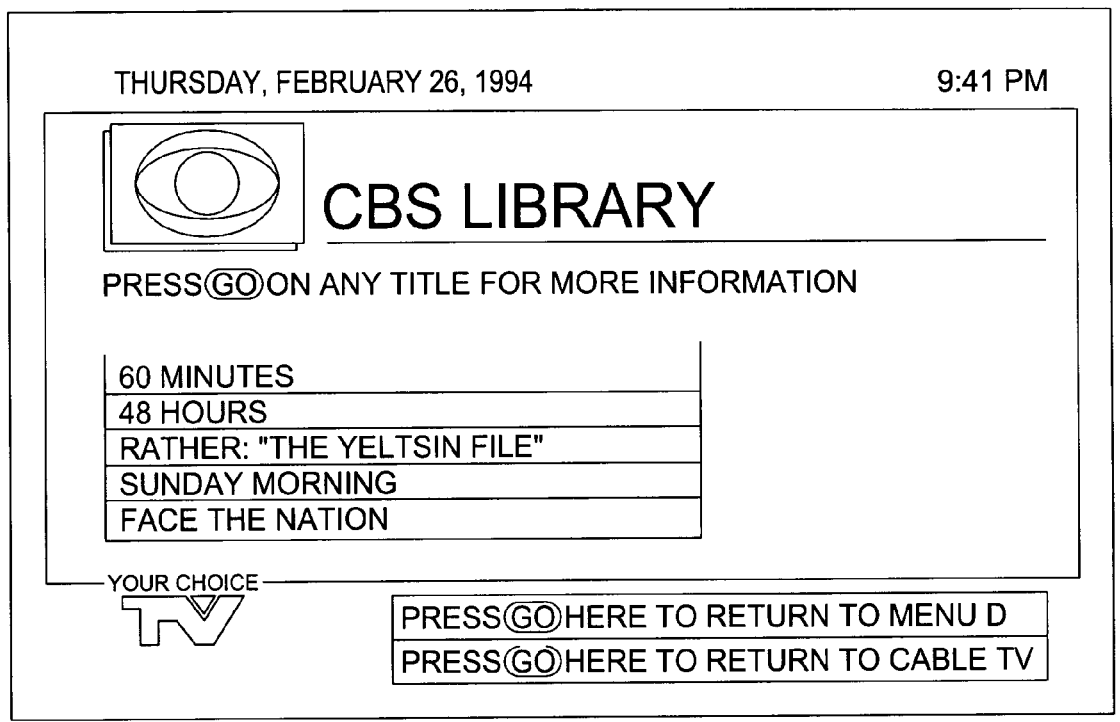
FIGS. 41–43 are drawings of submenus related to FIG. 40.

FIG. 41 shows a subcategory submenu 1174 displaying five options. The subcategory menu 1174 shows specific programs which are available. The cursor highlight overlay 1526 is at the top of the screen in its default position. From this cursor position, the subscriber may order the program 60 Minutes.

Figure 42:
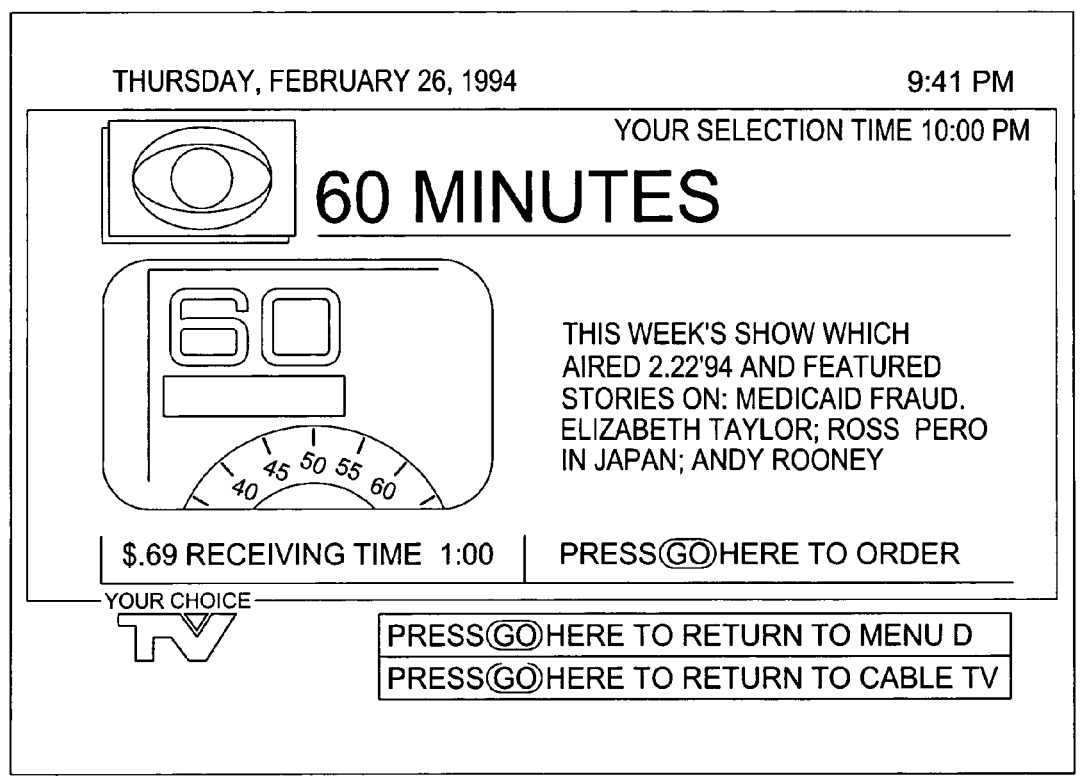

FIG. 42 shows the next menu in the sequence for ordering the program 60 Minutes. This program description submenu 1176 displays the network logo, program title, program description, video window, video description window, and the next program start time. In an embodiment, the next program start time is displayed beneath the current time. The program title and program description text may be stored in an intermediary text storage. In an embodiment, the video description window 1556 displays running time and price of program. The subscriber who orders the program from the program description menu is then sequenced to a confirmation menu.

Figure 43:
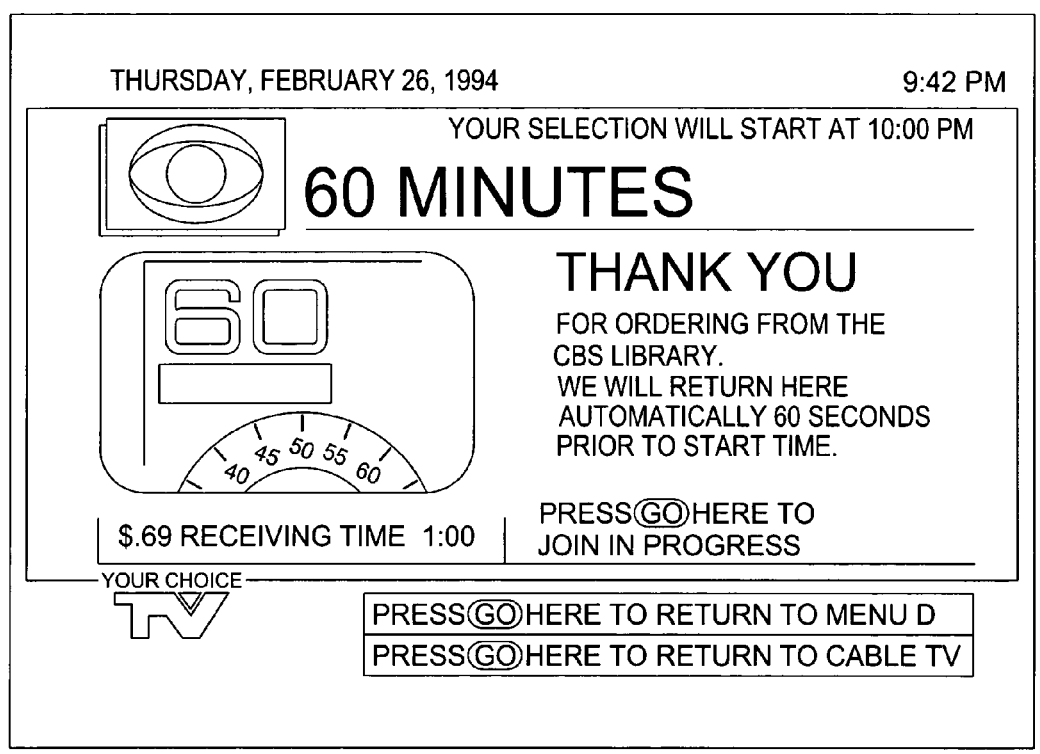

FIG. 43 is a confirmation submenu 1178 for the program 60 Minutes. In the embodiment shown, the program description menu 1176 and confirmation menu 1178 are nearly identical. The primary difference being the confirmation text description and the ability to join the program in progress. In the embodiment shown, the confirmation text is customized for the particular subcategory CBS Library. In alternate embodiments, the confirmation text is a standard text generated from long-term text storage. Confirmation submenus may be designed to show the subscriber more video and less menu graphics and text.

Figure 44:
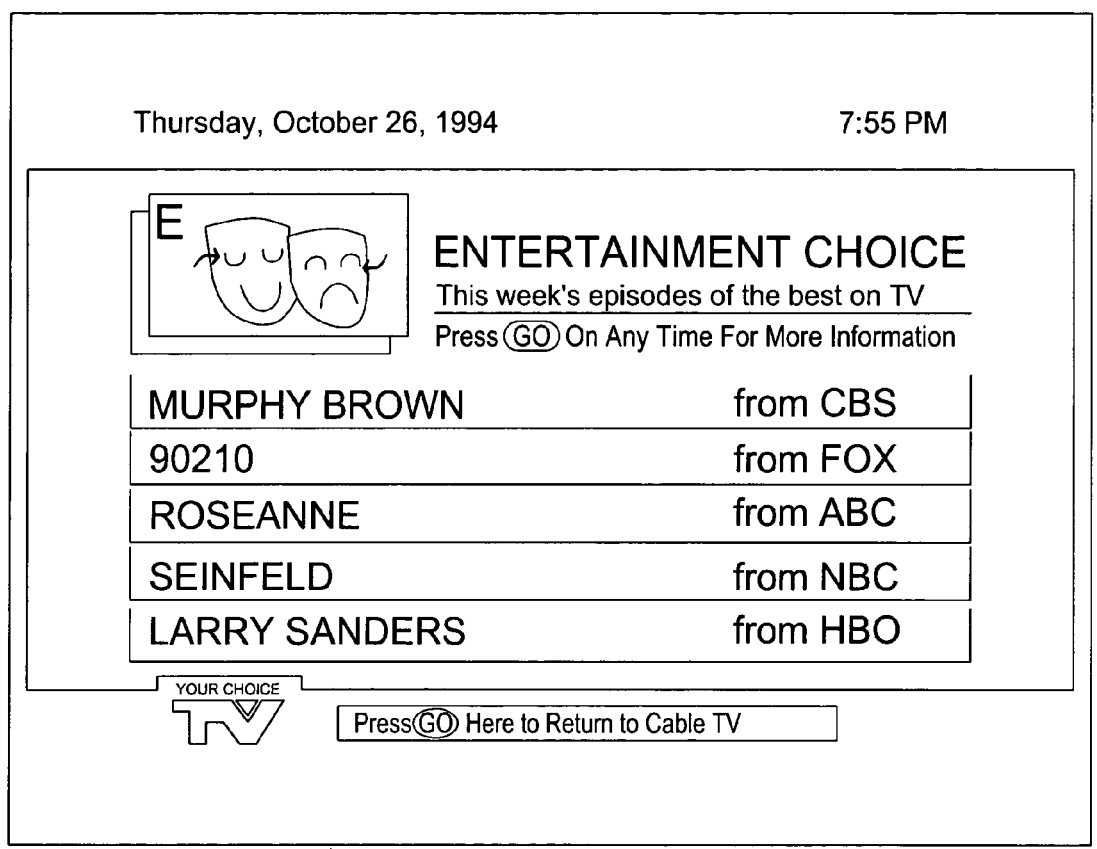
FIG. 44 is a drawing of an entertainment choice menu.
Figure 45:
FIG. 45 is a drawing of a submenu related to FIG. 44.

FIG. 44 is a major menu 1180 for category E, Entertainment Choice. The Entertainment Choice category shows the best entertainment programming available during a given week. FIGS. 44 and 45 show the selection of a program in the Entertainment Choice category. The Entertainment Choice major menu 1180 has a menu display block for five programs.

FIG. 45 shows a program description submenu 1182 for a selection on the Entertainment Choice major menu. In the program description submenu 1182, the next start is shown in the upper right hand corner. The program title text is shown centered, along with program description text on the right half of the screen. The video window and video description window are provided on the left half of the screen. In the embodiment shown, the price of the program is placed on the first line of text in the video description window and the run time is shown on the second line of text in the video description window. The program may be ordered by highlighting the menu display block beneath the program description text using cursor movement keys. The program description submenu 1182 allows the subscriber, via a strip menu located in the lower sash, to return to the major menu 1180.

Figure 46:
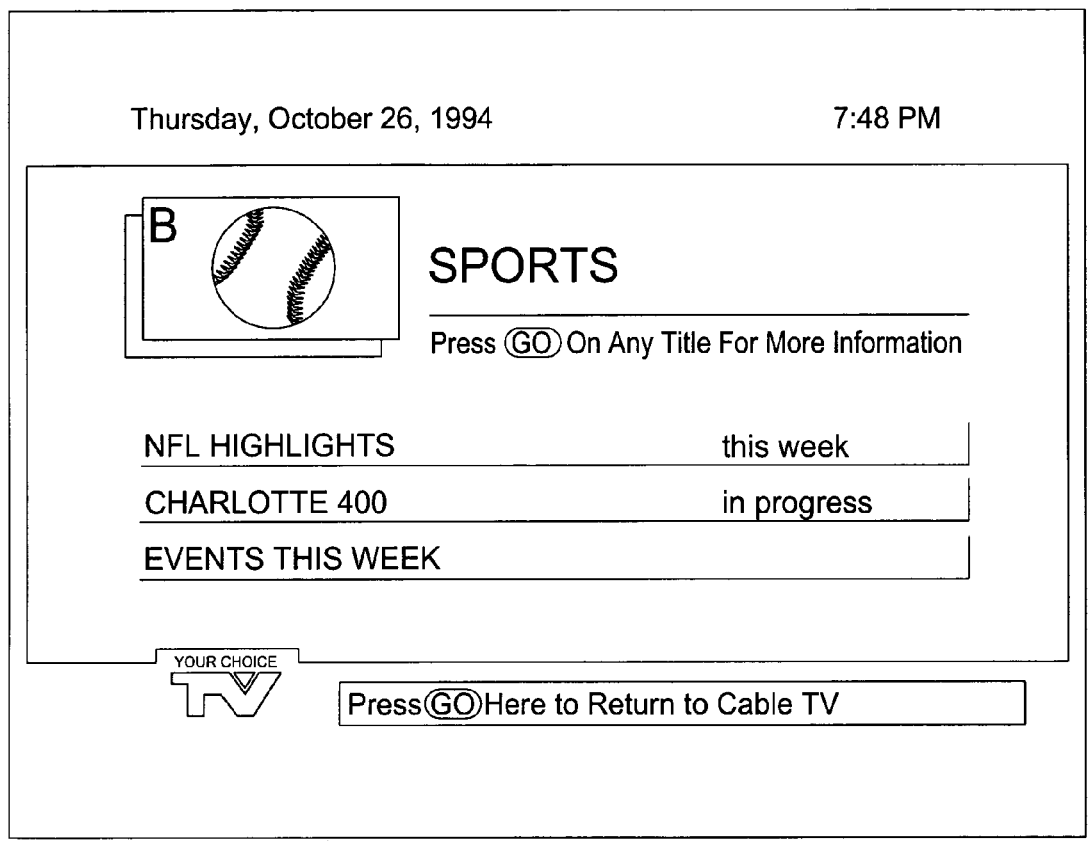
FIG. 46 is a drawing of a sports major menu.
Figure 47:
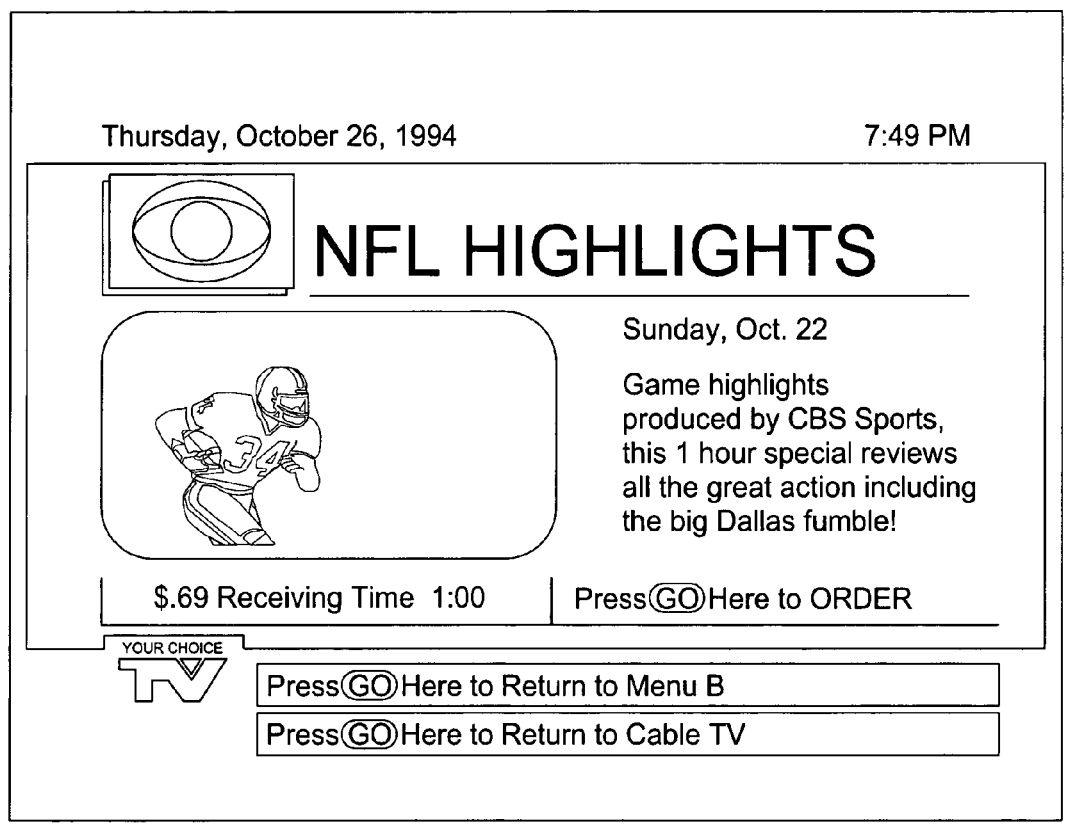

FIGS. 46, 47, and 48a–48d relate to menus available within the major category of Sports. FIG. 46 is an example of a major menu screen 1022 for the Sports category. The major menu 1022 exemplifies the ability to mix pay-per-unit programs, free programs, and a subcategory selection, all within one major menu screen. The major menu 1022 is also representative of the mixing of programming types and subcategories that may be conducted at any menu level (major menu or submenu). By highlighting one of the three menu blocks shown, the subscriber may obtain more information on each of the three different types of programming that are available. FIG. 47 is a program description submenu 1222 for NFL Highlights, which a subscriber would receive after making the NFL Highlights selection on the major menu 1022 of FIG. 46. In particular, FIG. 47 shows a program description submenu for a program that must be paid for once each week for viewing. Once the program has been ordered by that particular set top terminal, the terminal is authorized to allow subscriber viewing for the remainder of the football week.

Figure 48A:
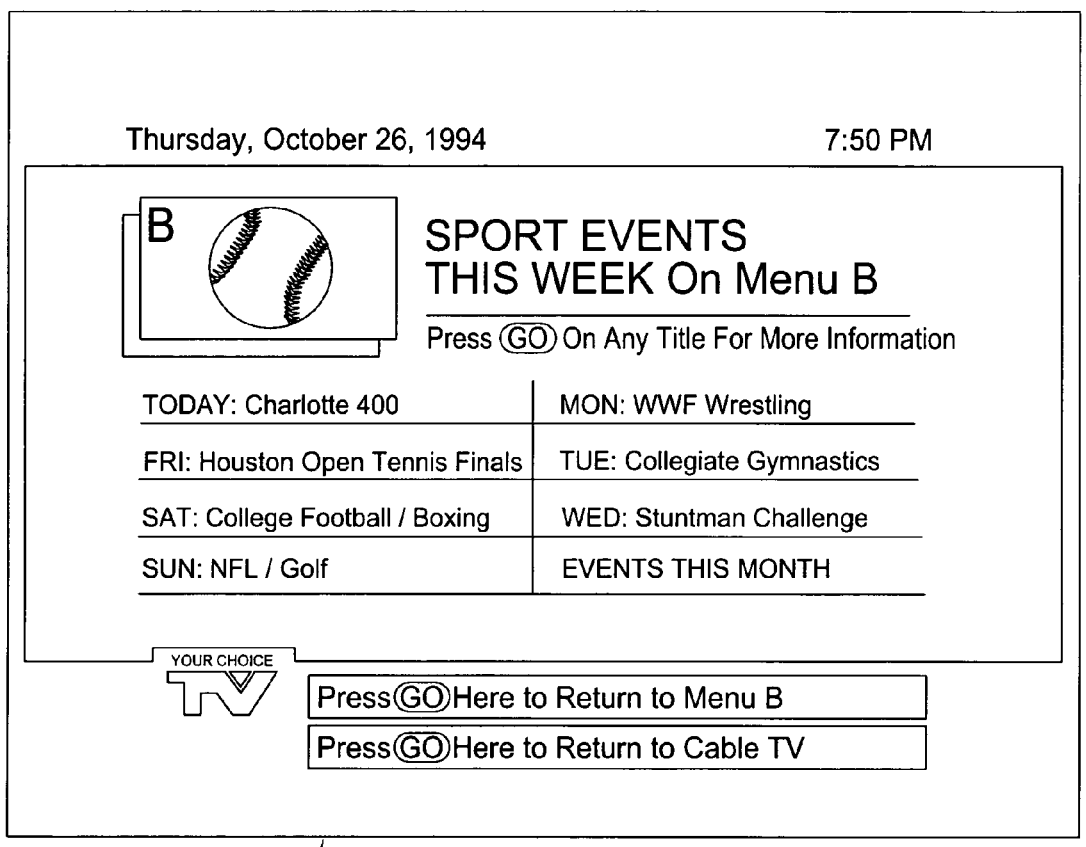

FIGS. 48a–48d illustrate the manner in which a category or subcategory of programs may be shown in a weekly schedule 1224. Seven of the menu display block options of FIG. 48a are for daily live events. The eighth menu selection block in the lower right hand corner of the menu display blocks allows the subscriber to see what live programming is available during the month. In this manner, future television programs may be advertised.

FIG. 48b shows a live programming event menu 1226 that is available only on a particular day. Since the text description of this menu may be updated at least once a day, circumstances that affect the live program may be described in the text. For example, in a single elimination tennis tournament, the star tennis players who have not been eliminated may be listed in the text. From this menu, the subscriber may return to the subcategory submenu 1224, Sports Events, or return to the major menu 1022, Sports, or return to cable TV. In an embodiment, the subscriber is given the ability to sequence back to the last viewed menu screen and, in some instances, sequence back to subcategory menu screens.

Figure 48C:
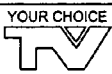
Figure 48D:
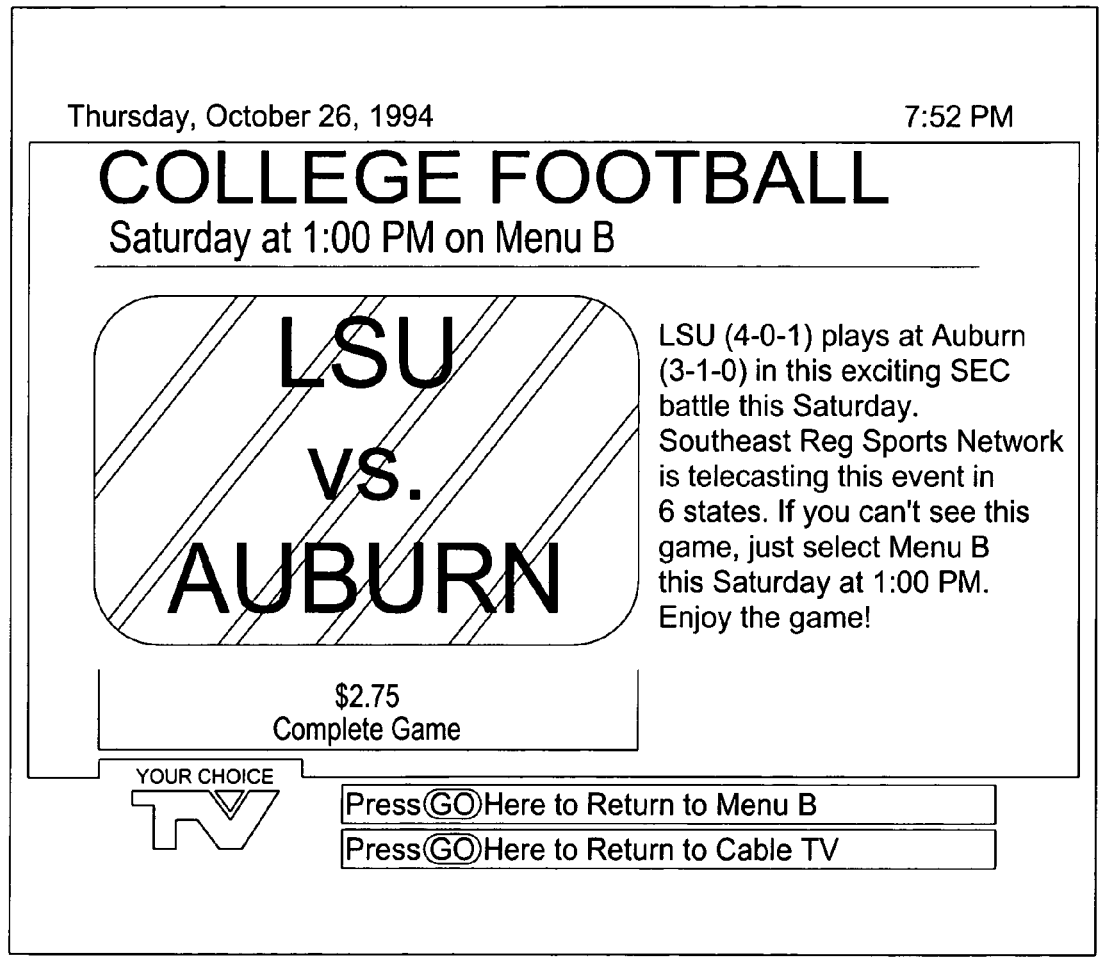

FIGS. 48c and 48d relate to programming on a particular day (Saturday). The submenu 1128 of FIG. 48c falls within a subcategory of a major menu and is therefore three menu sequences below the home menu. The menu 1228 lists an odd number of programming options. The menu display blocks allow 12 football games selections and one boxing event, which is a larger box across the lower part of the screen. By changing the menu display block sizes, the packager can focus the subscriber's attention on a particular program. Menus may show standard time, such as eastern time, or may show regional times to the subscriber.

FIG. 48d is a program description submenu 1229 whose description text may remain constant for a period of one week. The program title text "College Football" is frequently used and may be stored in long-term text storage.

Figure 49A:
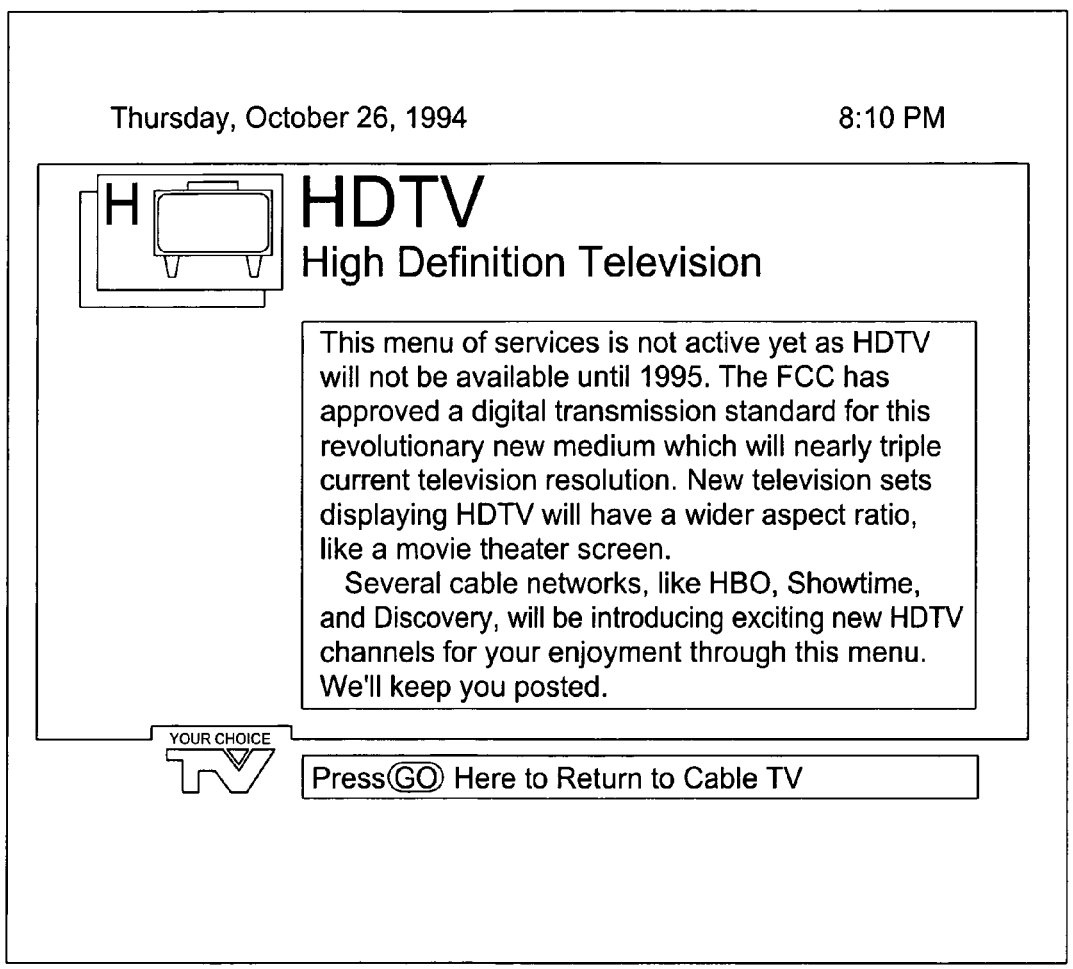
FIGS. 49a and 49b are drawings of menus related to high definition television programming.
Figure 49B:
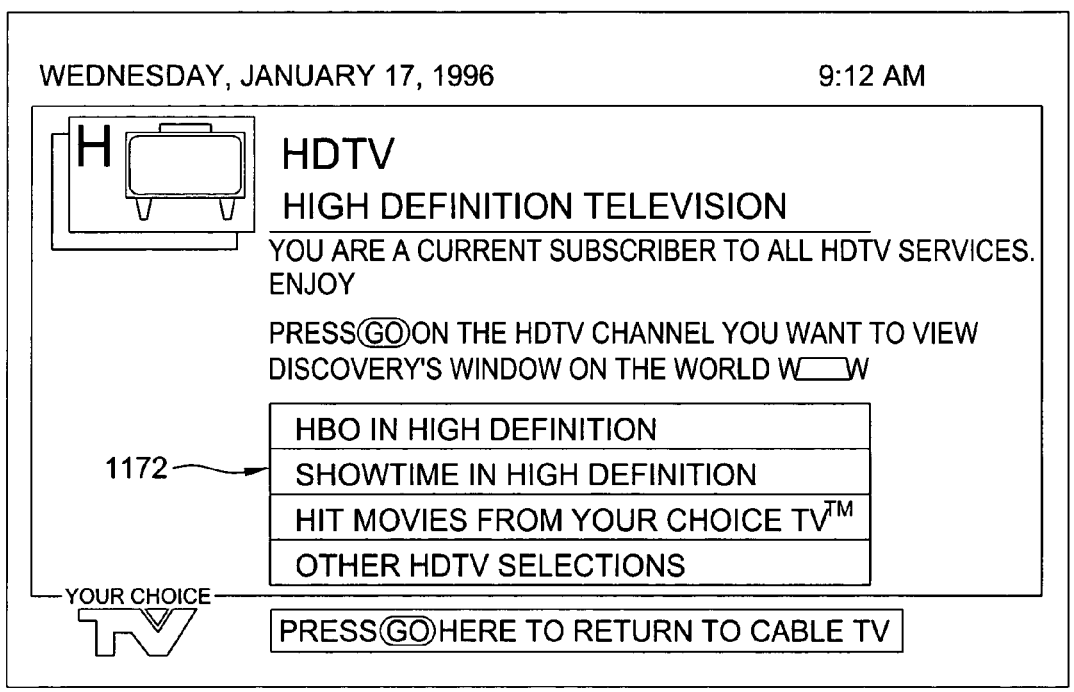

FIGS. 49a and 49b relate to HDTV. FIG. 49a is an example of a menu 1032 advertising a new feature of the system. Promotional menus, such as FIG. 49a, may be dispersed throughout the menu driven program selection system. This particular menu describes the HDTV feature and explains its unavailability until a future date. FIG. 54b shows the integration of HDTV services into the menu driven program delivery system. If the subscriber selects the major menu for HDTV, he will either receive a description of the service with a suggestion to order the system, or a text note that he is a current subscriber and a listing of the currently available program selections in HDTV 1232. If the subscriber has not paid to join the particular service, HDTV, he may be allowed to join one of the programs in progress for a limited time as a demo to entice the subscriber to order.

If the subscriber has paid the HDTV fees, the subscriber proceeds as he would in any other major menu screen.

This particular major menu shows an example of how a follow-on or second screen may exist for the same menu. In this particular case, a second screen exists for the major menu HDTV 1032. The subscriber may access the second screen 1232 by selecting the last menu display block in the lower part of the screen "Other HDTV Selections". Following this selection, the subscriber will be given a second screen of program selections. In this manner, any menu can have multiple screens with many program choices. This type of screen pagination on one menu allows the packager to avoid categorizing program selections within that same menu. In an alternative embodiment, the options available to the subscriber may be scrolled on one menu screen with the text within the menu display blocks changing as the subscriber scrolls up or scrolls down.

Figure 50A:
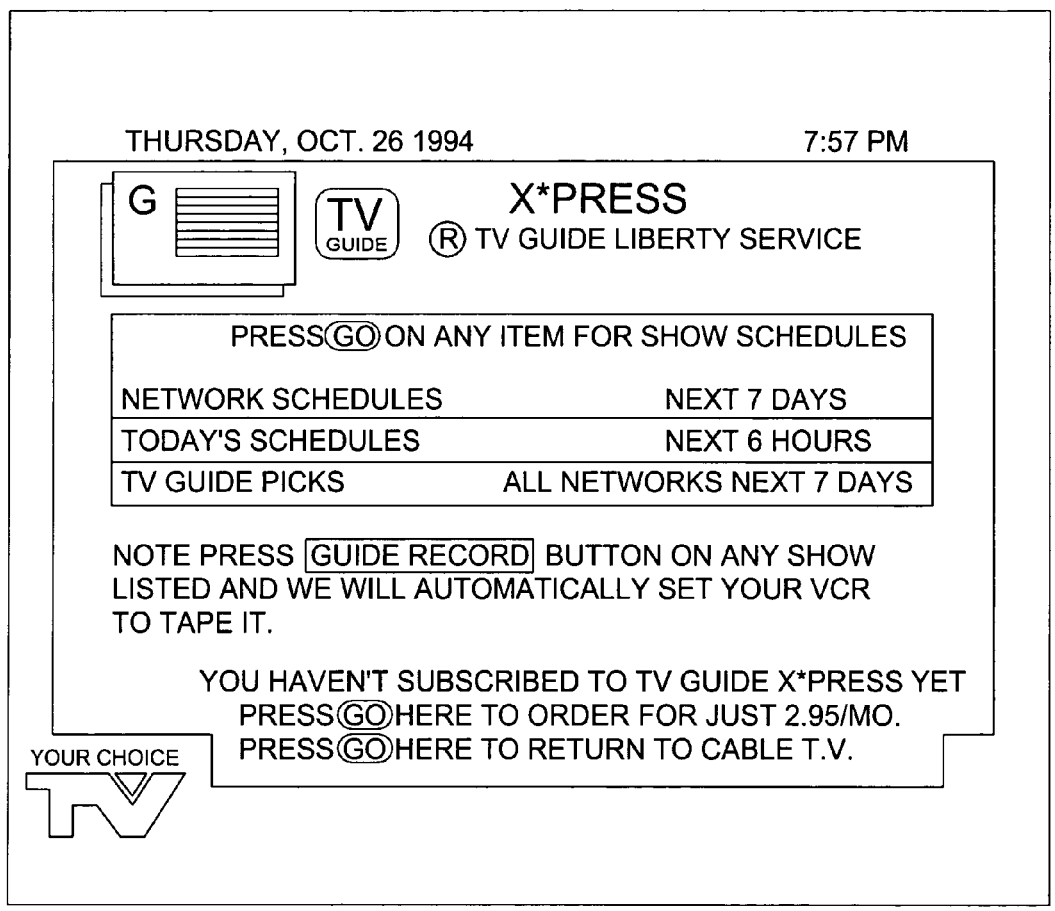
FIGS. 50a–50f are drawings of menus related to program guide services.
Figure 50B:
Figure 50C:
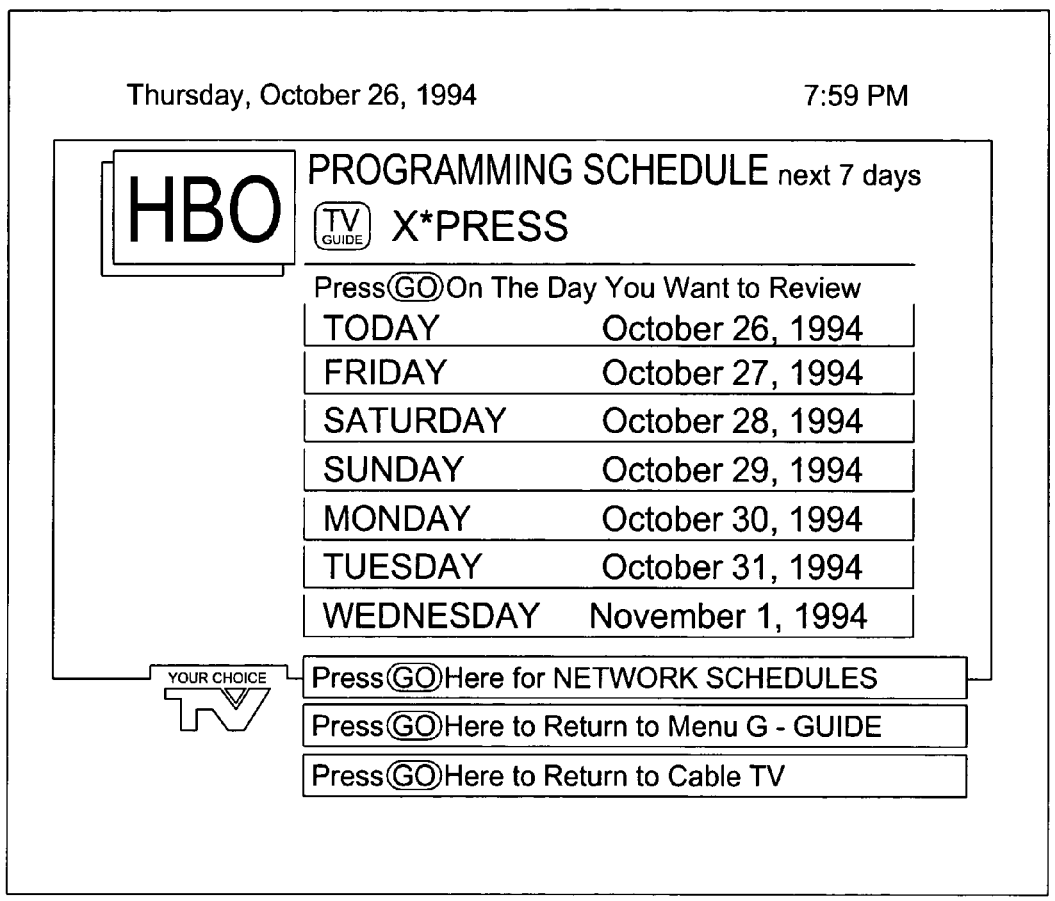
Figure 50D:
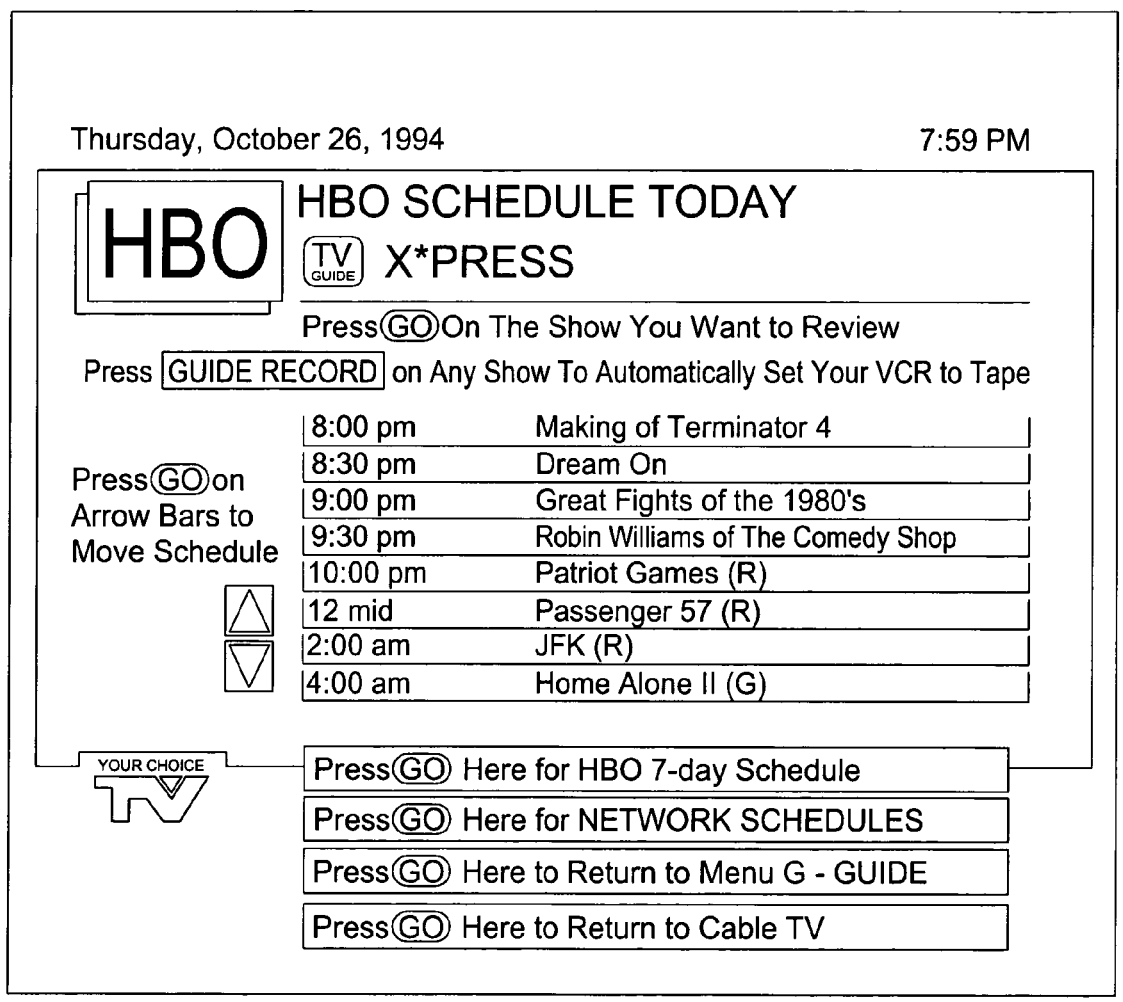

In the preferred embodiment, TV guide services, listing programs available on network schedules, will be available on a major menu, as shown in FIG. 50a. In the preferred embodiment, the major TV guide menu 1036 would offer submenus, such as network schedules for the next-seven days, today's network schedules for the next six hours, and TV guide picks for the next seven days. If the particular set top terminal 220 has been subscribed to the TV guide service, the subscriber may proceed to a submenu showing schedules of programs. If the subscriber chooses the network schedule submenu 1236, he is offered a list of network schedules to choose from as shown in FIG. 50b. If a subscriber were to choose, for instance, HBO, the submenu 1238 shown in FIG. 50c would appear. This submenu allows a subscriber to choose the program date that interests him. Following selection of a date, the subscriber is shown a more specific submenu 1242 listing programs available on the particular date as shown in 50d.

Figure 50E:
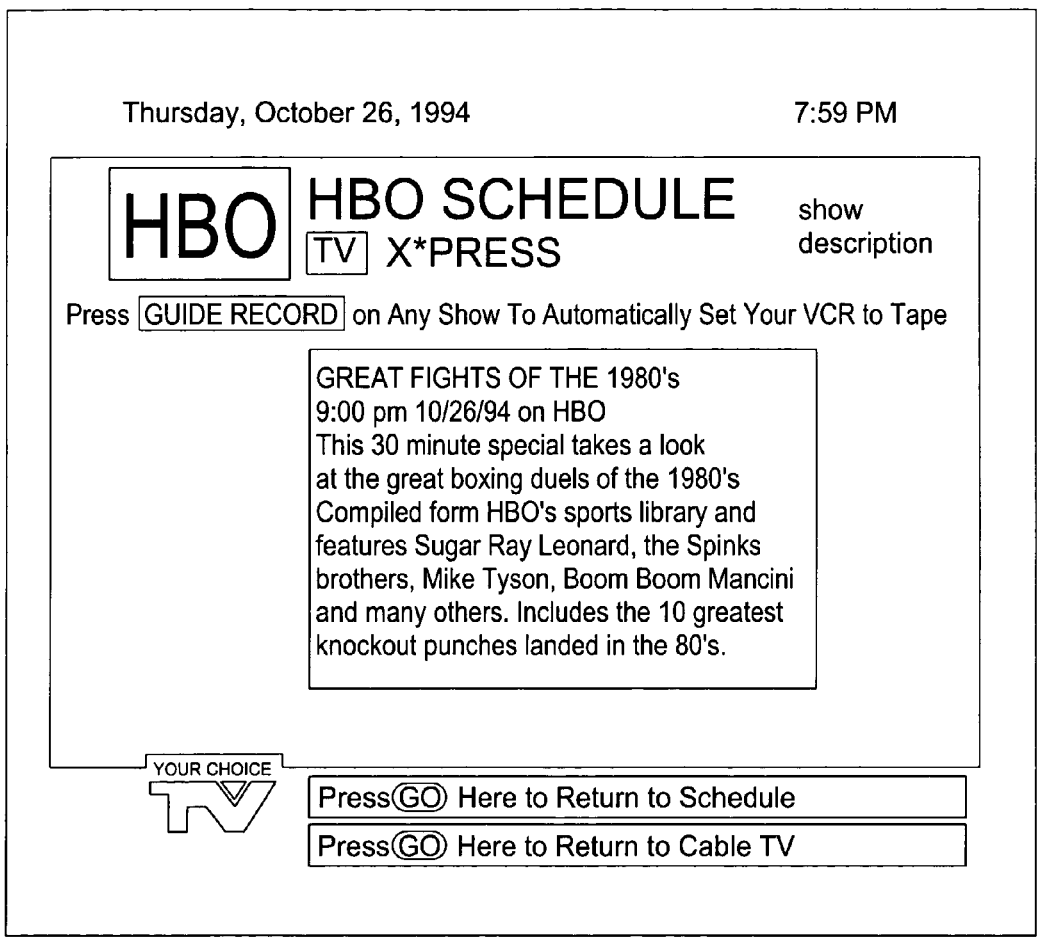
Figure 50F:
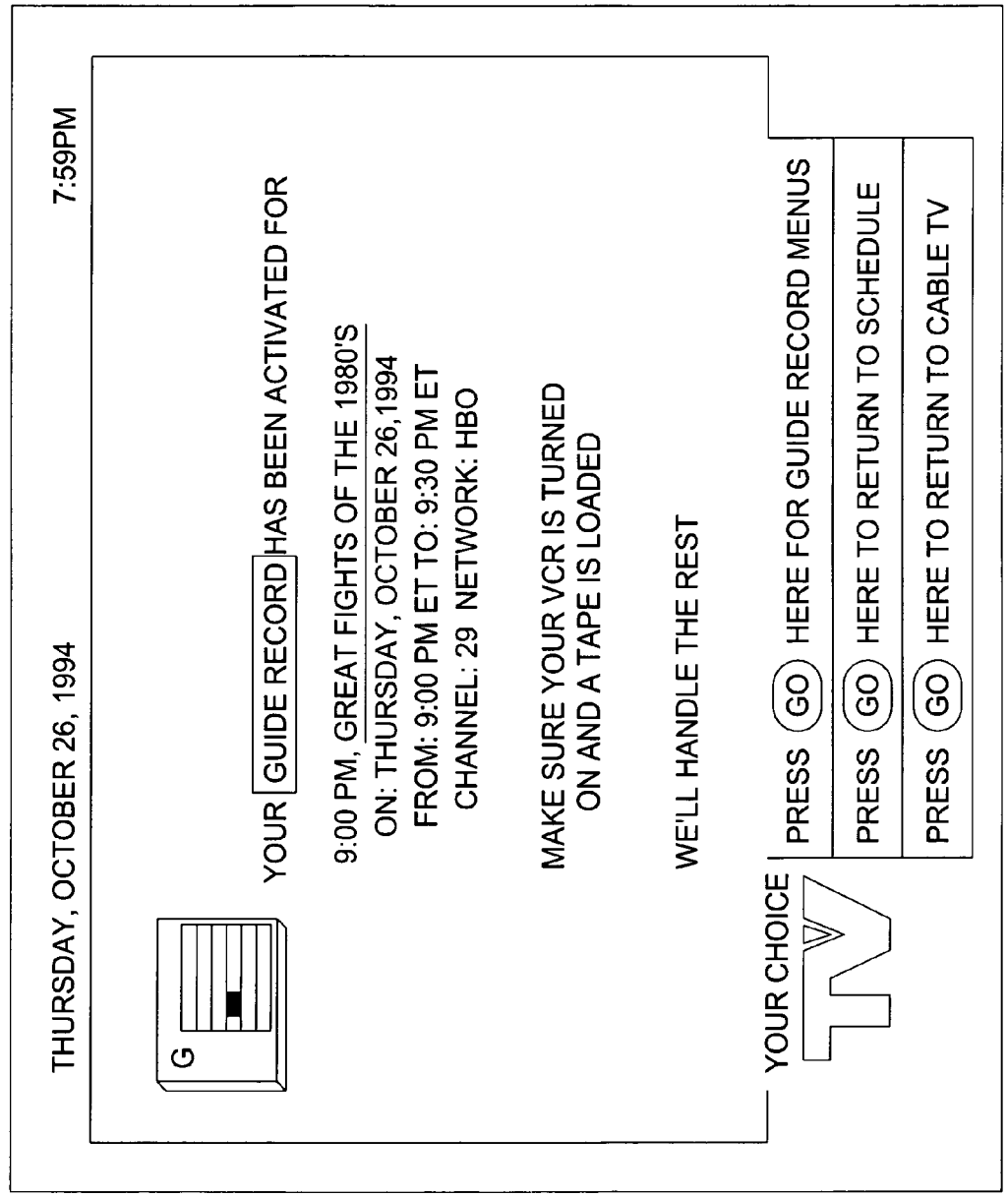

Following a program choice, a program description submenu 1244 is placed on the television screen as shown in FIG. 50e. In addition, from this program description submenu, the viewer may choose to record the selected program on his VCR using the guide record feature. If the guide record feature is chosen, the guide record submenu 1248 shown in FIG. 50f provides the subscriber with further instructions. In order for the set top terminal 220 to perform the guide record functions and operate the VCR, control signals must be sent from the set top terminal 220 to the VCR via the video connection 650 or via a separate connection between the set top terminal 220 and the VCR. The VCR must be capable of interpreting these control signals from the set top terminal 220 and performing the desired function (such as, activating the record feature). In the preferred embodiment, the VCR control signals are sent with the video signal and output from the output 650, as described above.

Figure 50G:
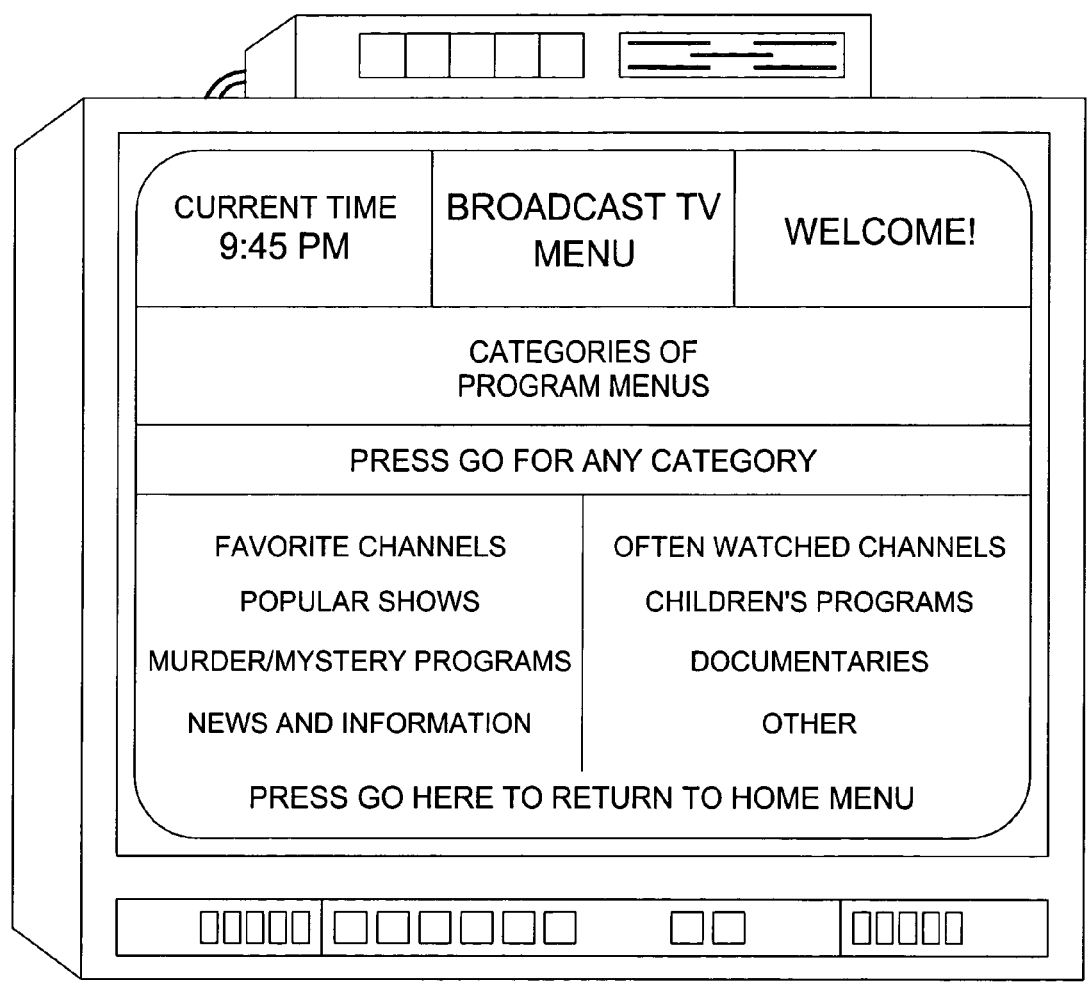
FIGS. 50g–50h are drawings of broadcast television menus.
Figure 50H:
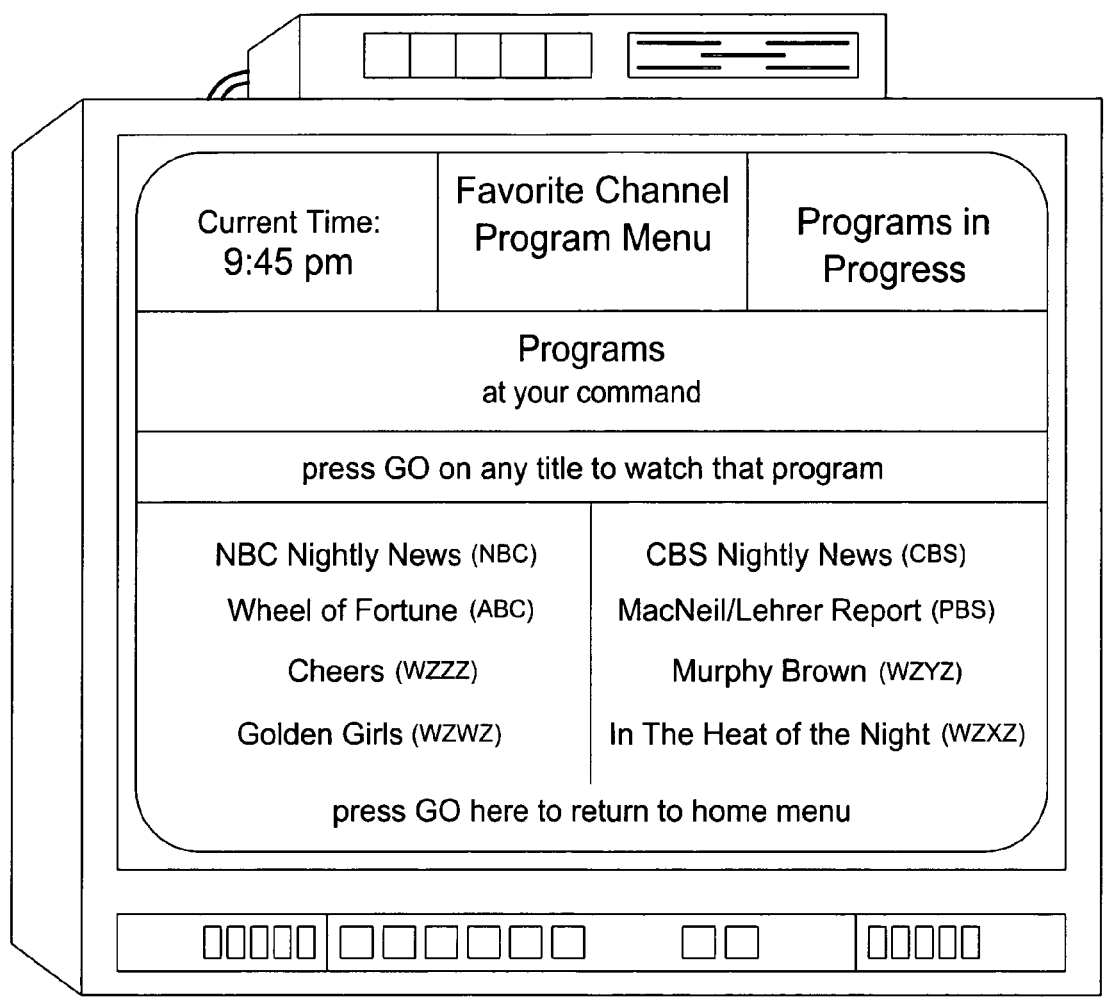

FIGS. 50g and 50h refer to the broadcast TV menu option available in FIG. 17b. FIG. 50g is a major menu 1046 displaying subcategories of programs available on a group of channels called generically "broadcast TV." For each subcategory there is a separate submenu listing programs that are available in the particular subcategory on a group of channels called broadcast TV.

By using the broadcast TV menu, the subscriber does not need a written guide of available television programming on the major networks. Although the preferred embodiment categorizes television programs available on the major networks, a simple chronological listing of programs may also be used.

Following a subcategory selection on the broadcast TV menu such as favorite channels, the set top terminal 220 will display a submenu of programs as shown in FIG. 50h. The favorite channel program menu 1256 of FIG. 50h allows the subscriber to choose among eight programs in progress at 9:45 p.m. on a broadcast TV network.

Using this methodology, the subscriber may also be allowed to choose among television programs which will be available for viewing in the next half hour or hour. When the time of the preselected program is approaching, the set top terminal 220 will display a notification menu or window to the subscriber informing him of an eminent change of channels to a previously selected program.

In order for the set top terminal 220 to establish a favorite channel list, menus querying the subscriber and allowing the subscriber to input his selection of eight favorite channels must be displayed. Alternatively, the set top terminal 220 box can "learn" which channels are a subscriber's favorite channels. A simple learning process would involve the set top terminal 220 determining which channels were the most often watched and assume those channels are the subscriber's favorite channels. Favorite channels are preferably stored in memory in the set top terminal 220. FIG. 50g, the broadcast TV menu 1046, has a separate category for often watched channels which allow the subscriber or the set top terminal 220 in a learning mode to choose eight additional channels for display.

In a manner similar to learning the most often watched channels of the subscriber, the terminal can also determine the most often watched shows by the subscriber. After developing (or learning) a list of popular shows or querying the subscriber for a list of popular shows the terminal can display a submenu allowing the subscriber to choose one of his popular shows for viewing.

In order for the set top terminal 220 to develop submenus for subcategories in FIG. 50g which relate to the content of the programs, the terminal must receive information on the content of the programs from the operations center 202 (via the cable headend 208). Normally the set top terminal 220 would receive this information in the form of the program control information signal (or STTCIS).

Although various embodiments of menus for broadcast TV are possible, the goals of each are the same—to eliminate or augment printed guides to television programs.

Figure 51A:
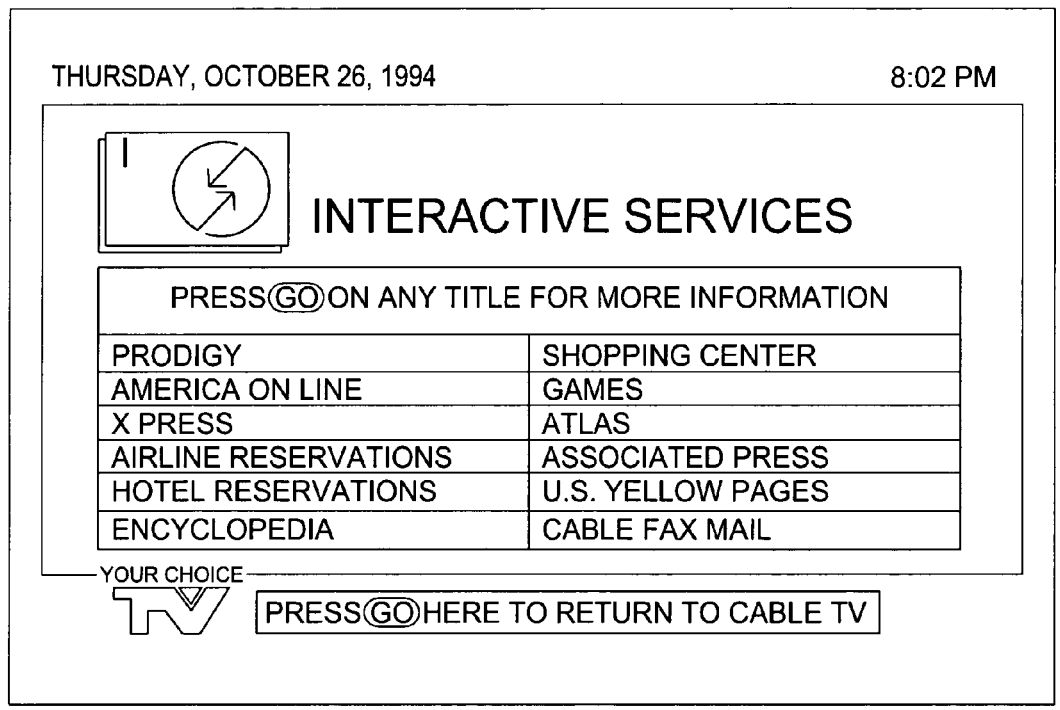
Figure 51B:
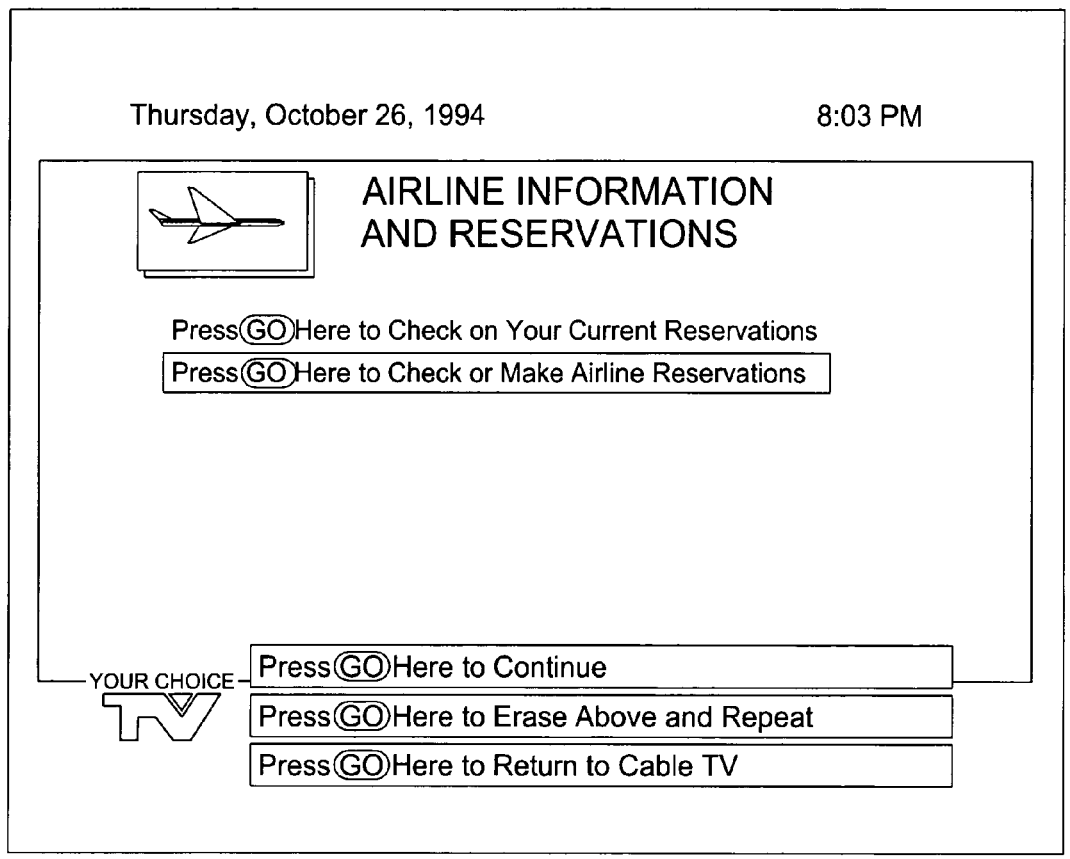
Figure 51C:
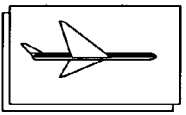
Figure 51D:
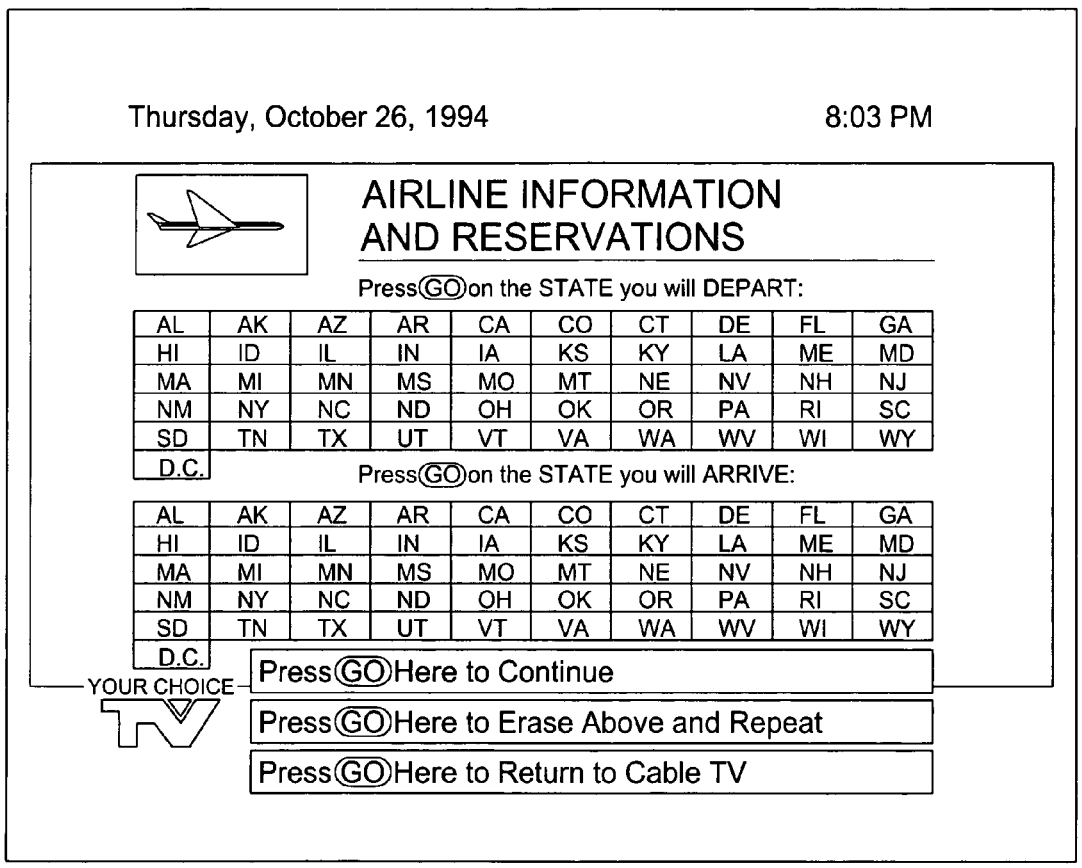
Figure 51F:
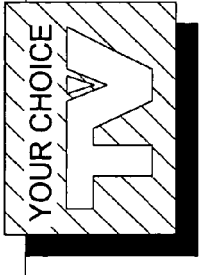
Figure 51G:
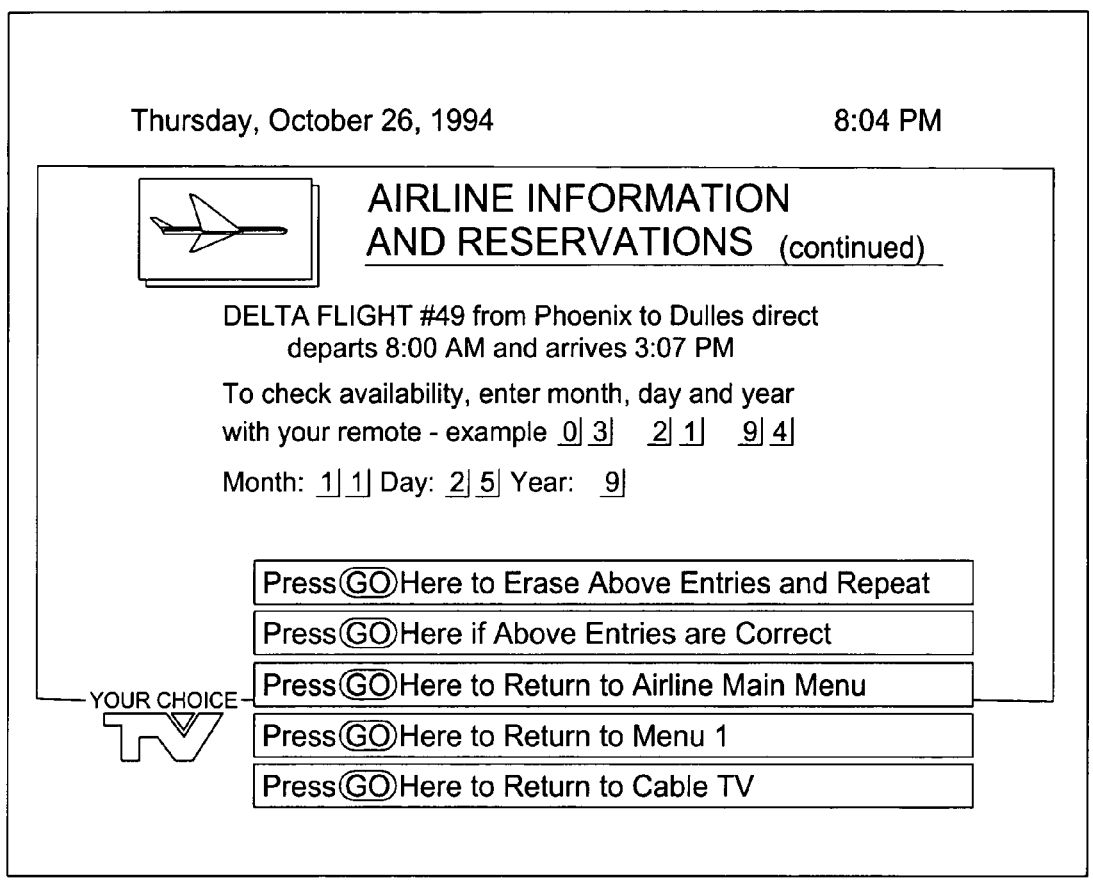
Figure 51H:
Figure 51K:
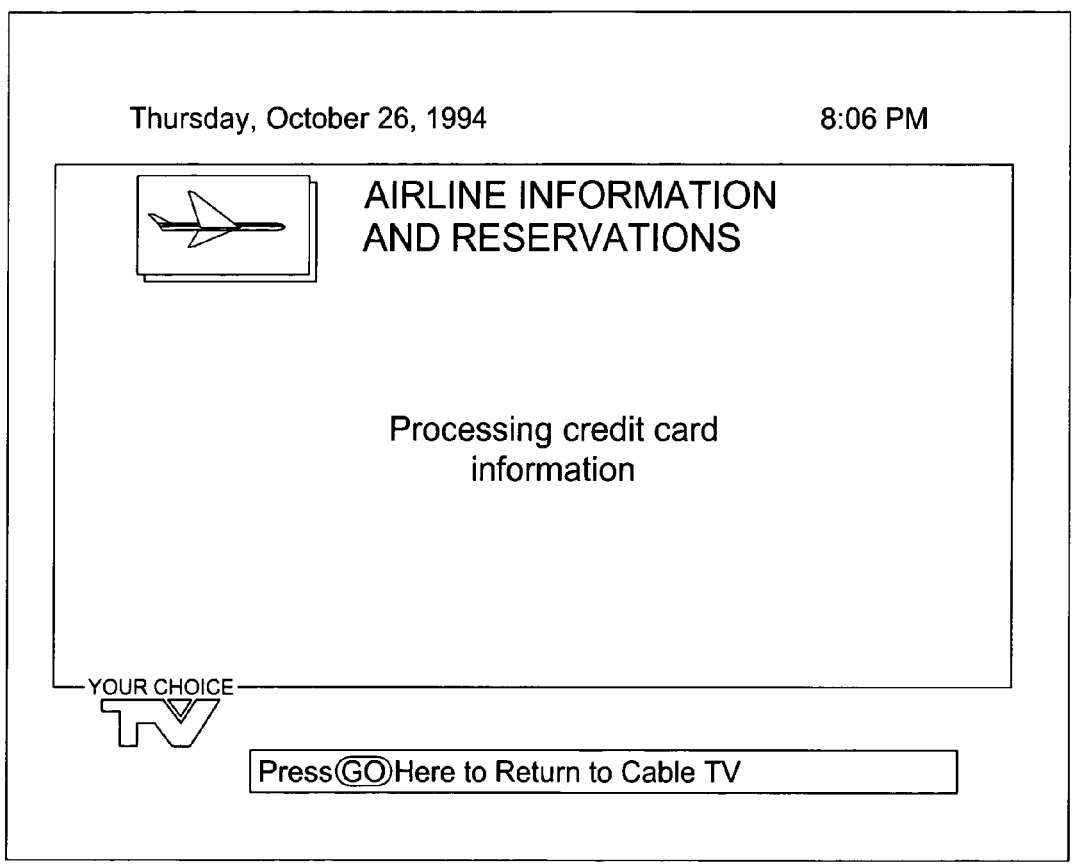

FIG. 51a is an example of a submenu for interactive services. From this menu screen 1330, any of a number of on-line data services could be accessed. In FIG. 51a, the airline reservations selection has been selected by the subscriber.

FIGS. 51b through 51k provide an example of a sequence of menus that a subscriber may encounter with an on-line data service

What is claimed is:

1. A method for providing programming in a television delivery system, comprising:
    packaging the programming at a television delivery center, wherein the packaging includes at least one program;
    generating menu information related to the programming packaging, wherein the menu information include menu data for interactive services and data services, wherein the menu information is generated automatically by an operations center by analyzing the programming packaging using a heuristic thereby filtering and indexing the programming for display, and wherein the programming is filtered into a database containing program names and indexed by a number of times each program is purchased;
    transmitting the menu data for the interactive services and the data services to viewers;
    providing the menu information including the database containing program names to terminals using the television delivery system;
    storing the menu information in the terminals;
    displaying the menu information as programming menus, wherein a programming menu is displayed on a first portion of a display coupled to a terminal and wherein the programming menu is displayed using a television channel;
    choosing a program from the displayed programming menu;
    receiving a program selection based on the program chosen from the displayed programming menu;
    switching the terminal from the television channel carrying the programming menu to a television channel carrying the chosen program, wherein the switching step is completed in response to a single control function; and
    displaying the chosen program on the display.

2. The method of claim 1, further comprising transmitting menu templates to the terminals, wherein the menu information is menu data and wherein the terminals create the programming menus based on the menu data and the menu templates.

3. The method of claim 1, wherein the menu information is provided to the terminals as the programming menus.

4. The method of claim 1, wherein the television delivery system includes a cable television headend.

5. The method of claim 1, wherein the television delivery system includes a backyard satellite receiver.

6. The method of claim 1, wherein the television delivery system includes an operations center.

7. The method of claim 6, wherein the operations center transmits the menu information and the programming to the cable television headend, and wherein the cable television headend inserts local programming into the packaging and local menu information into the menu information.

8. The method of claim 1, wherein the menu information includes date, time of day, channel and descriptive information for at least one program.

9. The method of claim 8, wherein the descriptive information includes a program title, a program rating and a program run time.

10. The method of claim 1, wherein the choosing step comprises:
    operating a control to highlight a program on the programming menu; and
    operating the control to designate the highlighted program as the chosen program.

11. The method of claim 10, wherein a portion of the programming menu extends beyond a screen size of the display, the choosing step further comprising operating the control to scroll to the portion of the programming menu that exceeds the screen size.

12. The method of claim 11, wherein the control is a remote control, the remote control including cursor buttons to navigate the programming menu, scroll the programming menu and highlight the programs, and a go button to designate the chosen program, and wherein an operation of the go button completes the single control function.

13. The method of claim 12, wherein the remote control is one of an infra red control and a radio frequency control.

14. The method of claim 1, further comprising updating the programming menus as programming packaging changes.

15. The method of claim 1, wherein the programming menu includes a video window, the video window used to display a video.

16. The method of claim 15, wherein the video includes advertisements targeted to the terminal.

17. The method of claim 16, wherein the advertisements are targeted based on viewer profile information.

18. The method of claim 17, wherein the viewer profile information includes one of programs watched information and viewer demographic information.

19. The method of claim 16, wherein the advertisements are displayed prior to display of the chosen program.

20. The method of claim 1, wherein the displayed program includes an overlay menu, the overlay menu further including a connection to alternate programming.

21. The method of claim 1, wherein the menu data is provided over a cable television cable.

22. The method of claim 1, wherein the providing step further comprises:
    sending the menu information to an online address; and
    coupling the online address to the terminals, wherein when the online address is accessed, the menu information is displayed on the display as the programming menus.

23. The method of claim 22, wherein the chosen program is selected by selecting a program from the programming menus accessed through the online address.

24. The method of claim 23, wherein when the chosen program is selected, the terminal switches from the online address to a channel carrying the selected program.

25. The method of claim 1, wherein the chosen program includes one of a single event, a multiple event and a subscription.

26. The method of claim 25, wherein the subscription includes a specialty channel subscription and a specialty program subscription.

27. The method of claim 26, wherein the specialty channel subscription includes monthly and annual subscriptions.

28. The method of claim 26, wherein the specialty channel subscription is a hit movie channel subscription.

29. A method for generating a television program menu for use by viewers in selecting programs based on program line-up information, comprising:
    obtaining and storing the program line-up information for each program, the program line-up information including program name, program start time, program duration, program category and program price;
    generating menu data based on the program line-up information, wherein the menu data include menu information for interactive services and data services, wherein the menu information is generated automatically by an operations center by analyzing the program line-up information using a heuristic thereby filtering and indexing the program line-up information for display, and wherein the program line-up information is filtered into a database containing program names and indexed by a number of times each program is purchased;
    transmitting the menu information for the interactive services and the data services to viewers;
    providing the menu data including the database containing program names to terminals;
    creating a program control information signal using the generated menu data;
    transmitting the programs to the viewers; and
    transmitting the program control information signal simultaneously with the programs.

30. The method of claim 29, wherein the program control information signal also contains information for identifying channels for the interactive services and the data services available to the viewers, the method further comprising:
    collecting information on the interactive and the data services available;
    inventorying the interactive and the data services to be made available to the viewer;
    assigning the channels for the interactive and the data services; and
    creating menu data for the interactive and the data services for transmission to the viewers.

31. A method for selecting a program from a broadcast television system, comprising:
    generating program menu data related to programming packaging, wherein the menu data include menu information for interactive services and data services, wherein the menu information is generated automatically by an operations center by analyzing the programming packaging using a heuristic thereby filtering and indexing the programming packaging for display, and wherein the programming packaging is filtered into a database containing program names and indexed by a buy time and program categories;
    transmitting the menu information for the interactive services and the data services to viewers;
    providing the menu data including the database containing program names to a terminal in the broadcast television system;
    creating a menu from the menu data, wherein the menu includes a window;
    scrolling the menu to a desired program; and
    selecting the desired program for display on a display coupled to the terminal, wherein the selected program is displayed in response to a single control function.

32. The method of claim 31, wherein the generating step comprises:
    packaging programs; and
    generating program control information related to the packaged programs, wherein the program control information includes the menu data and wherein the window is scalable.

33. The method of claim 32, wherein the programs are packaged by program category.

34. The method of claim 32, wherein the programs are packaged by date and time of broadcast.

35. The method of claim 32, wherein the programs include digital programs.

36. The method of claim 31, wherein the menu data is provided in a program control information signal.

37. The method of claim 36, wherein the program control information signal is provided in a vertical blanking interval.

38. The method of claim 36, wherein the program control information signal is provided in a dedicated channel.

39. The method of claim 31, further comprising:
    generating menu templates;
    providing the menu templates to the terminals; and
    storing the menu templates in a memory of the terminal.

40. The method of claim 39, wherein the terminal creates a menu from the menu data, the menu displayed according to the menu templates.

41. The method of claim 39, wherein the menu templates include an introductory menu template, a home menu template, major menu templates and submenu templates, and wherein the displayed menu includes an introductory menu, a home menu, major menus and submenus.

42. The method of claim 41, wherein the major menus are arranged according to program categories, and wherein the major menus display programs available for viewing.

43. The method of claim 42, wherein the display of programs available for viewing comprises a list of program titles.

44. The method of claim 42, wherein the display of programs available for viewing includes a program rating.

45. The method of claim 31, wherein the menu is displayed on a television display, wherein portions of the menu exceed a display size of the television display, wherein the portions of the menu that exceed the display size are accessed by scrolling with a remote control, and wherein the window displays a video.

46. The method of claim 45, wherein the selected program is selected by selecting a program title using a remote control.

47. The method of claim 46, wherein the remote control is one of an infrared control and a radio frequency control.

48. The method of claim 47, wherein the remote control comprises cursor buttons and a go button, and wherein the cursor buttons are operated to scroll the menu and to highlight the desired program title and the go button is operated to select the highlighted program title.

49. The method of claim 45, wherein the selected program is selected by selecting a program title using a control on the terminal.

50. The method of claim 41, wherein the submenus include program description menus, notification menus, escape menus, and return to program menus.

51. The method of claim 50, wherein the program description menus include a program description, a program preview video, and a cost to order and wherein the program preview video is displayed in the window.

52. The method of claim 51, wherein the program description menus further include an order button, a return to menu button and a return to broadcast television button, wherein a program is ordered by highlighting the order button using a cursor and selecting the order button using a go button.

53. The method of claim 52, wherein the cursor and the go button are included in a remote control operably coupled to the terminal.

54. The method of claim 50, wherein the escape menu includes a time to program start, a cancel button and a return to broadcast television button, wherein operation of the cancel button ends a selected program without charge, the cancel button displayed for a fixed time measured from a start of the selected program.

55. A system that provides programming selection from a menu, comprising:
- a television delivery system that packages programming, wherein the programming package includes at least one program, generates menu information related to the programming, and provides the programming package and the menu information to subscribers, wherein the menu information include menu data for interactive services and data services, wherein the menu information is generated automatically by an operations center by analyzing the programming using a heuristic thereby filtering and indexing the programming for display, and wherein the programming is filtered into a database containing program names and indexed by a number of times each program is purchased;
- a terminal operably connected to the television delivery system, the terminal comprising:
  - a memory that stores the menu information;
  - a processor connected to the memory that processes the menu information to generate the menu, and
  - a control operably connected to the processor that provides program selection instructions to the processor, wherein the menu information including the database containing program names are provided to the terminal using the television delivery system; and
- a display operably connected to the terminal that displays the menu and the programming, wherein the terminal switches to a channel carrying a program selected from the menu in response to a program selection instruction, the program selection instruction being a single control function.

56. The system of claim 55, wherein the channel is a virtual channel created by the terminal.

57. The system of claim 55, wherein the television delivery system provides menu templates to the terminal, the memory storing the menu templates, the processor generating the menus based on the menu templates and the menu information.

58. The system of claim 55, wherein the television delivery system provides the menu information as programming menus.

59. The system of claim 55, wherein the television delivery system includes an operations center.

60. The system of claim 55, wherein the television delivery system includes a cable television headend.

61. The system of claim 60, wherein the operations center transmits the menu information and the programming to the cable television headend, and wherein the cable headend inserts local programming into the programming package and local menu information into the menu information.

62. The system of claim 55, wherein the menu information includes date, time of day, channel and descriptive information for the at least one program.

63. The system of claim 62, wherein the descriptive information includes a program title, a program rating, and a program start time.

64. The system of claim 55, wherein the program selection instructions include highlight a desired program and select the desired program.

65. The system of claim 55, wherein the control is a remote control, the remote control comprising:
- cursor buttons operable to navigate the menu, to scroll the menu, and to highlight programs shown on the menu; and
- a select button operable to select a desired program, wherein an operation of the select button completes the single control function.

66. The system of claim 65, wherein the remote control is one of an infrared control and a radio frequency control.

67. The system of claim 55, wherein the television delivery system updates the menu information based on programming package changes and provides the updated menu information to the terminal.

68. The system of claim 55, wherein the menu includes a video window, the video window used to display a video.

69. The system of claim 68, wherein the video is an advertisement.

70. The system of claim 69, wherein the advertisement is targeted to the terminal.

71. The system of claim 70, wherein the advertisement is targeted based on viewer profile information.

72. The system of claim 71, wherein the viewer profile information includes programs watched information.

73. The system of claim 71, wherein the viewer profile information includes viewer demographic information.

74. The system of claim 55, wherein when the selected program is displayed, the selected program includes an overlay menu, the overlay menu including a connection to alternate programming.

75. The system of claim 74, wherein the alternate programming includes an online address.

76. The system of claim 55, wherein the programming package and the menu information are provided over a cable television cable.

77. The system of claim 55, wherein the programming package and the menu information are provided over a fiber optic cable.

78. The system of claim 55, wherein the programming package and the menu information are provided over a satellite broadcast and are received by a backyard satellite receiver.

79. The system of claim 55, wherein the programming package includes digital programs.

80. An apparatus that provides for television program selection from a displayed menu, comprising:
- a terminal that receives television programs and menu data related to the television programs, wherein the menu data include menu information for interactive services and data services, wherein the menu information is generated automatically by an operations center by analyzing the television programs using a heuristic thereby filtering and indexing the television programs for display, wherein the television programs are filtered into a database containing program names and indexed by a number of times each program is purchased, and wherein the menu information including the database containing program names are provided to the terminal;

a display coupled to the terminal that displays the menu data and the television programs; and a control that scrolls through the menu data, cursors through the menu data, and selects a desired television program from the television programs, wherein when the desired television program is selected, the terminal switches to a channel carrying the selected television program and the display displays the selected television program.

81. The apparatus of claim 80, wherein the television programs include digital programs.

82. The apparatus of claim 80, further comprising a backyard satellite receiver, wherein the television programs are received by the backyard satellite receiver.

83. The apparatus of claim 82, wherein the menu data is received by the backyard satellite receiver.

84. The apparatus of claim 80, further comprising a fiber optic connector, wherein the television programs and the menu data are received by the fiber optic connector.

85. The apparatus of claim 80, wherein the selected television program includes one of a single event, a multiple event and a subscription.

86. The apparatus of claim 85, wherein the subscription includes a specialty channel subscription and a specialty program subscription.

87. The apparatus of claim 86, wherein the specialty channel subscription includes monthly and annual subscriptions.

88. The apparatus of claim 86, wherein the specialty channel subscription is a hit movie channel subscription.

89. The apparatus of claim 80, further comprising:
a processor; and
a memory coupled to the processor wherein the menu data is stored in the memory and wherein the processor processes the menu data to generate a television program menu.

90. The apparatus of claim 89, wherein the television program menu includes a video window.

91. The apparatus of claim 90, wherein the video window displays a program.

92. The apparatus of claim 91, wherein the program includes one of a still video and a moving video.

93. The apparatus of claim 91, wherein the program is text.

94. The apparatus of claim 91, wherein the program is related to the desired television program.

95. The apparatus of claim 80, wherein the channel is a virtual channel.

96. An apparatus for selecting programs, comprising:
a receiver that receives programs and program control information related to the received programs, wherein the program control information include menu information for interactive services and data services, wherein the menu information is generated automatically by an operations center by analyzing the programs using a heuristic thereby filtering and indexing the programs for display, wherein the programs are filtered into a database containing program names and indexed by a buy time and program categories, and wherein the menu information including the database containing program names are provided to terminals using a television delivery system;
a memory coupled to the receiver that stores the program control information;
a processor coupled to the receiver and the memory, the processor processing the program control information to generate a program menu, the program menu stored in the memory, wherein the program menu provides a list of available programs for viewing;
a display coupled to the processor that displays the program menu and the programs; and
a control coupled to the processor, the control providing program selection signals, wherein the program selection signals select a program for viewing on the display, the program selected from the list of available programs shown on the program menu.

97. The apparatus of claim 96, wherein the selected program includes one of a single event, a multiple event and a subscription.

98. The apparatus of claim 97, wherein the subscription includes a specialty channel subscription and a specialty program subscription.

99. The apparatus of claim 98, wherein the specialty channel subscription includes monthly and annual subscriptions.

100. The apparatus of claim 98, wherein the specialty channel subscription is a hit movie subscription.

101. The apparatus of claim 98, wherein the specialty channel subscription is a mini-pay subscription.

102. An apparatus for selecting programs, comprising:
a receiver that receives the programs and program information related to the received programs, wherein the program information include menu information for interactive services and data services, wherein the menu information is generated automatically by an operations center by analyzing the programs using a heuristic thereby filtering and indexing the programs for display, wherein the programs are filtered into a database containing program names and indexed by a number of times each program is purchased, and wherein the menu information including the database containing program names are provided to terminals using a television delivery system;
a display that displays a program menu based on the program information; and
a control, operable to select a program for viewing, the program selected based on the displayed program information, wherein a program available for selection includes a subscription to a specialty channel, and wherein operation of the control starts the subscription to the specialty channel.

103. The apparatus of claim 102, further comprising:
a memory coupled to the receiver, the memory storing the program information; and
a processor coupled to the receiver and the memory, the processor processing the program information to generate the program menu, the program menu stored in the memory, wherein the program menu provides a list of available programs for selection.

104. The apparatus of claim 102, wherein the specialty channel includes a mini pay.

105. The apparatus of claim 102, wherein the specialty channel is a hit movie channel.

106. The apparatus of claim 102, wherein the program available for selection further includes a specialty program.

107. The apparatus of claim 106, wherein the specialty program includes one of a single event and a multiple event.

108. A method for selecting programs, comprising:
receiving programs and program information related to the received programs, wherein the program information include menu information for interactive services and data services, wherein the menu information is generated automatically by an operations center by analyzing the programs using a heuristic thereby filtering and indexing the programs for display, and wherein the television programs are filtered into a database containing program names and indexed by a number of times each program is purchased;

transmitting the menu information for the interactive services and the data services to viewers;

providing the menu information including the database containing program names to terminals using a television delivery system;

displaying a program menu based on the program information; and ordering a subscription to a program using a remote control, the program listed in the program menu, wherein the subscription includes a subscription to a specialty channel.

109. The method of claim 108, wherein the subscription includes daily, monthly and annual subscriptions.

110. The method of claim 109, wherein the specialty channel includes a hit movie channel.

* * * * *